(12) United States Patent
Baptist et al.

(10) Patent No.: US 10,013,471 B2
(45) Date of Patent: *Jul. 3, 2018

(54) AVOIDING WRITE CONFLICTS IN A DISPERSED STORAGE NETWORK

(71) Applicant: International Business Machines Corporation, Armonk, NY (US)

(72) Inventors: Andrew Baptist, Mt. Pleasant, WI (US); Greg Dhuse, Chicago, IL (US); Ilya Volvovski, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/223,707

(22) Filed: Jul. 29, 2016

(65) Prior Publication Data

US 2016/0335030 A1 Nov. 17, 2016

Related U.S. Application Data

(63) Continuation of application No. 13/959,702, filed on Aug. 5, 2013, now Pat. No. 9,424,326.

(Continued)

(51) Int. Cl.
*G06F 12/00* (2006.01)
*G06F 17/30* (2006.01)
(Continued)

(52) U.S. Cl.
CPC ........ *G06F 17/30575* (2013.01); *G06F 3/067* (2013.01); *G06F 3/0619* (2013.01);
(Continued)

(58) Field of Classification Search
CPC ............. G06F 17/30575; G06F 3/0689; G06F 3/0619; G06F 3/0659; G06F 17/30174; G06F 3/067; H04L 67/1097
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Mark A Giardino, Jr.
(74) *Attorney, Agent, or Firm* — Garlick & Markison; Timothy W. Markison; Shayne X. Short

(57) ABSTRACT

A method begins by a by a first device of a dispersed storage network (DSN) sending a set of write revision requests to storage units of the DSN. The method continues with one of the storage units generating a write revision response regarding a potential write conflict. The method continues with the first device receiving the write revision responses to produce a set of received write revision responses and interpreting the set of received write revision responses to determine whether a write conflict exists. When the write conflict exists, the method continues with the first device issuing a set of write roll back requests to the storage units. When the write conflict does not exist, the method continues with the first device issuing a set of next phase write requests to the storage units regarding storing revised encoded data slices.

18 Claims, 67 Drawing Sheets

Related U.S. Application Data

(60) Provisional application No. 61/700,691, filed on Sep. 13, 2012.

(51) Int. Cl.
| | | |
|---|---|---|
| *G06F 3/06* | (2006.01) | |
| *H04L 29/08* | (2006.01) | |
| *G06F 13/00* | (2006.01) | |
| *G06F 13/28* | (2006.01) | |

(52) U.S. Cl.
CPC .......... *G06F 3/0659* (2013.01); *G06F 3/0689* (2013.01); *G06F 17/30174* (2013.01); *H04L 67/1097* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,457,065 B1 | 9/2002 | Rich et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,467,265 B1 | 12/2008 | Tawri et al. |
| 7,636,724 B2 | 12/2009 | de la Torre et al. |
| 8,676,851 B1 | 3/2014 | Nesbit et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0161754 A1 | 6/2011 | Baptist et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Confer-

(56) References Cited

OTHER PUBLICATIONS ence on Architectural Support for Programming Languages and Operating Systems (ASPLOS 2000); Nov. 2000; pp. 1-12.

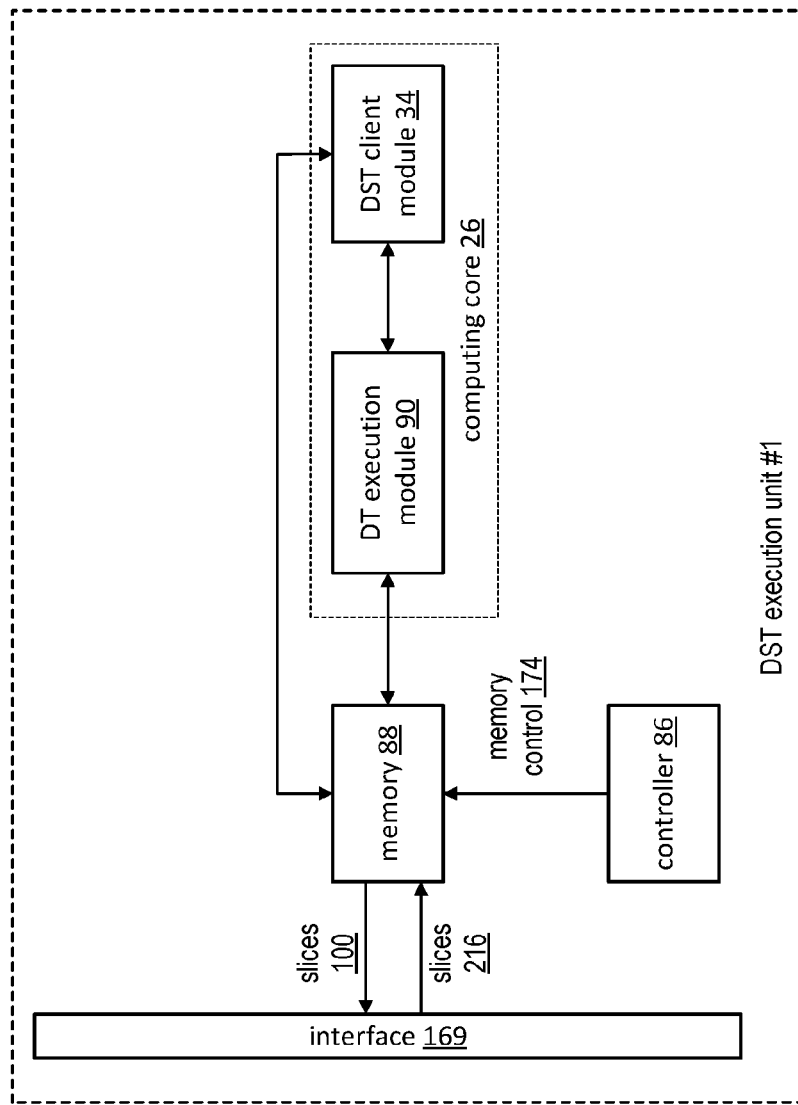
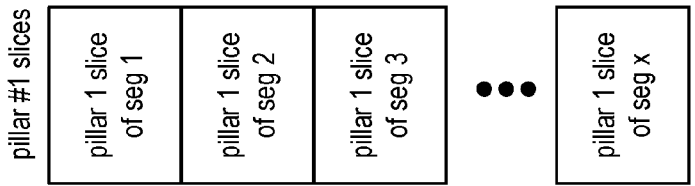
FIG. 24

| DST allocation info 242 | data partition info 320: data ID; No. of partitions; Addr. info for each partition; format conversion indication | | | | | | |
|---|---|---|---|---|---|---|---|
| | task execution info 322 | | | | intermediate result info 324 | | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4 2_5 - 2_z | 1_1, 2_1, 3_1, 4_1, & 5_1 1_2, 2_2, 3_2, 4_2, & 5_2 | R1-3 | DST unit 2 | DST unit 2 | DST units 2-6 |
| 1_4 | after 1_3 | R1-3_1 - R1-3_4 R1-3_5 - R1-3_z | 1_1, 2_1, 3_1, 4_1, & 5_1 1_2, 2_2, 6_1, 7_1, & 7_2 | R1_4 | DST unit 3 | DST unit 3 | DST units 3-7 |
| 1_5 | after 1_4 | R1-4_1 - R1-4_z & 2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z & R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z & R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

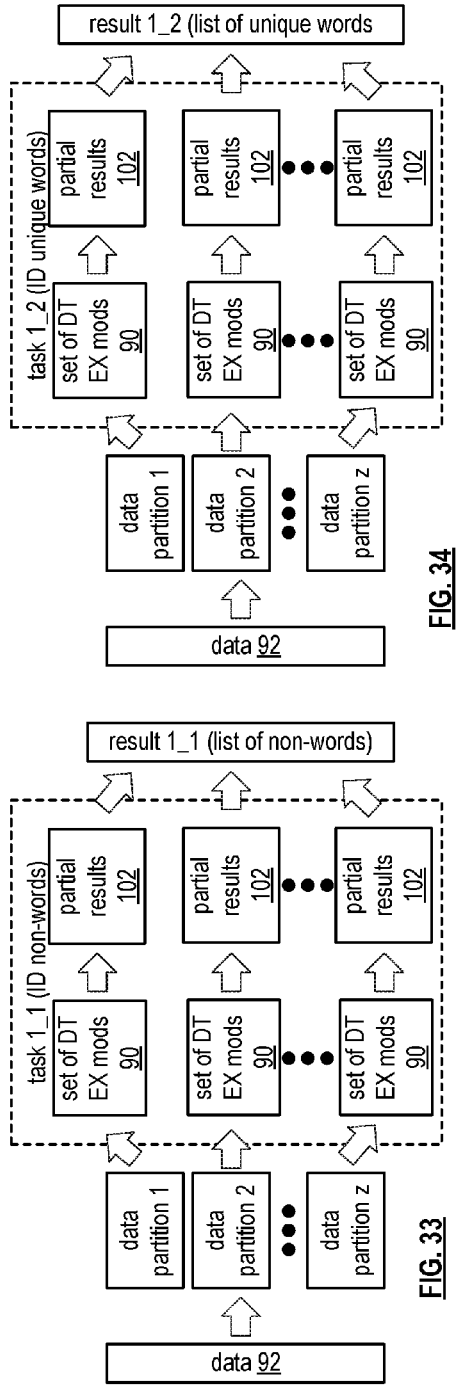
FIG. 33
FIG. 34
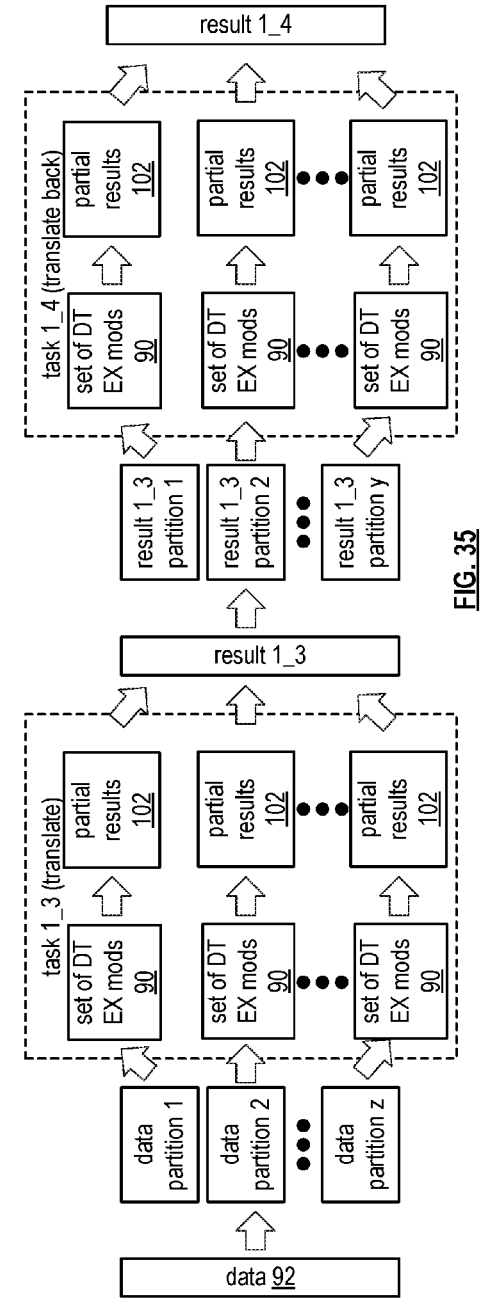
FIG. 35

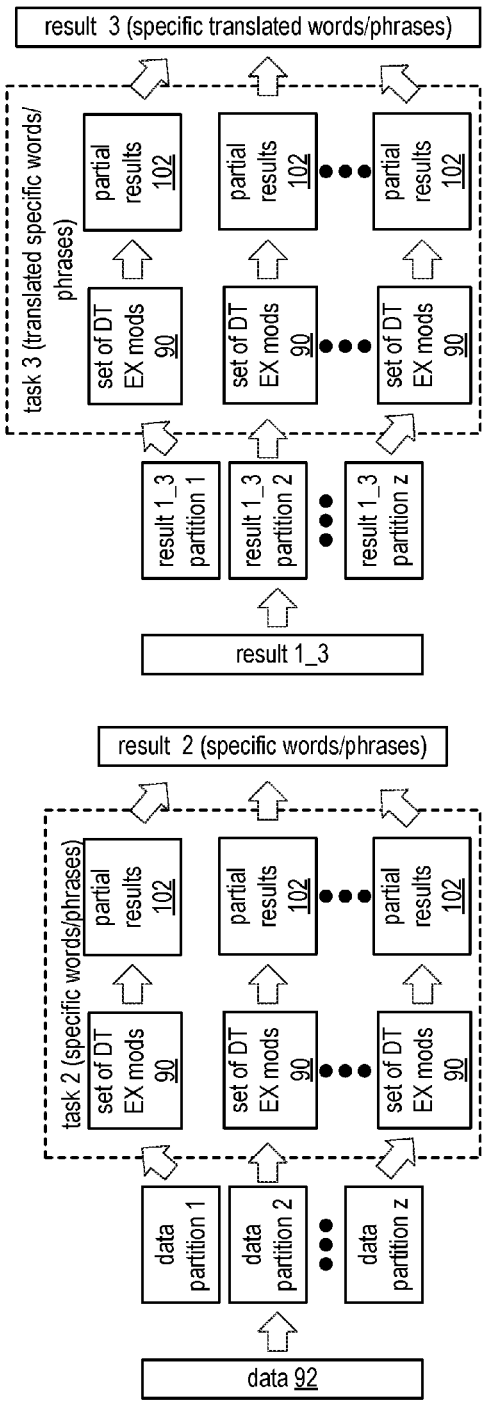
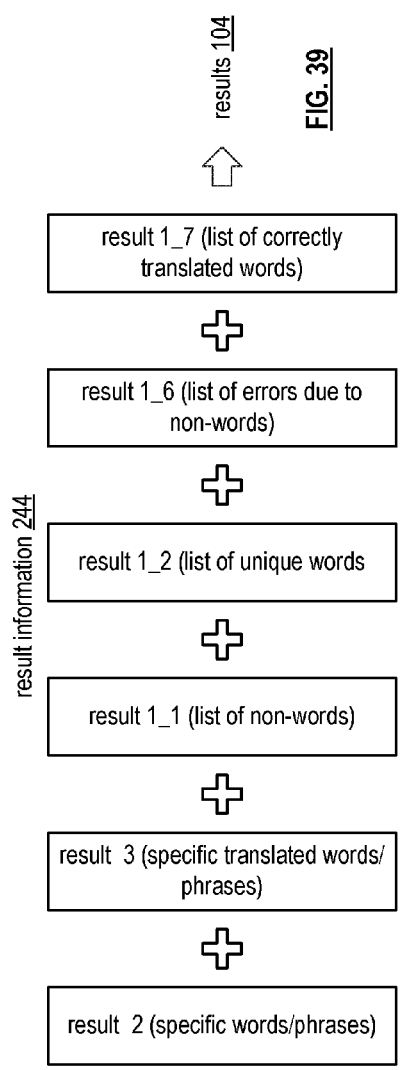

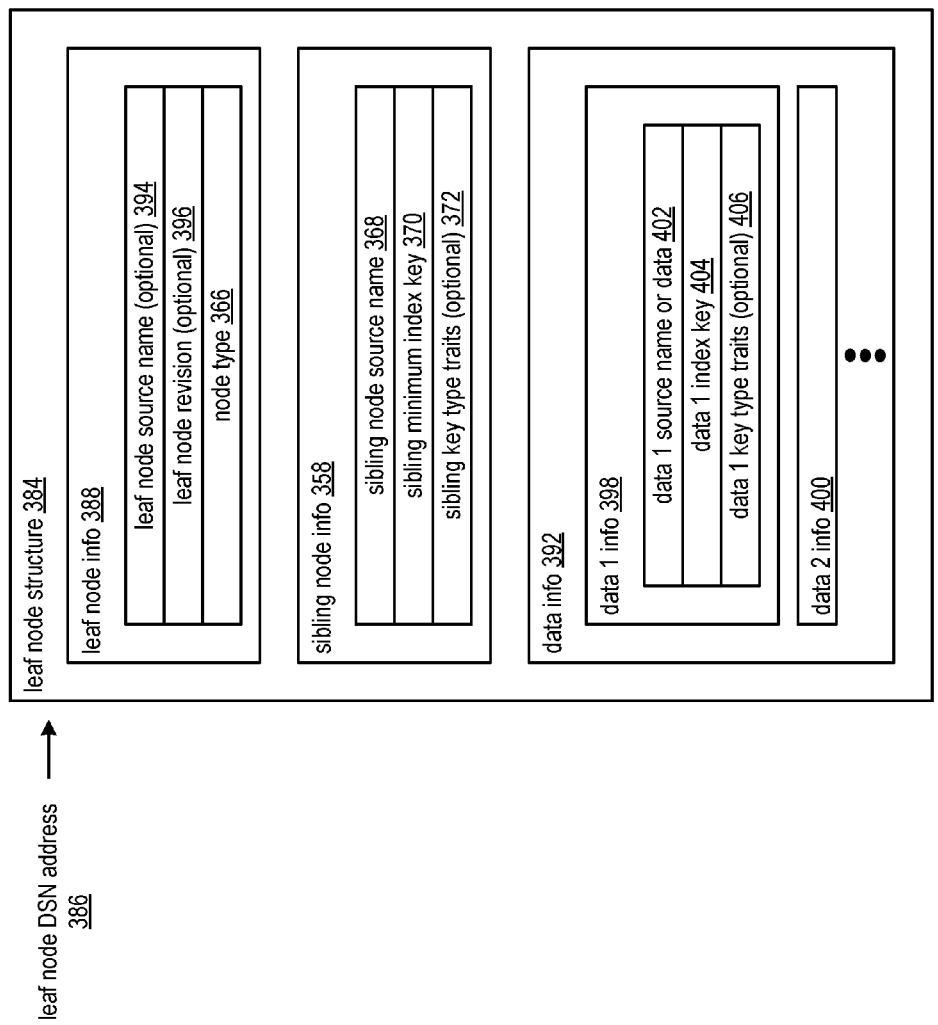

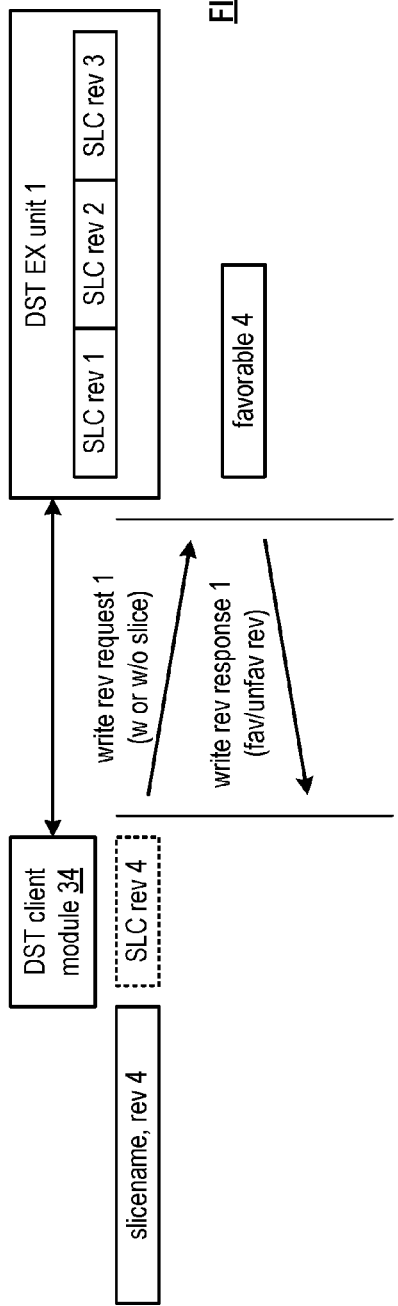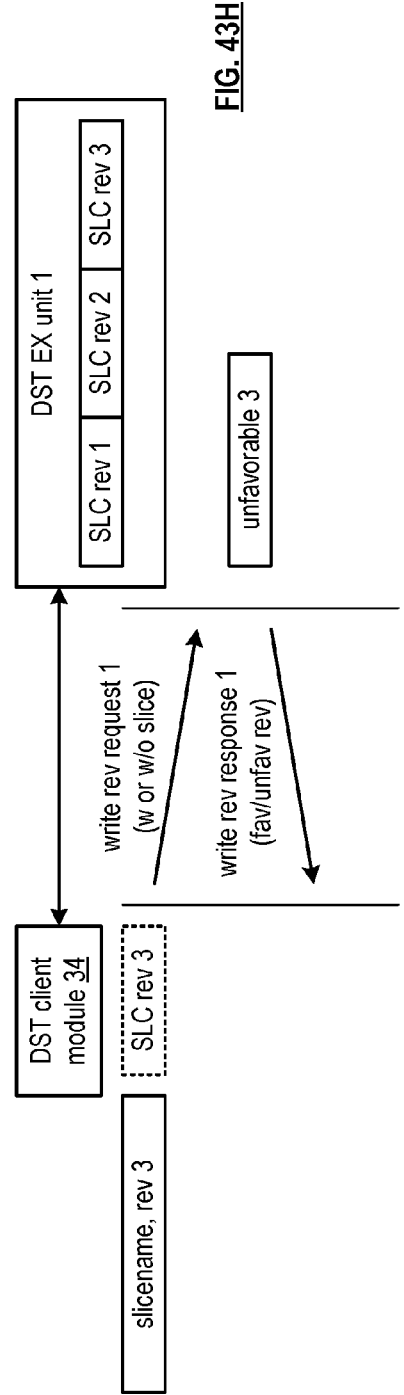

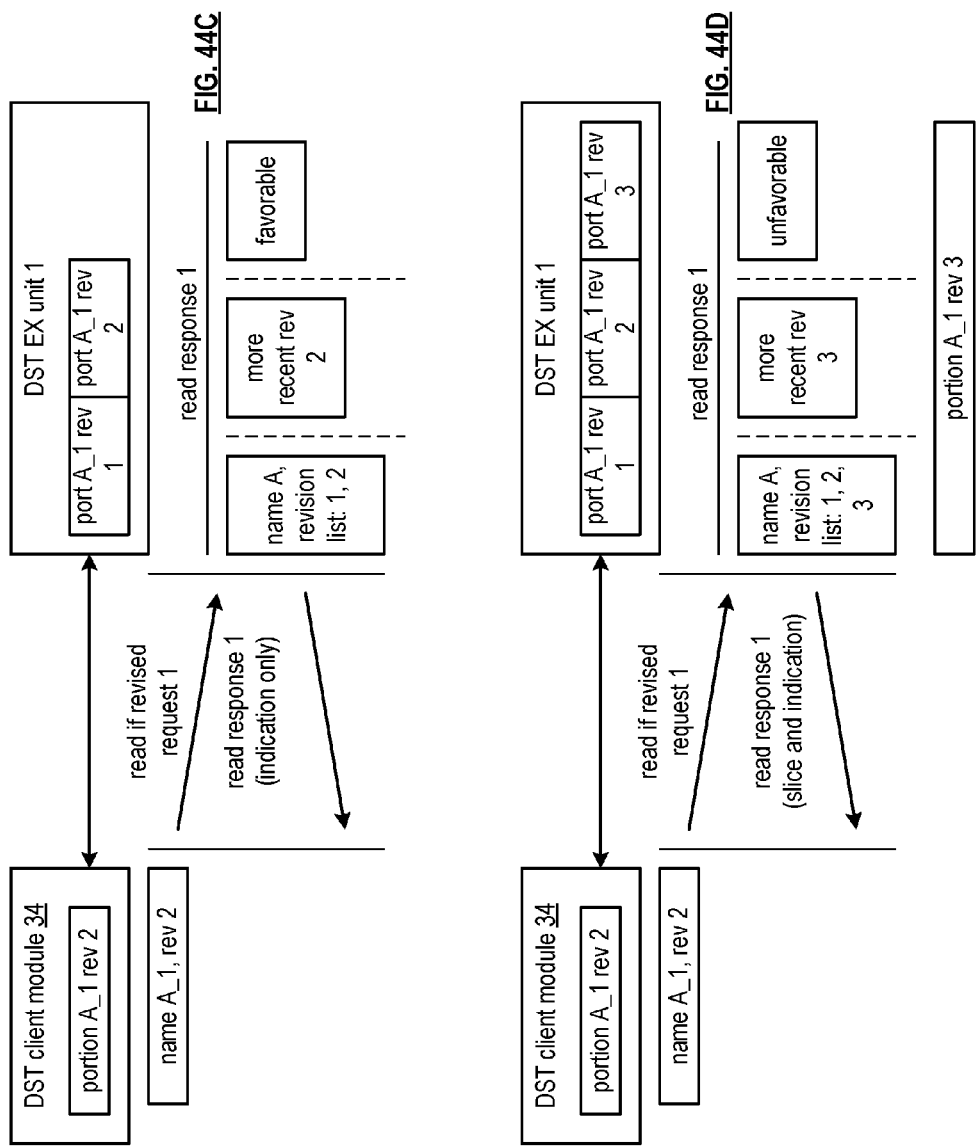

AVOIDING WRITE CONFLICTS IN A DISPERSED STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 13/959,702, entitled "WRITING DATA AVOIDING WRITE CONFLICTS IN A DISPERSED STORAGE NETWORK", filed Aug. 5, 2013, which claims priority pursuant to 35 U.S.C. § 119(e) to U.S. Provisional Application No. 61/700,691, entitled "UPDATING A DISPERSED STORAGE AND TASK NETWORK INDEX", filed Sep. 13, 2012, both of which are hereby incorporated herein by reference in their entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 40C is a diagram illustrating an example of a leaf node structure in accordance with the present invention;

Figure 43A:
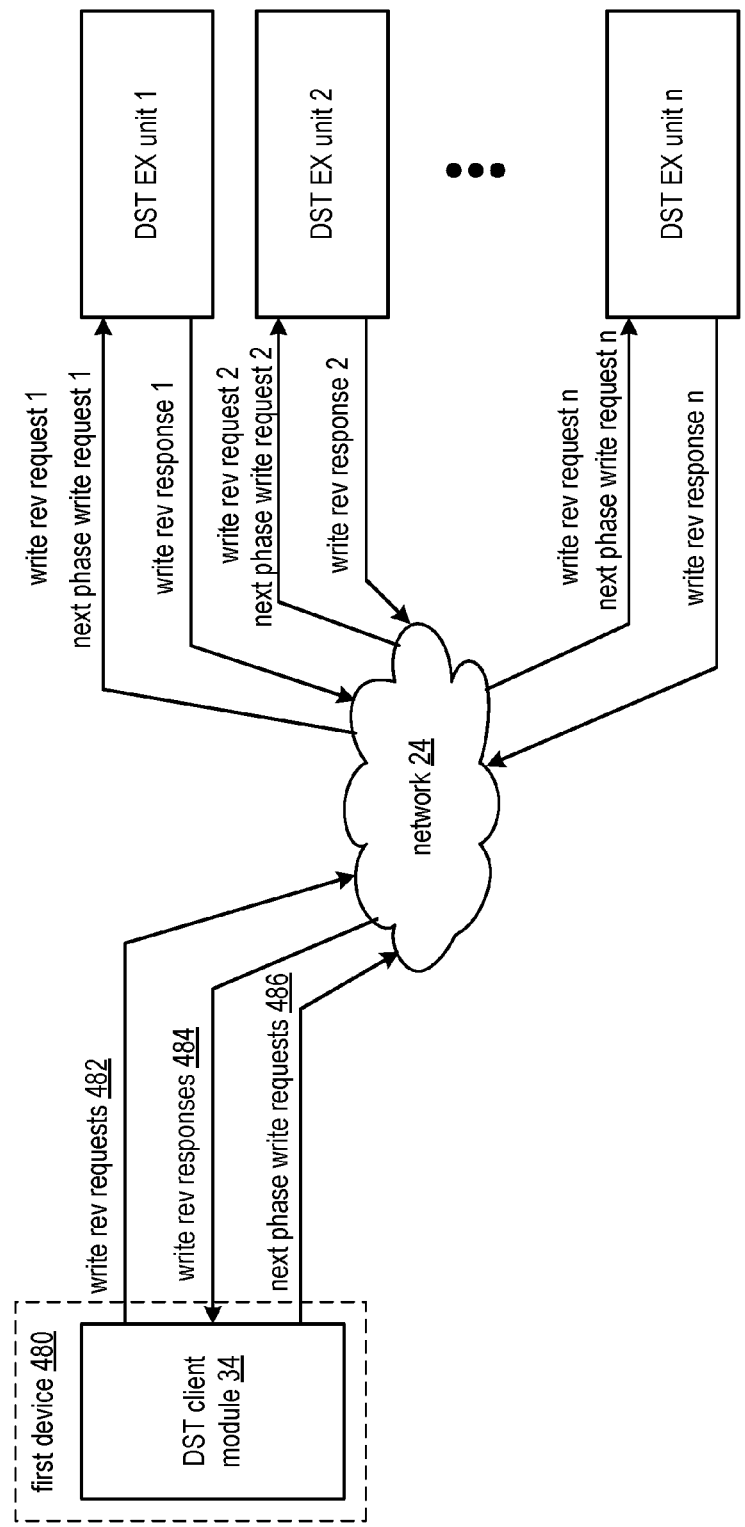
Figure 43B:
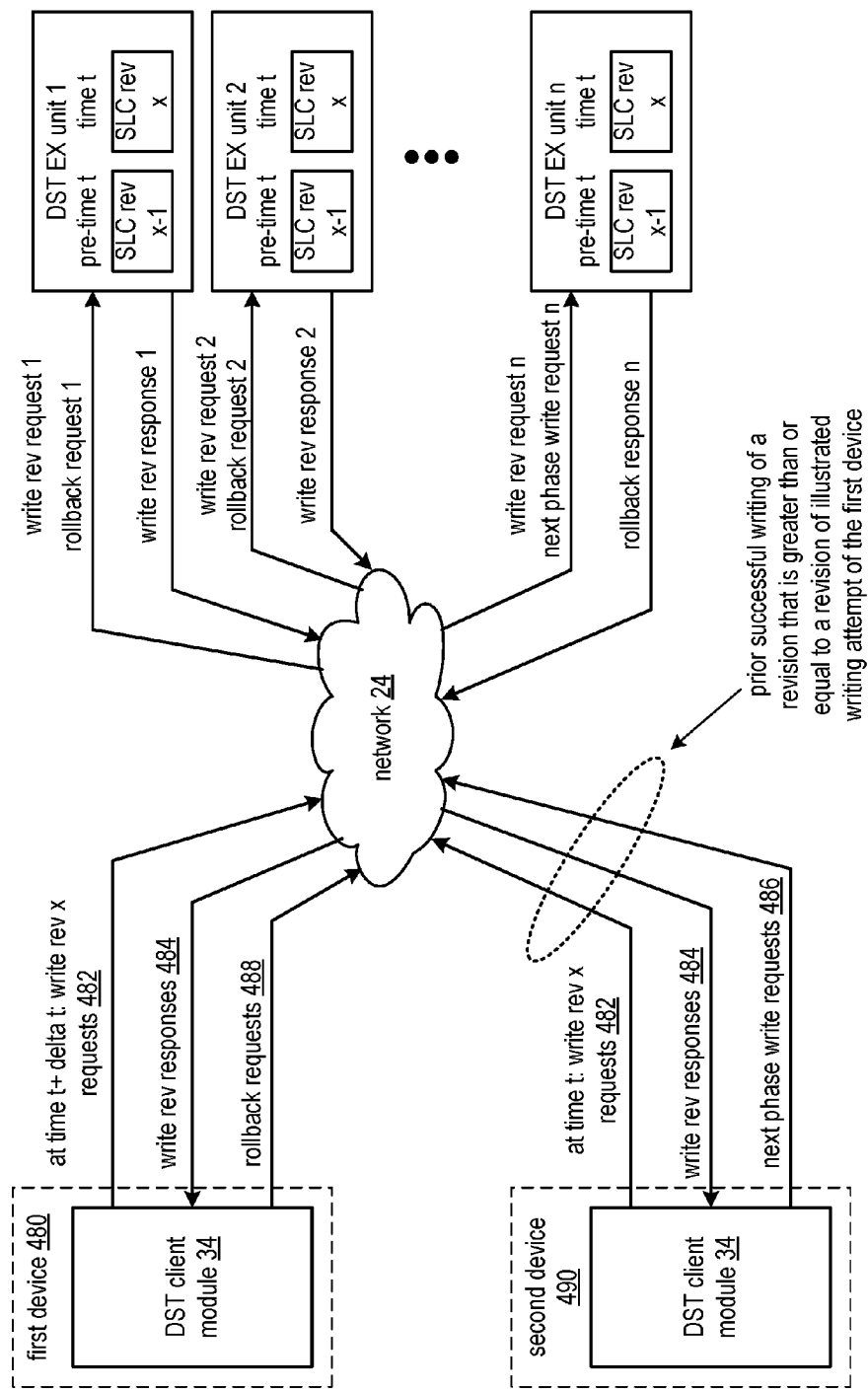
Figure 43C:
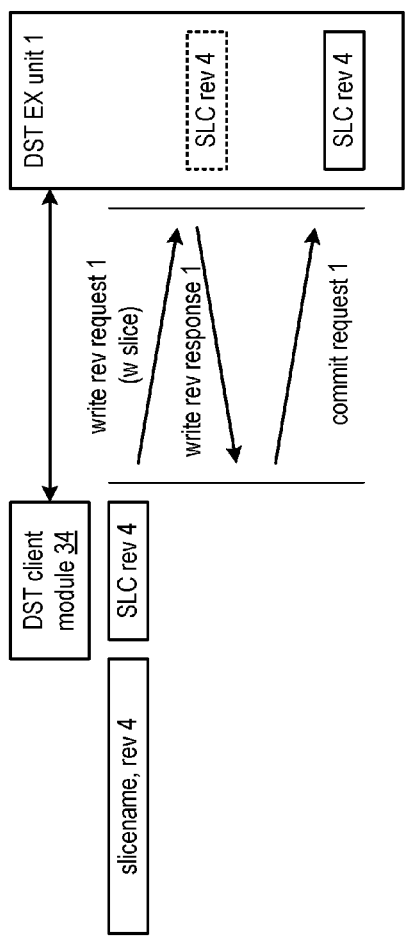
Figure 43D:
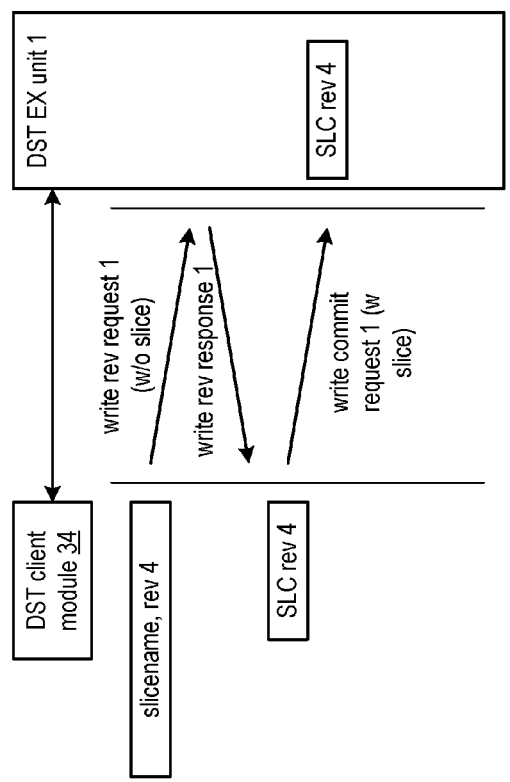
Figure 43E:
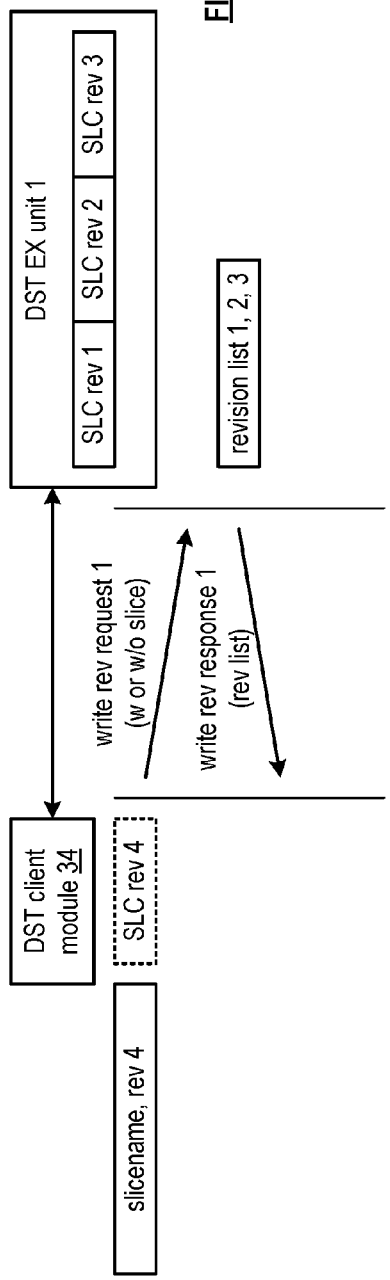
Figure 43F:
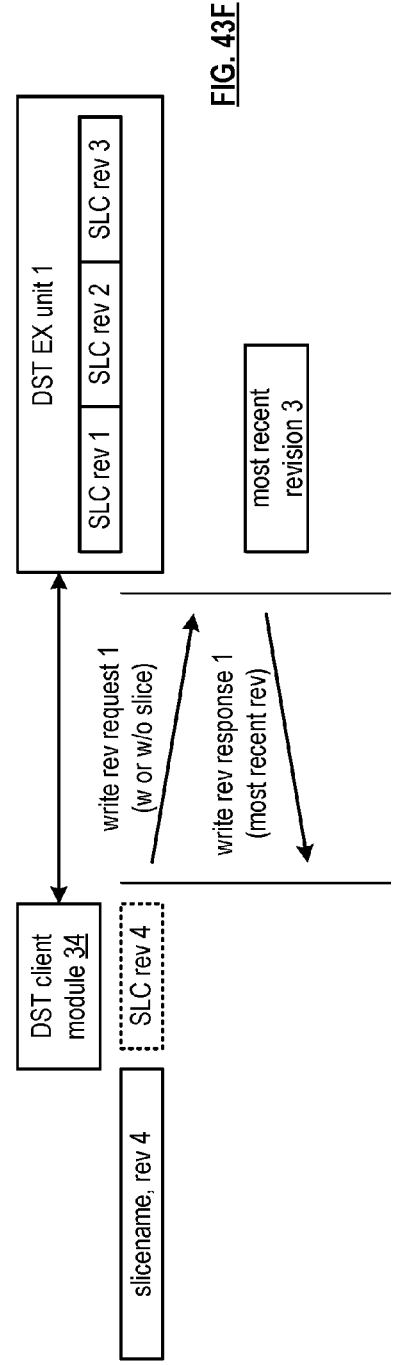
Figure 43I:
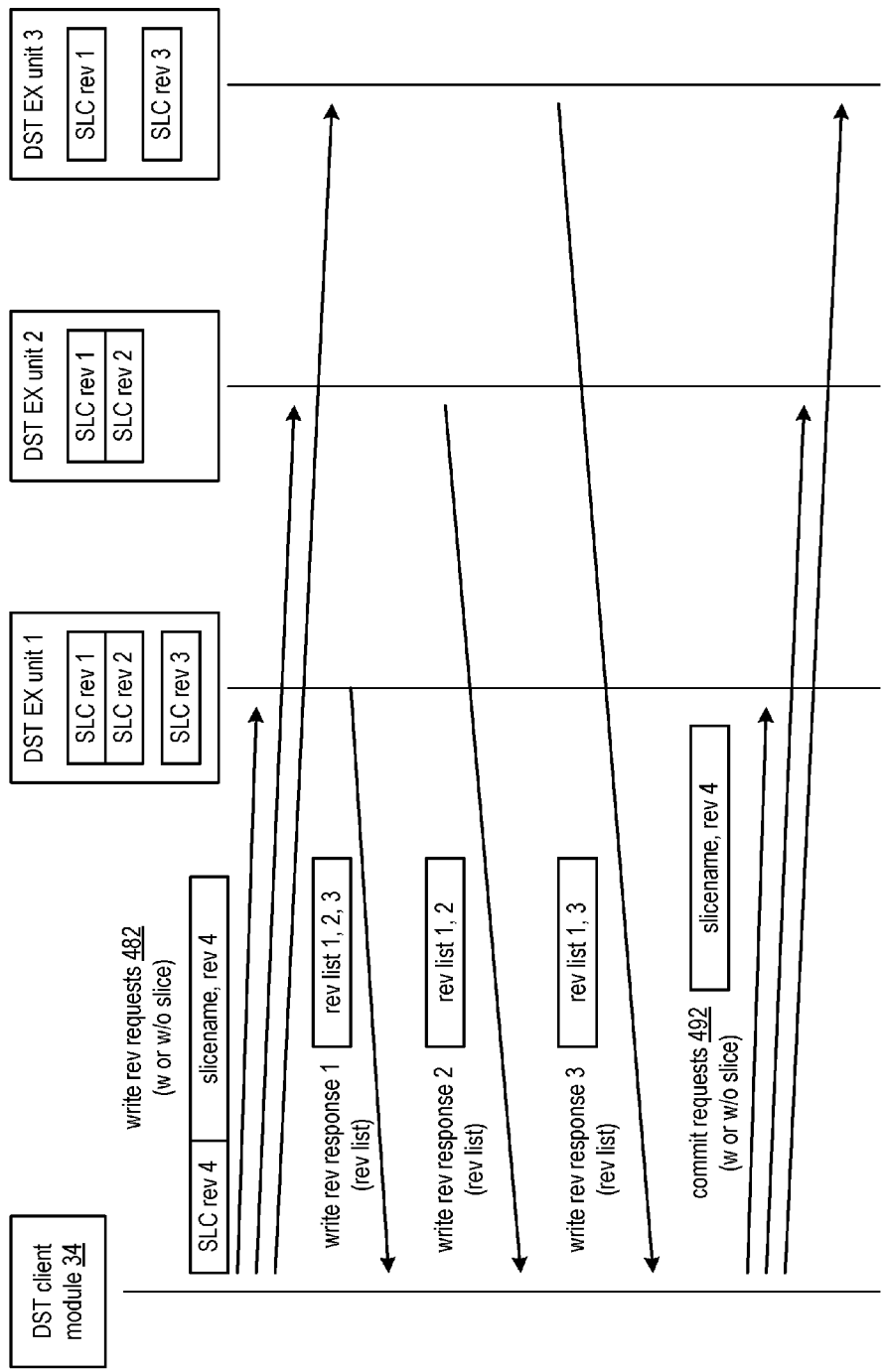
Figure 43J:
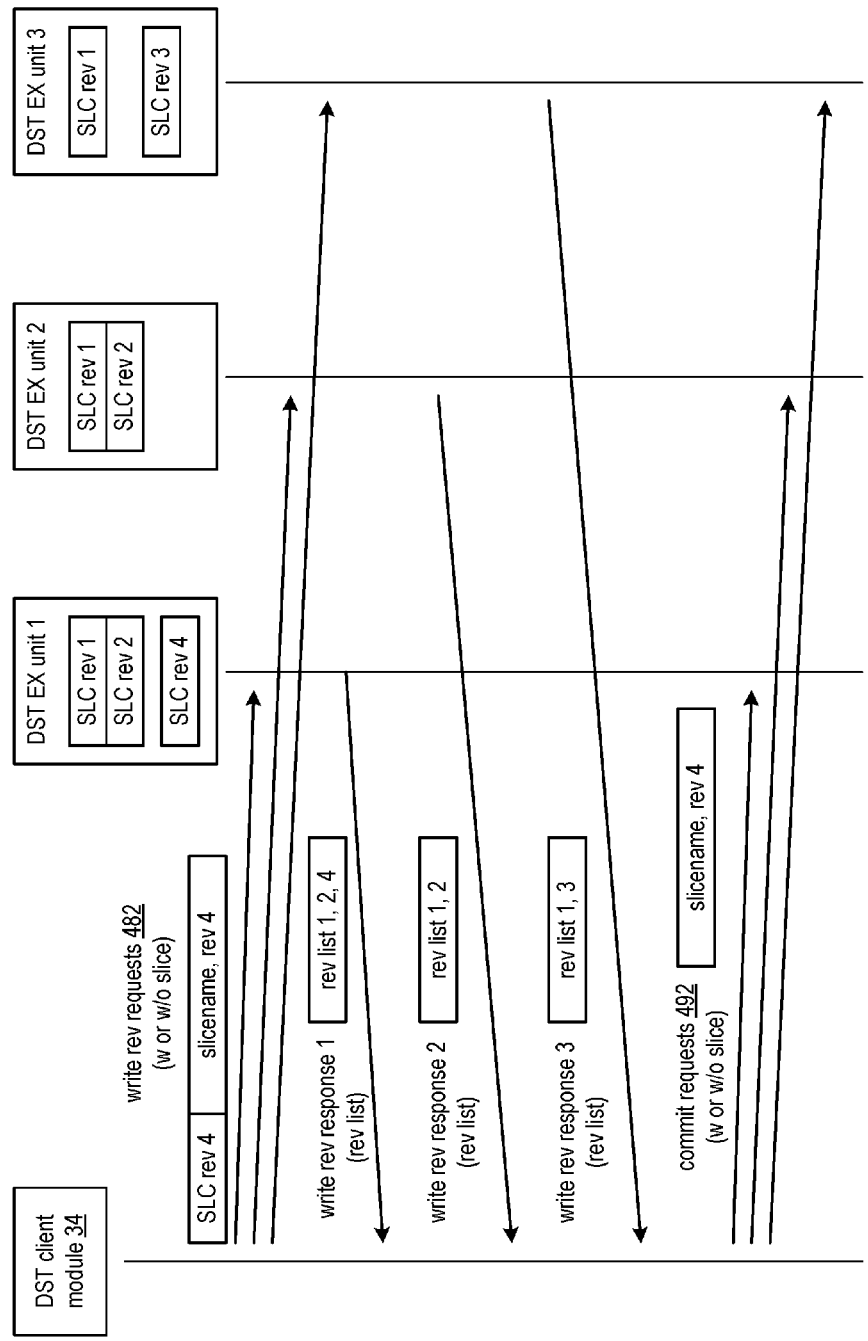
Figure 43K:
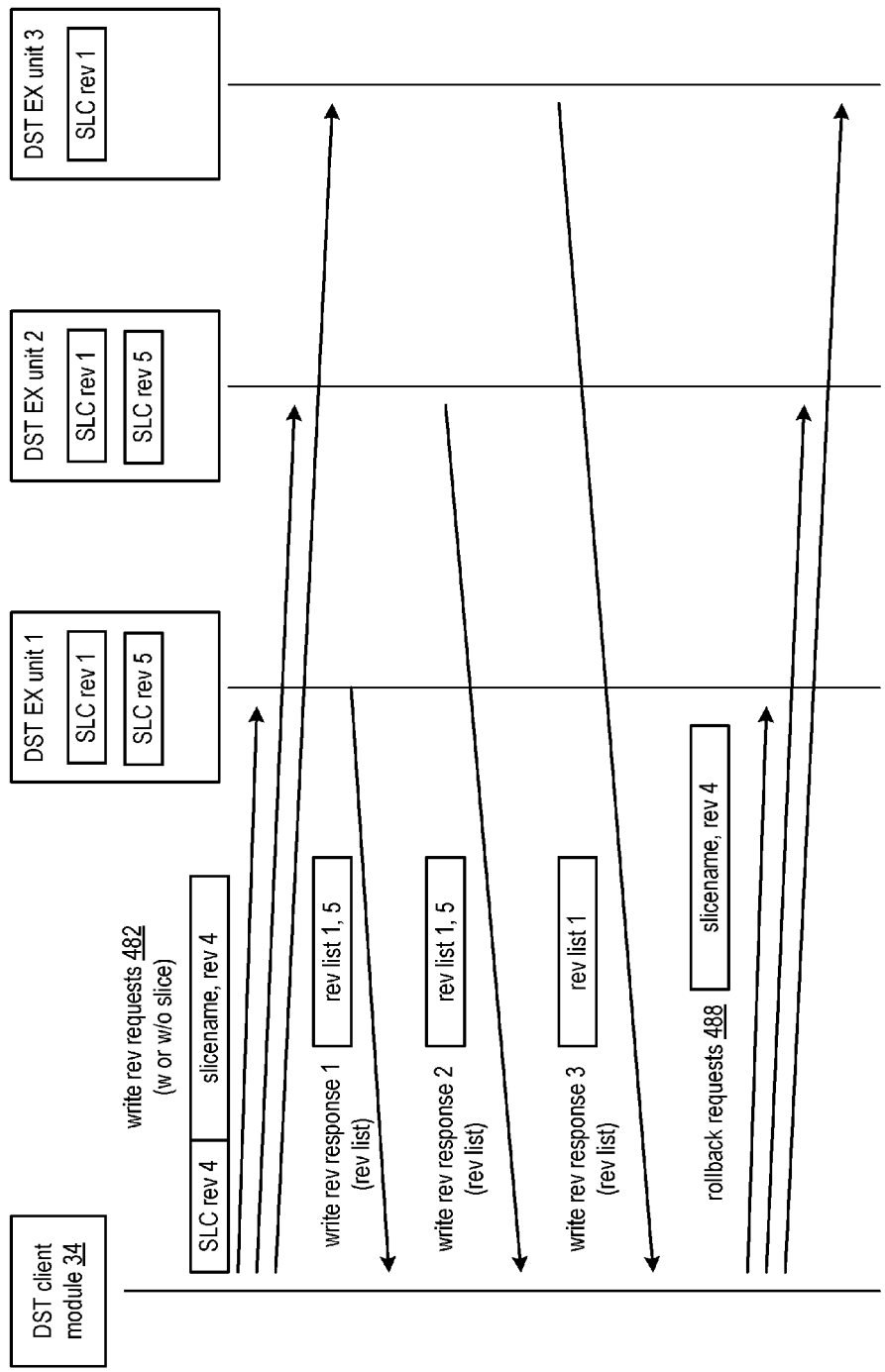
Figure 43L:
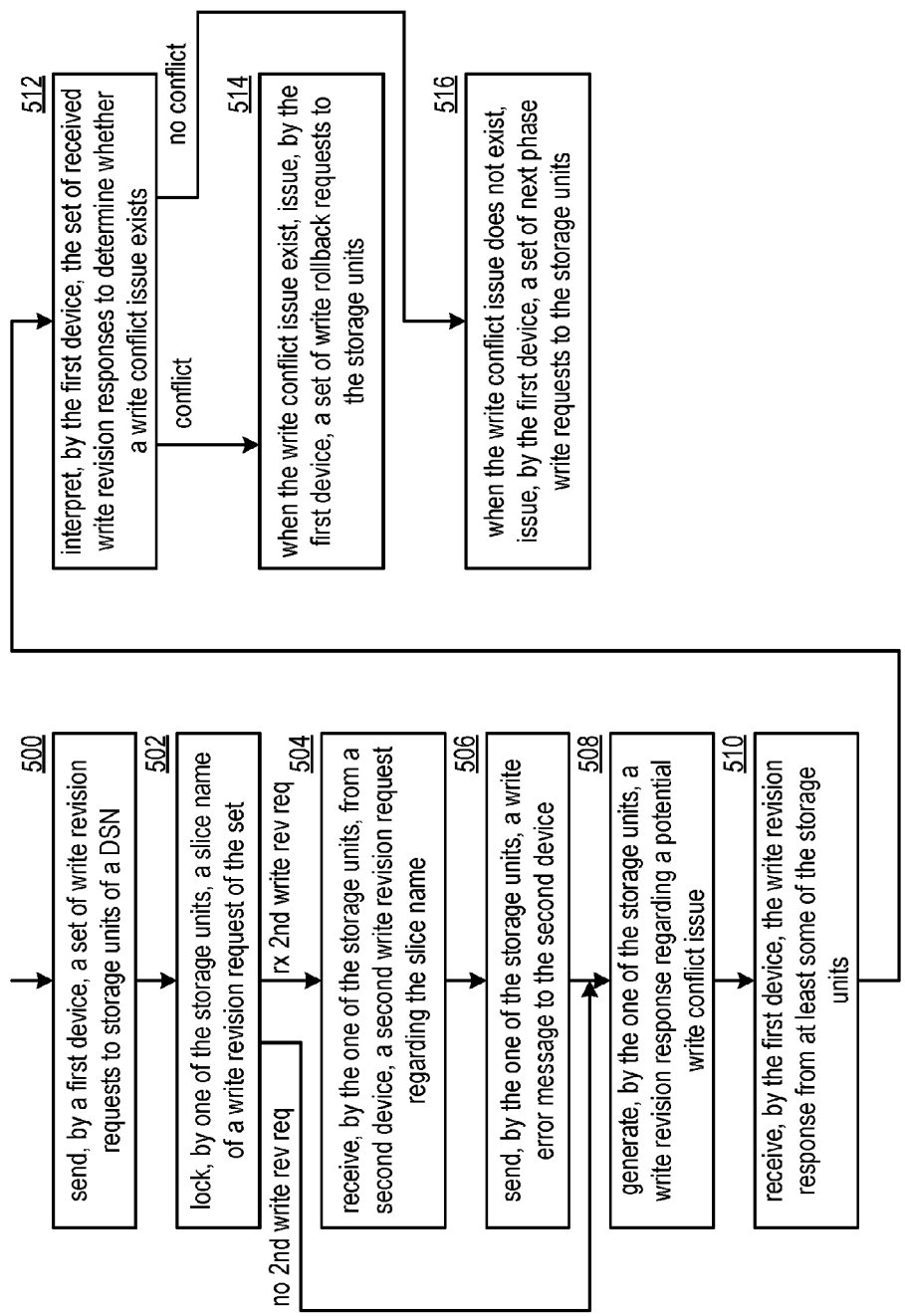
Figure 44A:
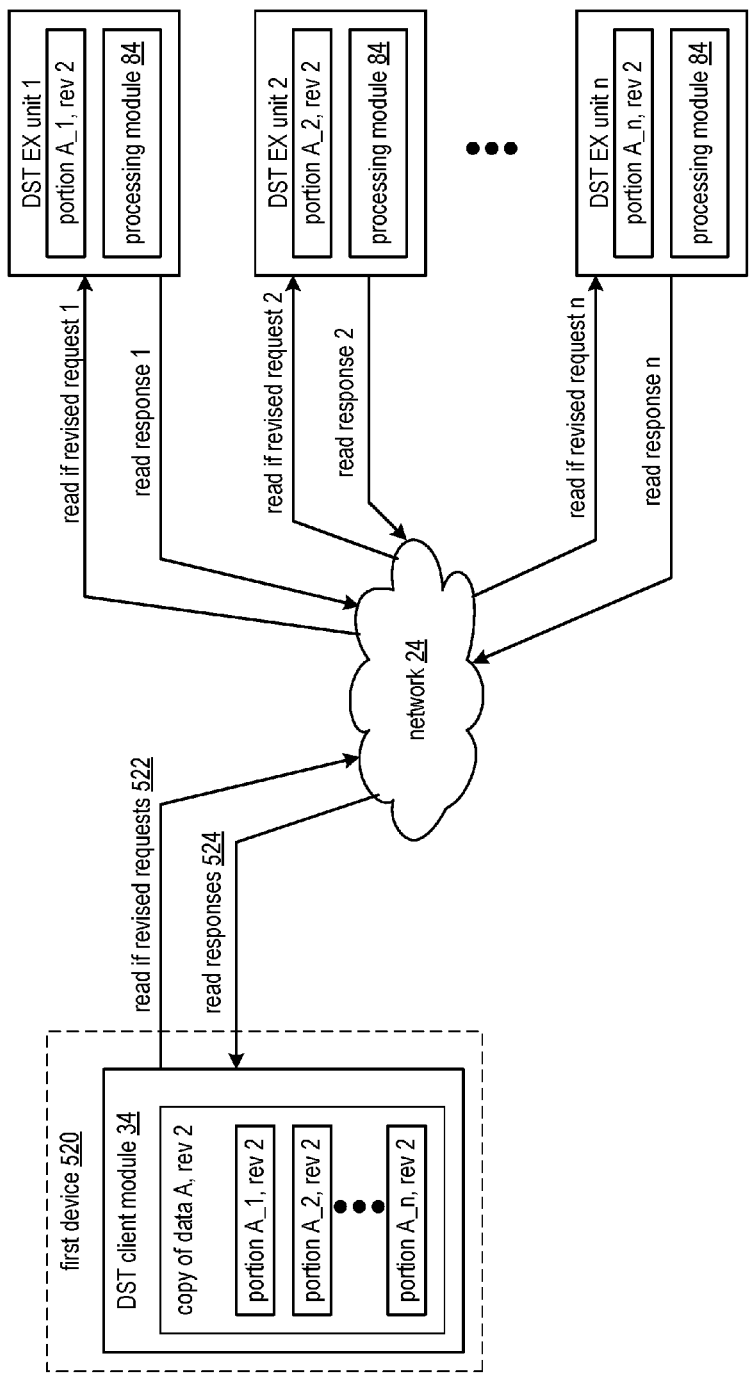
Figure 44B:
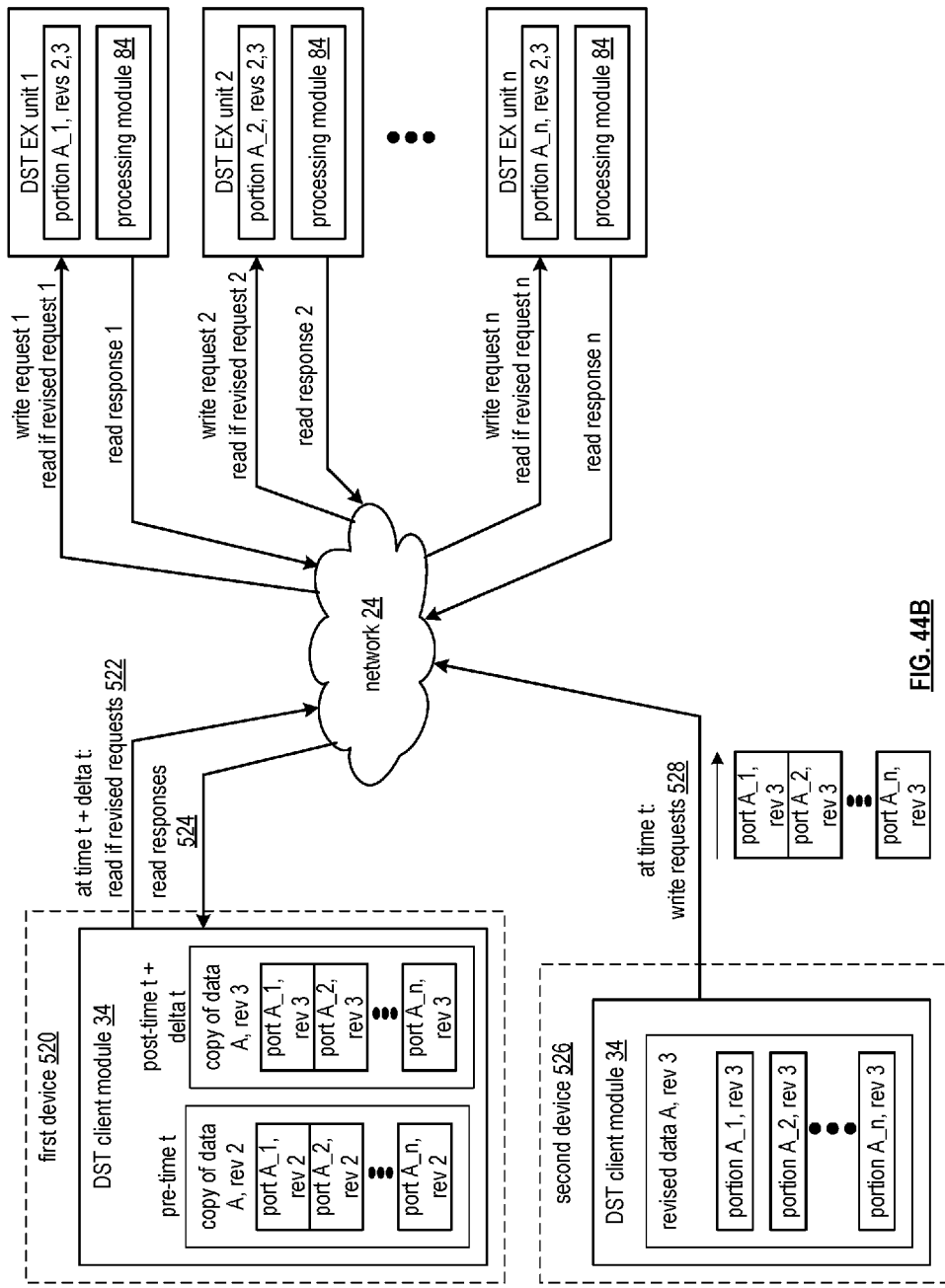
Figure 44E:
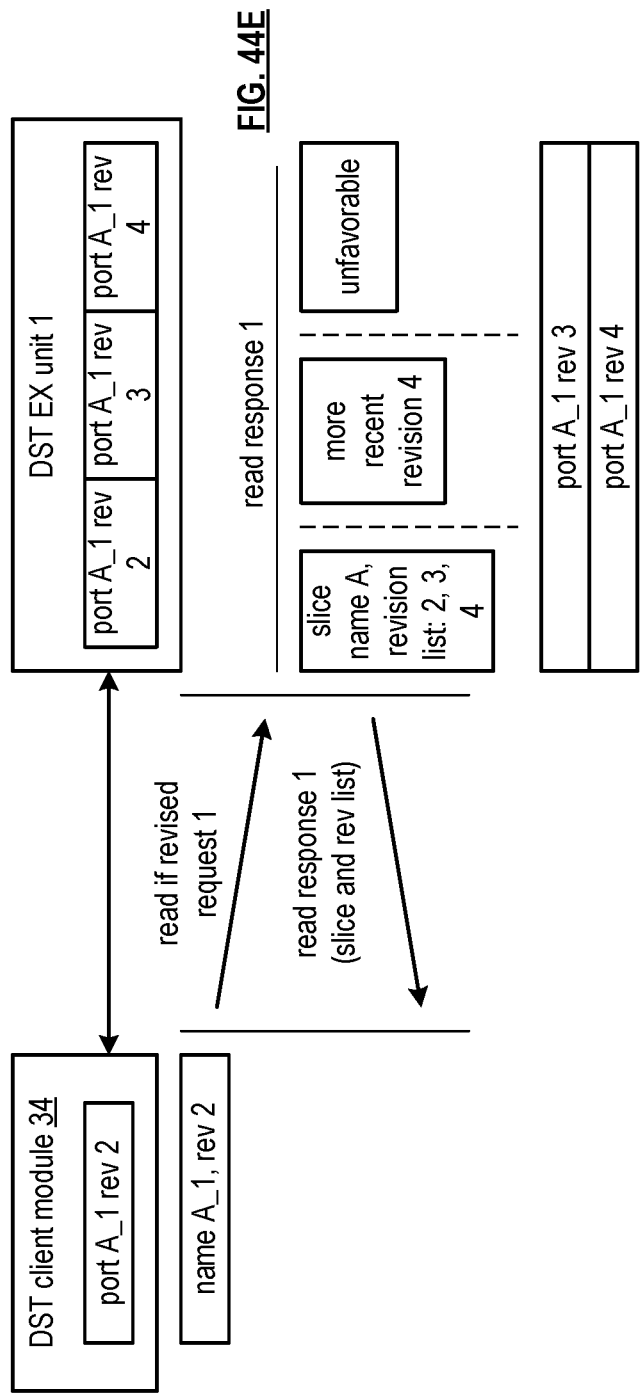
Figure 44F:
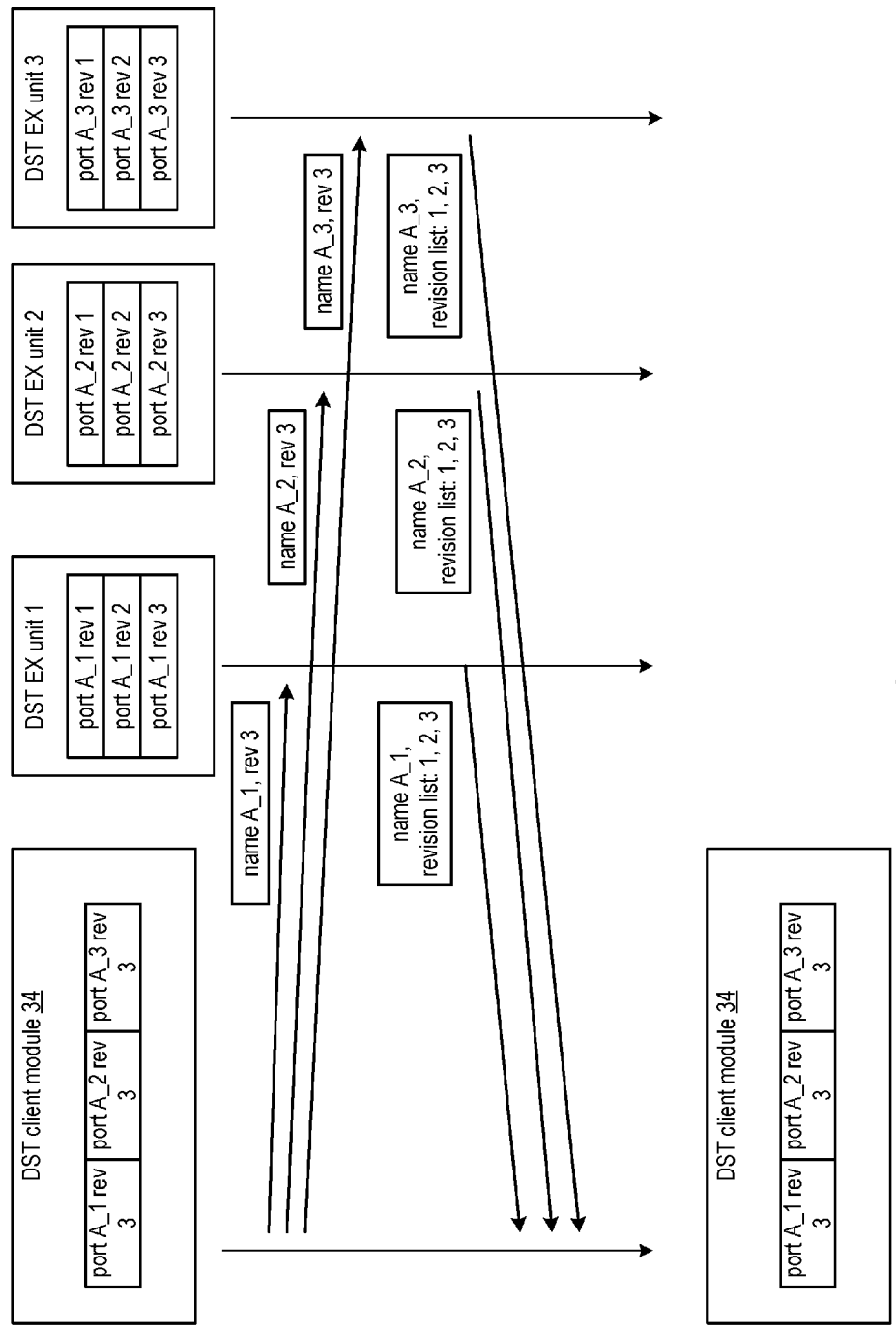
Figure 44G:
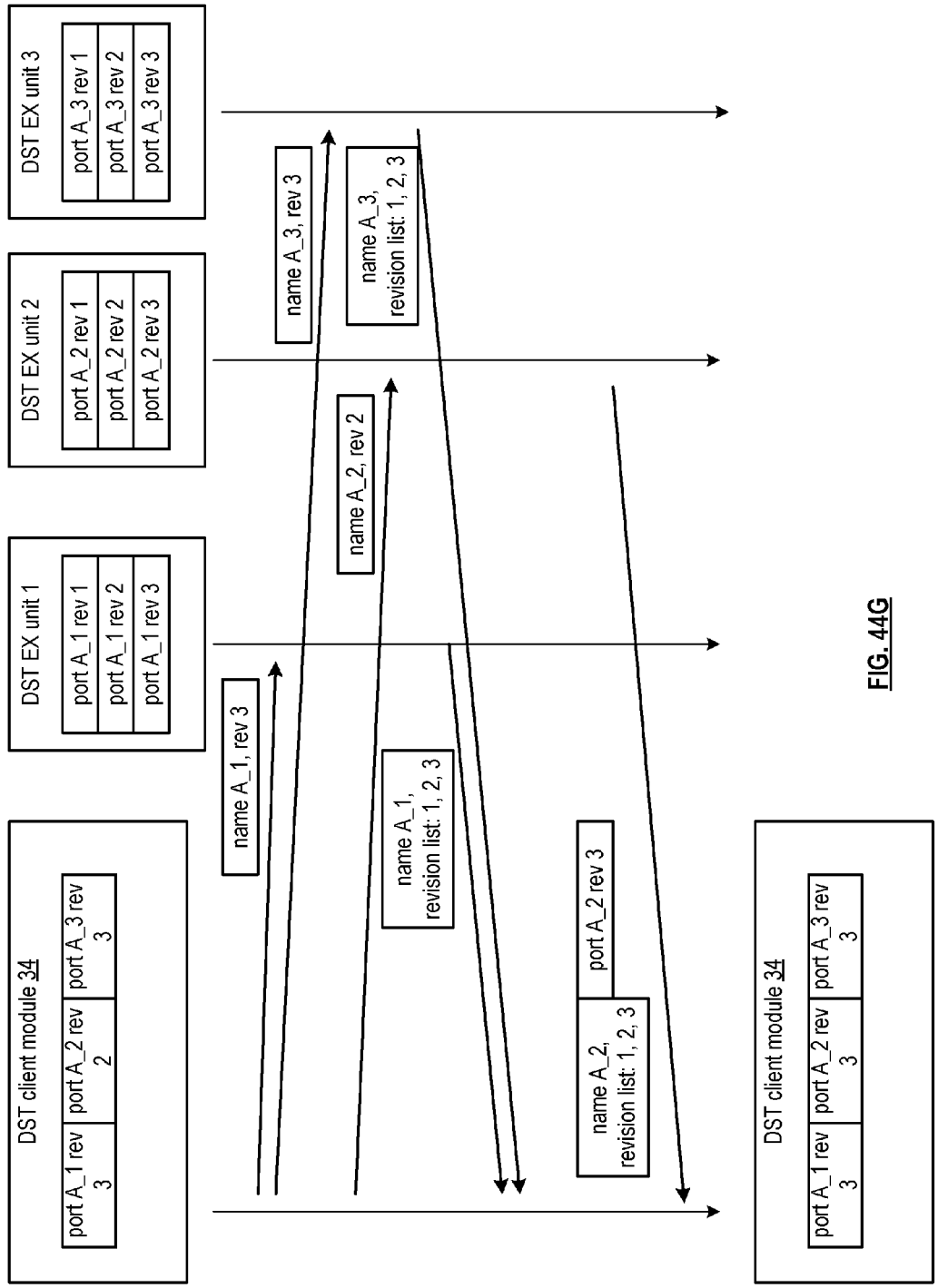
Figure 44H:
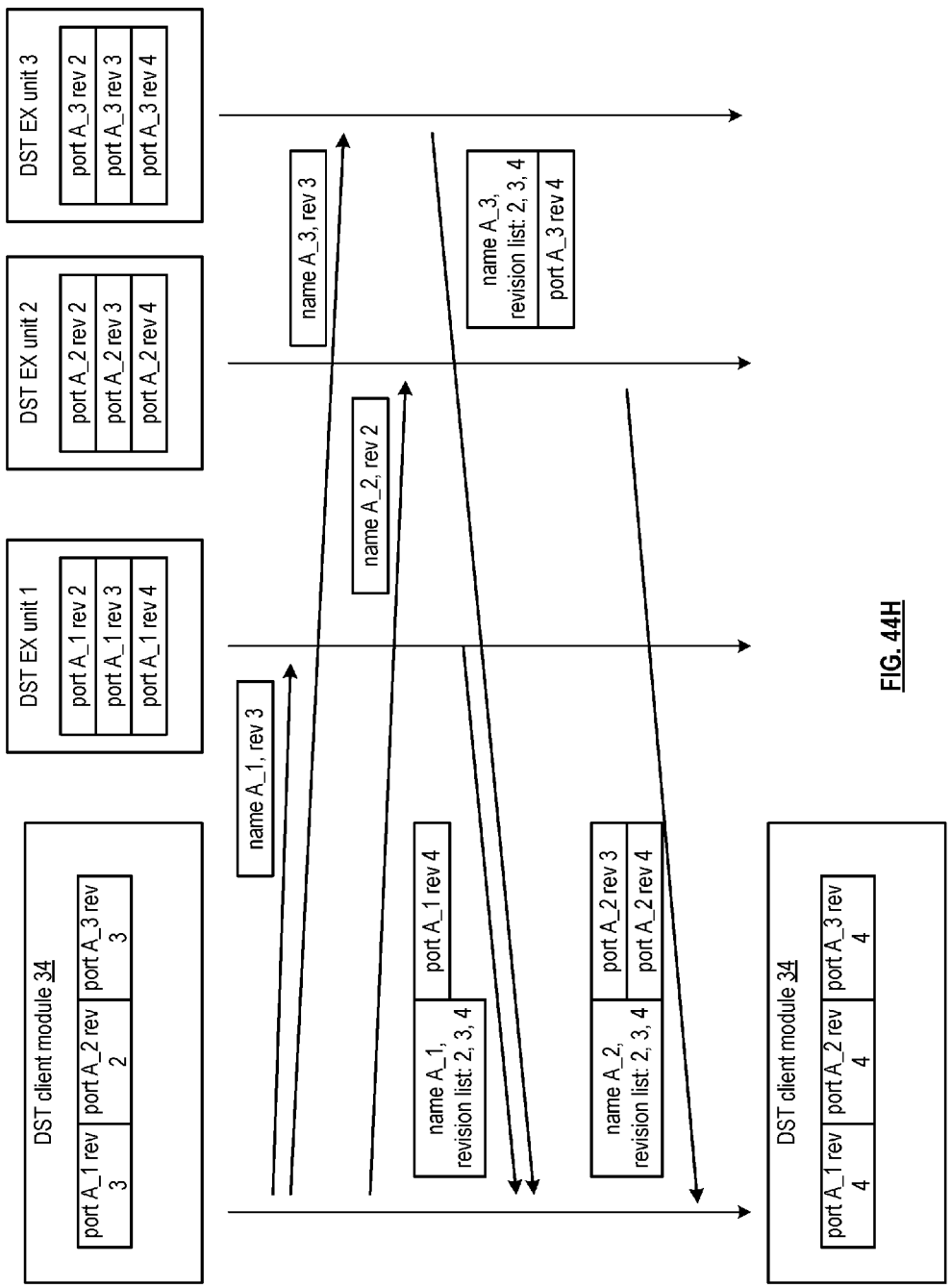
Figure 44I:
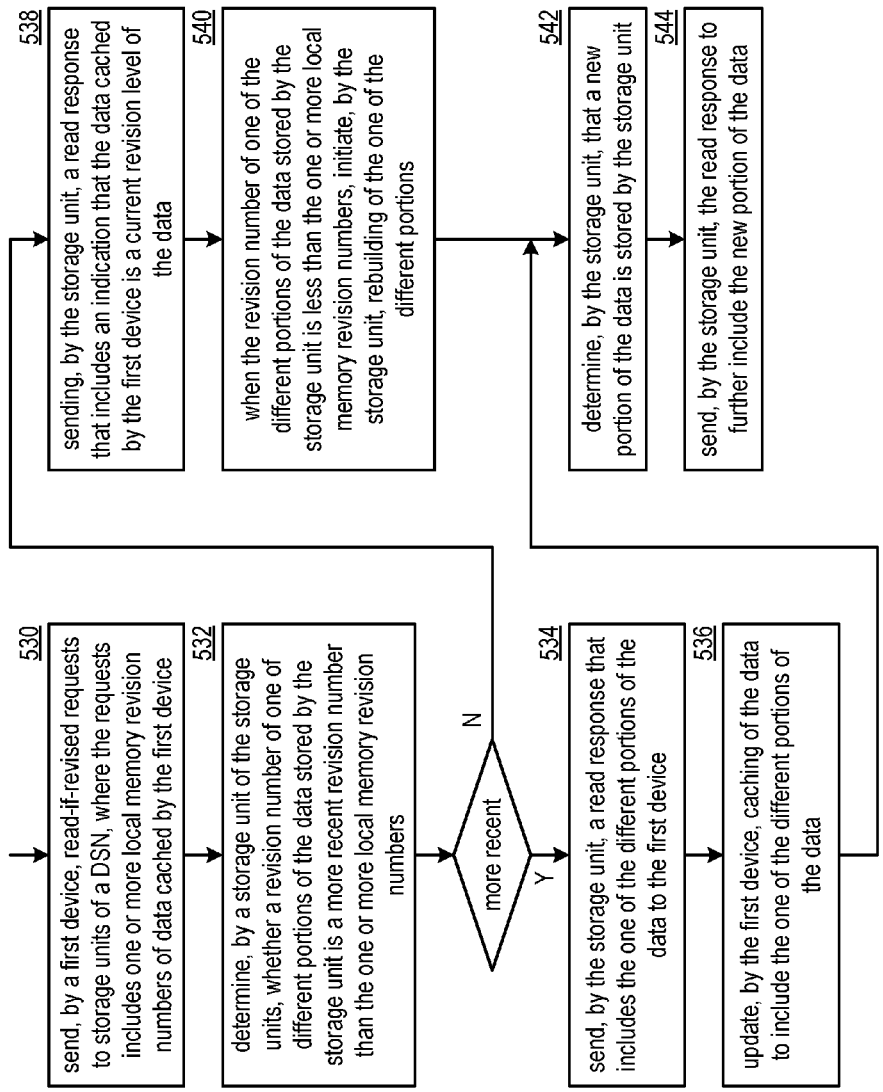
Figure 45A:
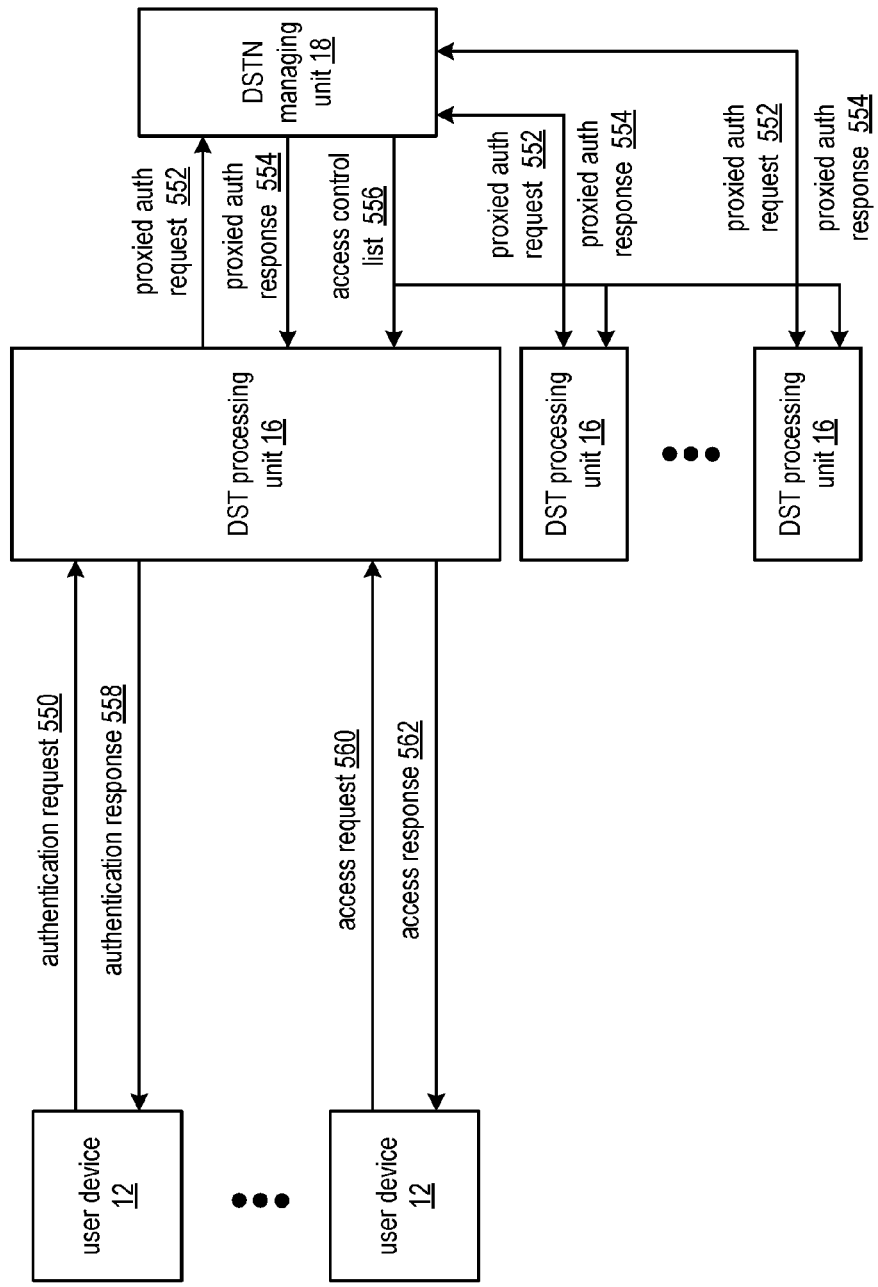
Figure 45B:
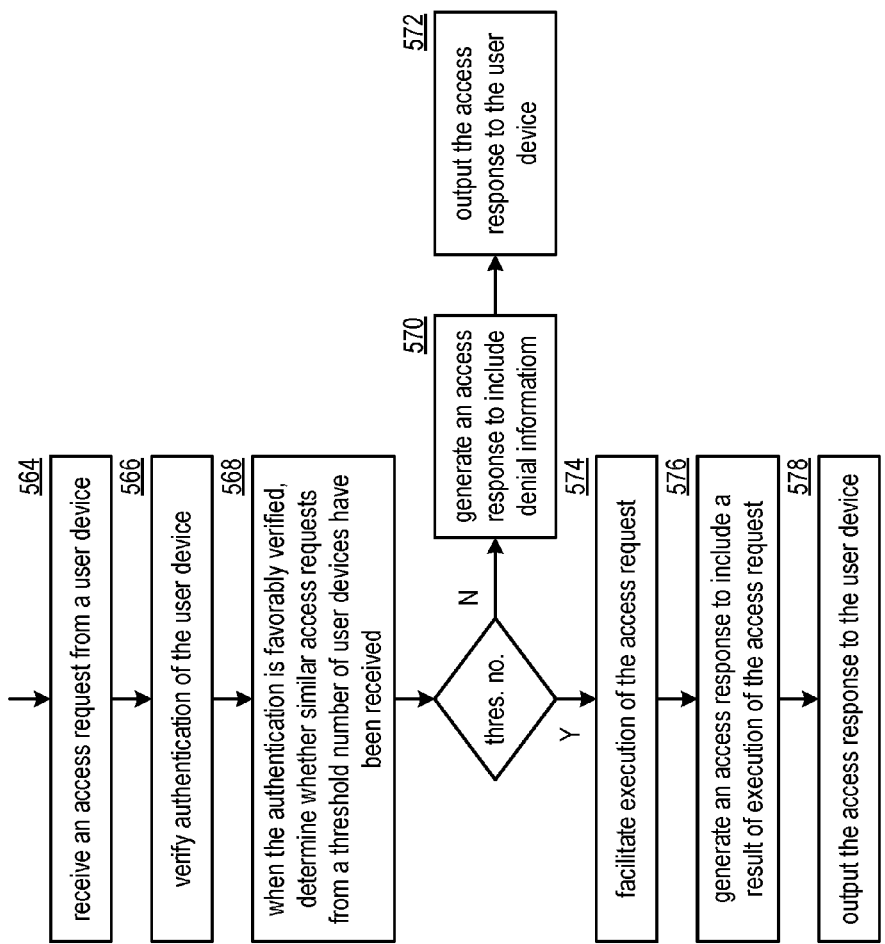
Figure 46A:
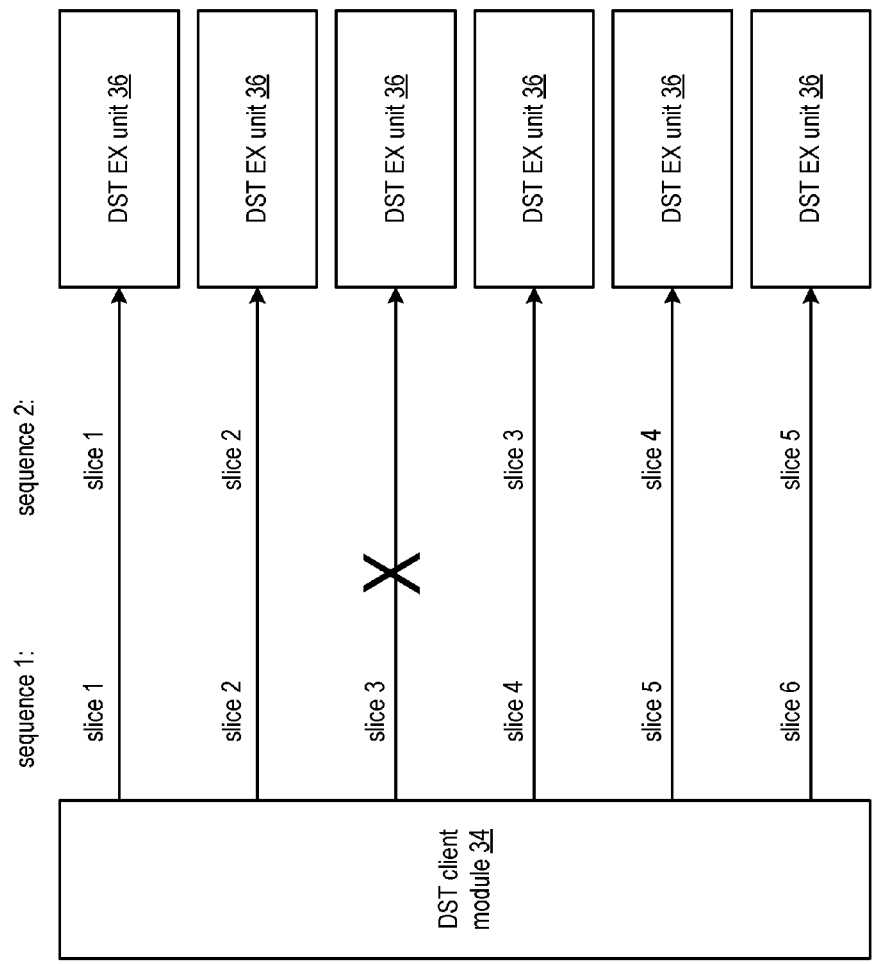
Figure 46B:
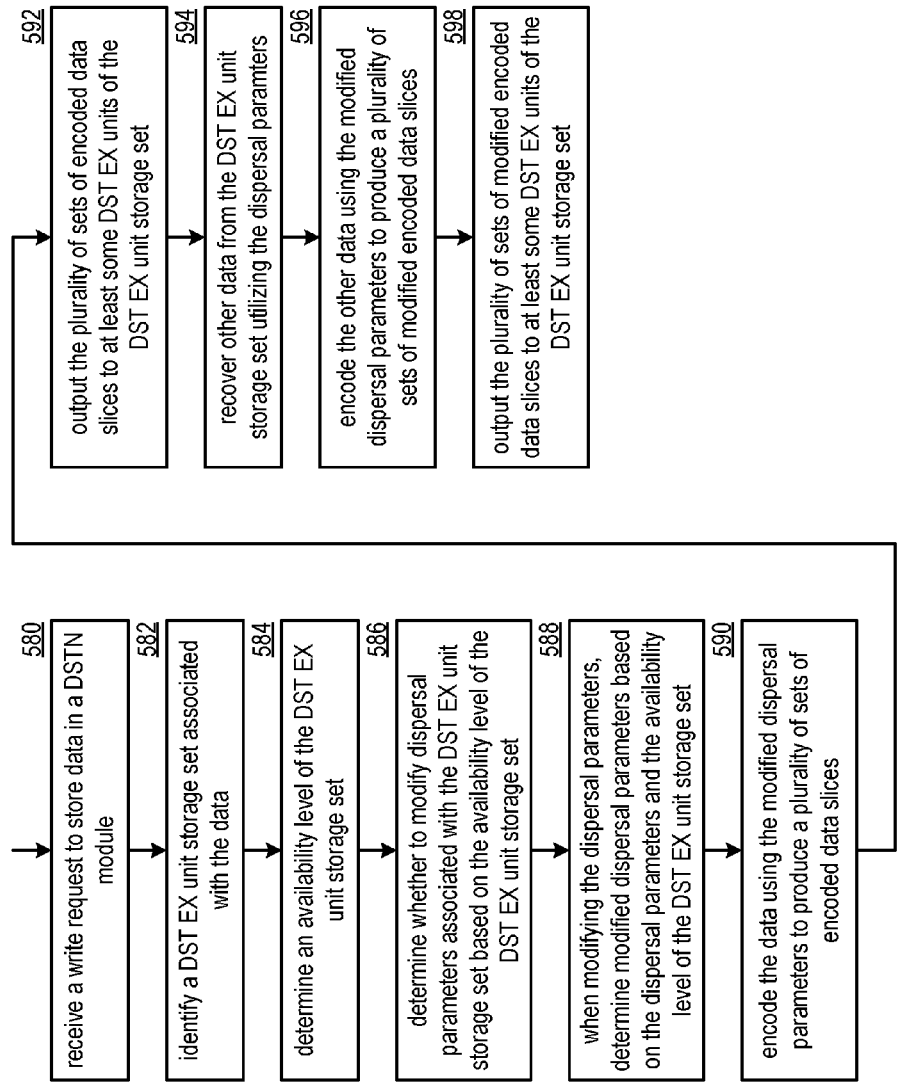
Figure 47:
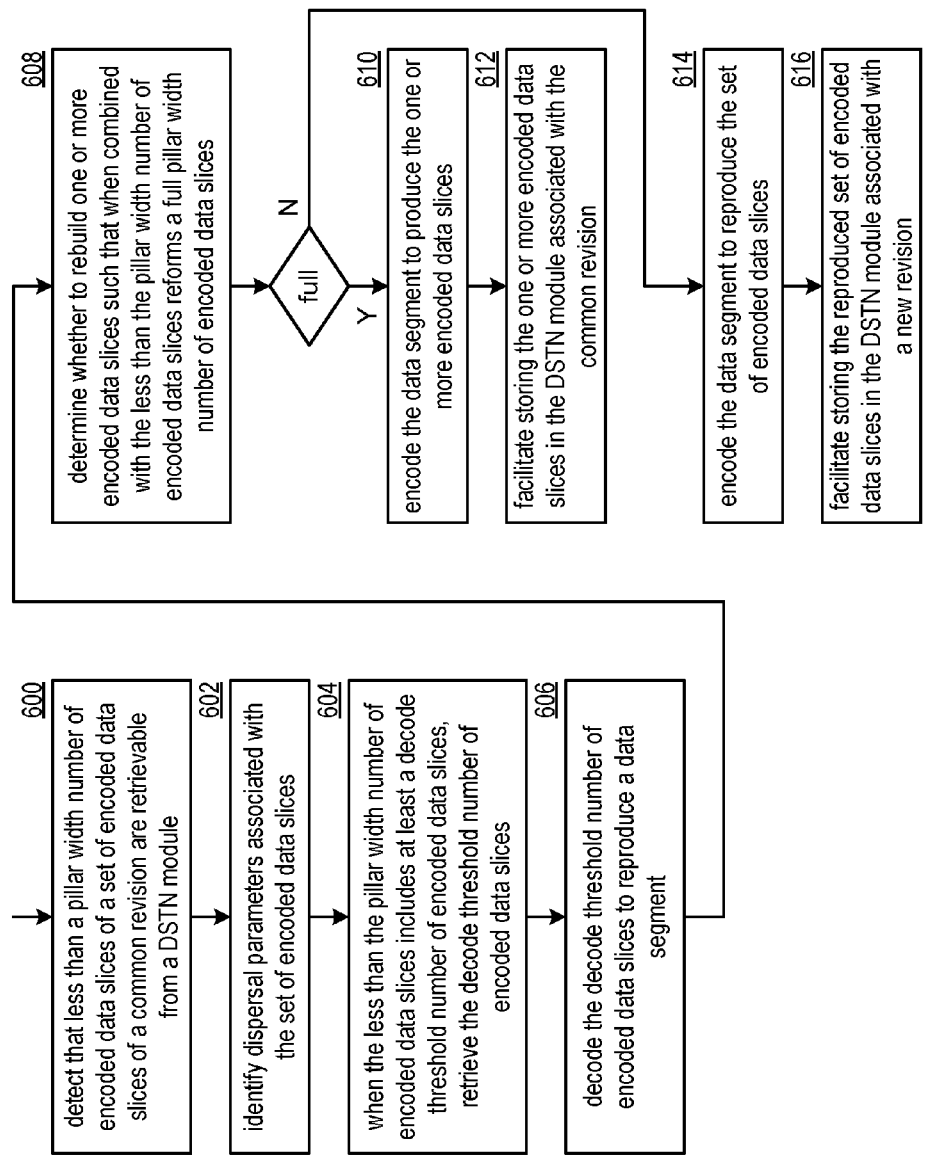
Figure 48A:
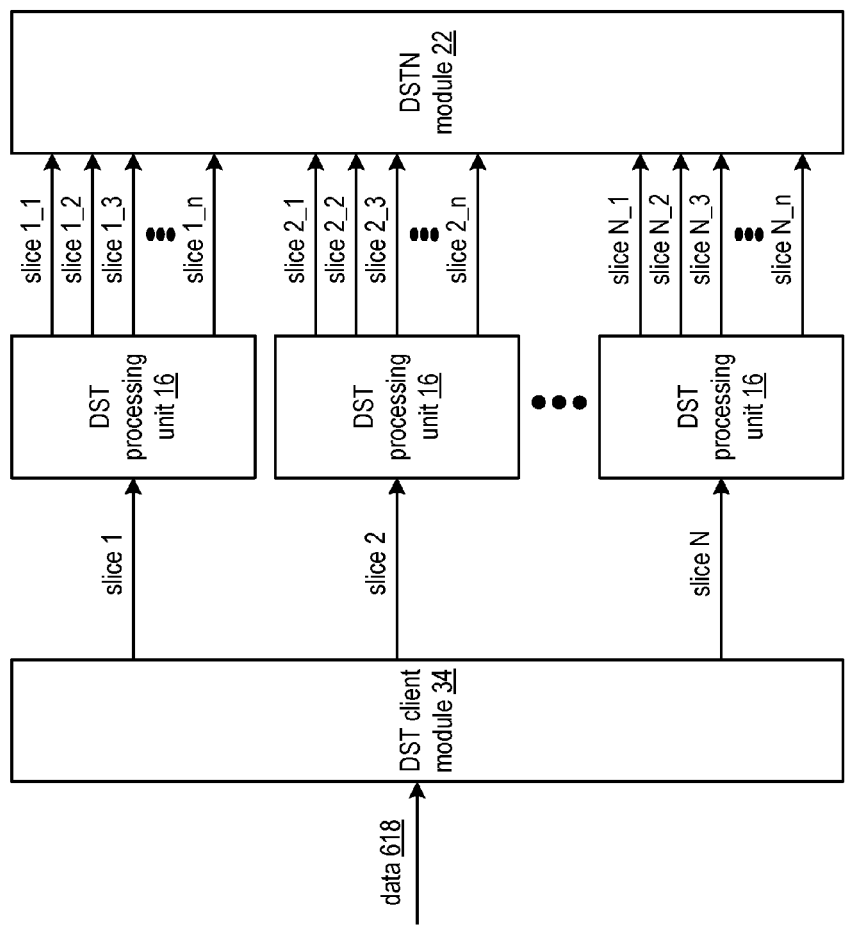
Figure 48B:
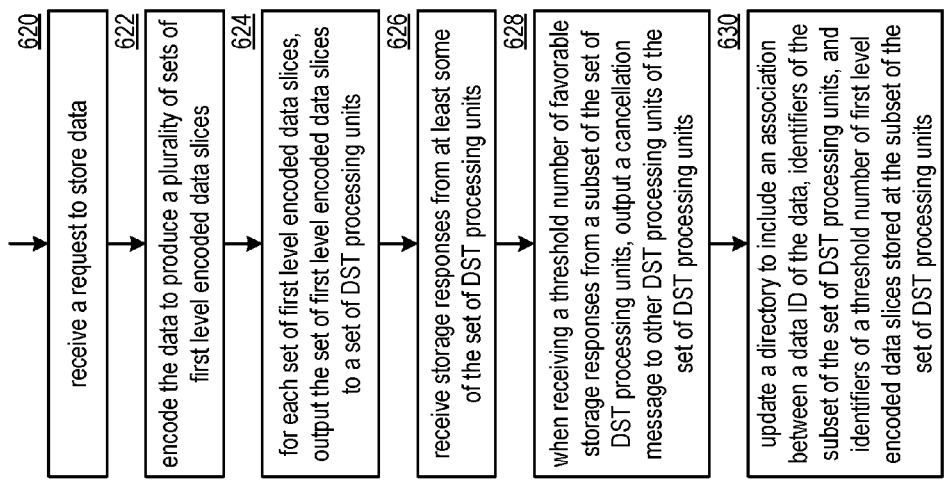

FIGS. 43A-B are schematic block diagrams of embodiments of a dispersed storage network (DSN) in accordance with the present invention;

FIGS. 43C-D are timing diagrams illustrating examples of timing of writing data in accordance with the present invention;

FIGS. 43E-H are timing diagrams illustrating examples of timing of responses to writing of data in accordance with the present invention;

FIGS. 43I-K are timing diagrams illustrating examples of writing data to a set of storage units in accordance with the present invention;

FIG. 43L is a flowchart illustrating an example of storing data in accordance with the present invention;

FIGS. 44A-B are schematic block diagrams of more embodiments of a dispersed storage network (DSN) in accordance with the present invention;

FIGS. 44C-E are timing diagrams illustrating examples of timing of reading data in accordance with the present invention;

FIGS. 44F-H are timing diagrams illustrating examples of reading data from a set of storage units in accordance with the present invention;

FIG. 44I is a flowchart illustrating an example of reading data in accordance with the present invention;

FIG. 45A is a schematic block diagram of another embodiment of a distributed computing system in accordance with the present invention;

FIG. 45B is a flowchart illustrating an example of authorizing an access request in accordance with the present invention;

FIG. 46A is a schematic block diagram of another embodiment of a distributed computing system in accordance with the present invention;

FIG. 46B is a flowchart illustrating another example of storing data in accordance with the present invention;

FIG. 47 is a flowchart illustrating an example of rebuilding data in accordance with the present invention;

FIG. 48A is a schematic block diagram of another embodiment of a distributed computing system in accordance with the present invention; and FIG. 48B is a flowchart illustrating another example of storing data in accordance with the present invention.

DETAILED DESCRIPTION OF THE INVENTION

Figure 1:
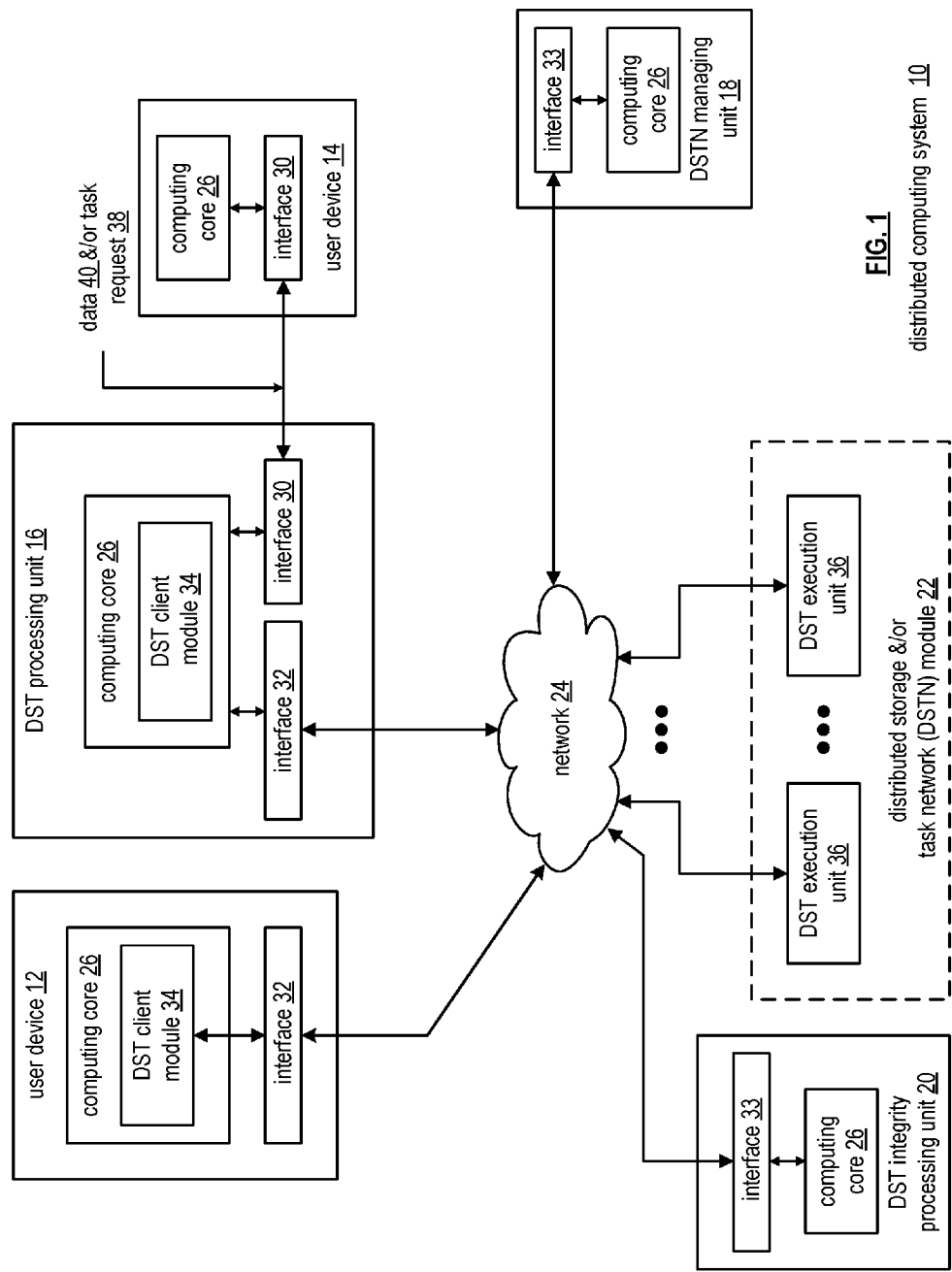
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
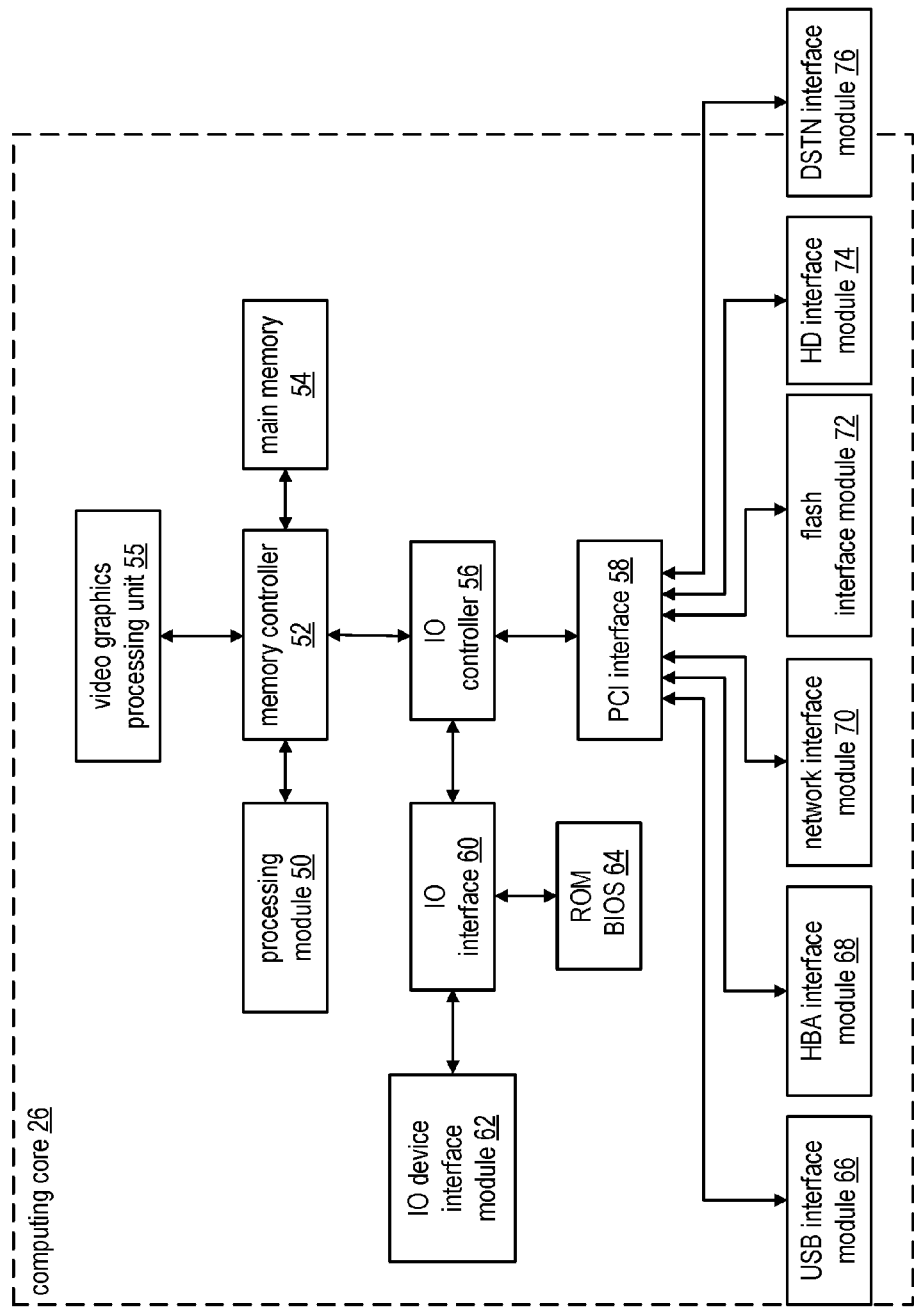
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
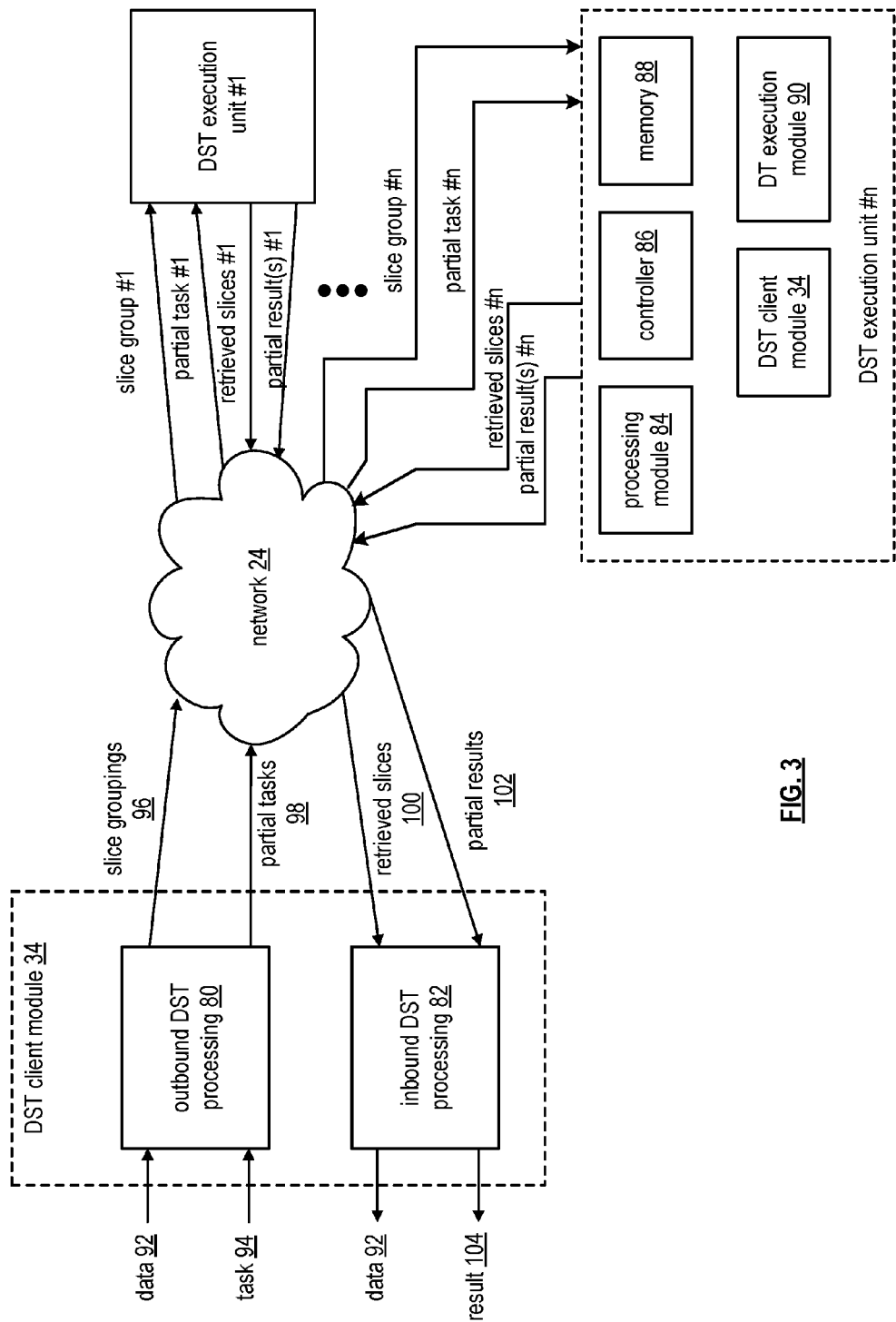
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-*n*.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
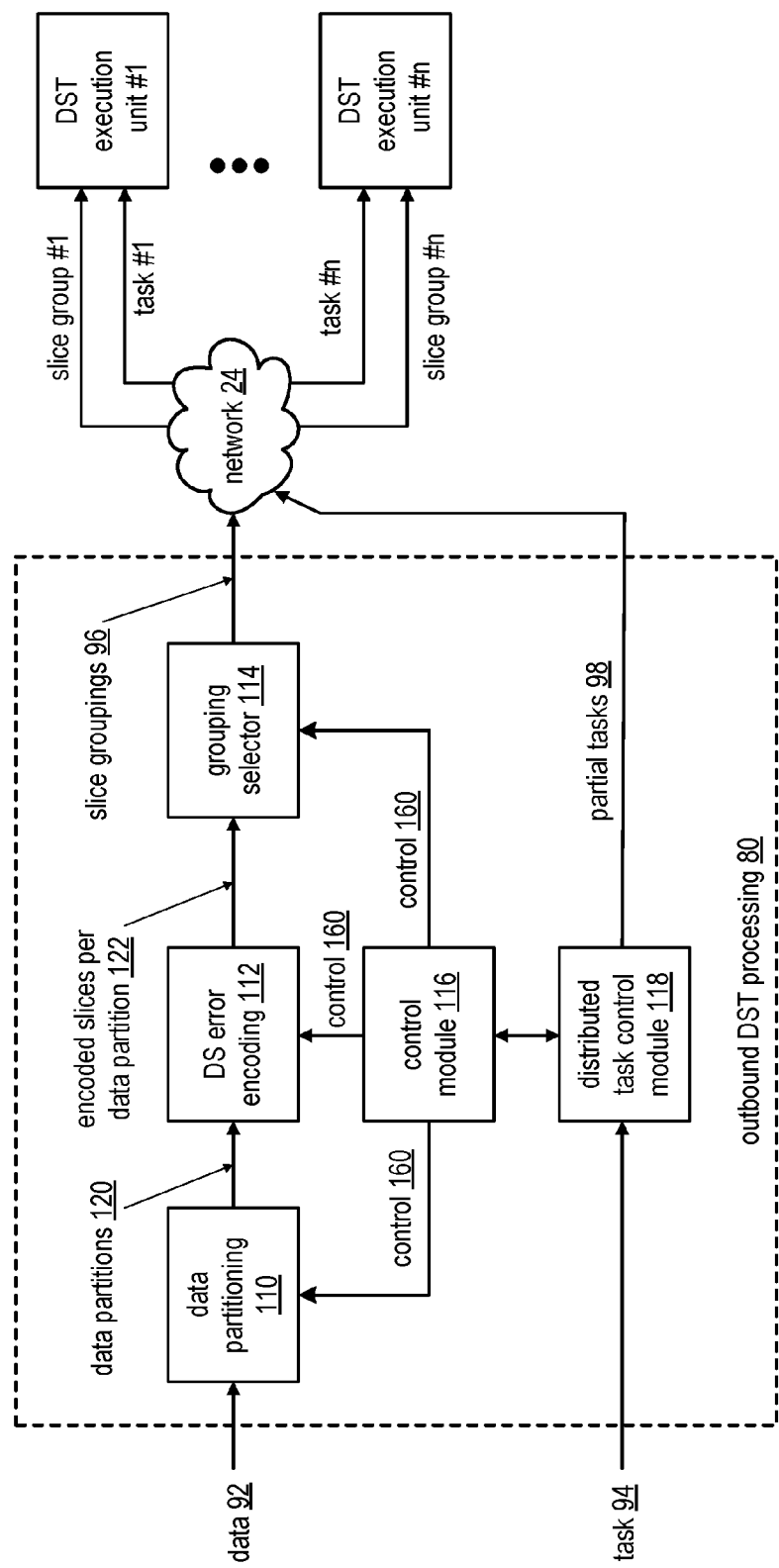
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terra-Bytes) into 100,000 data segments, each being 1 Giga-Byte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, wherein in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
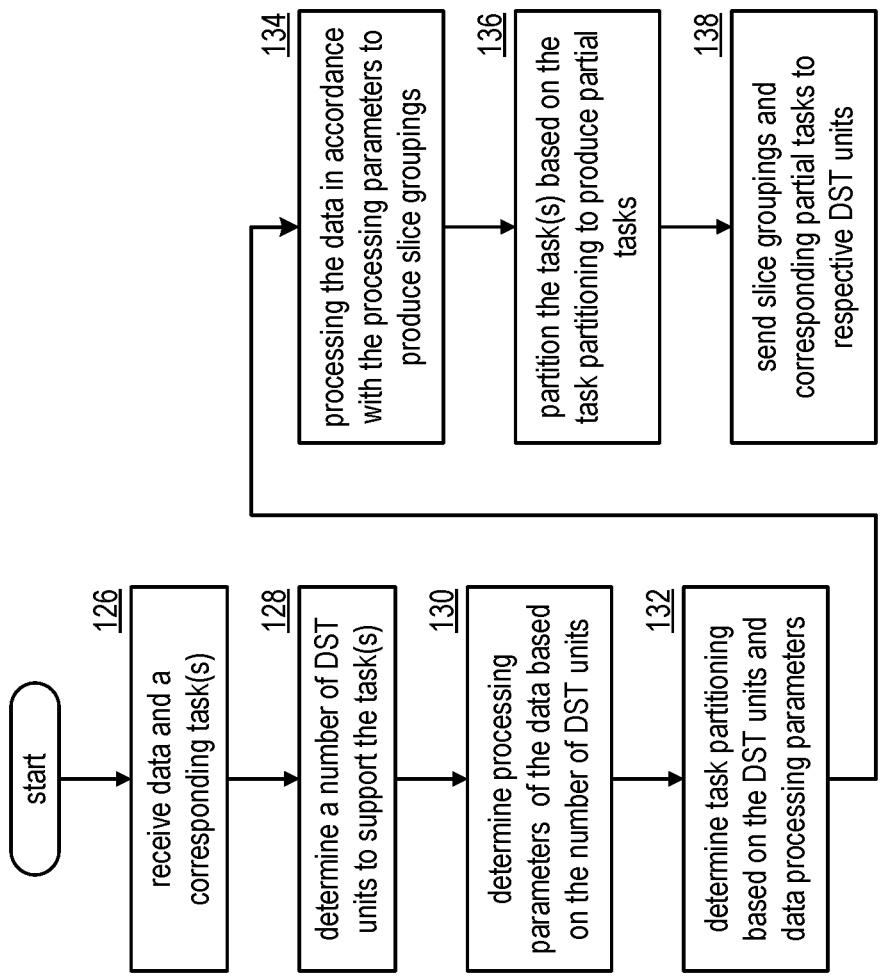
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
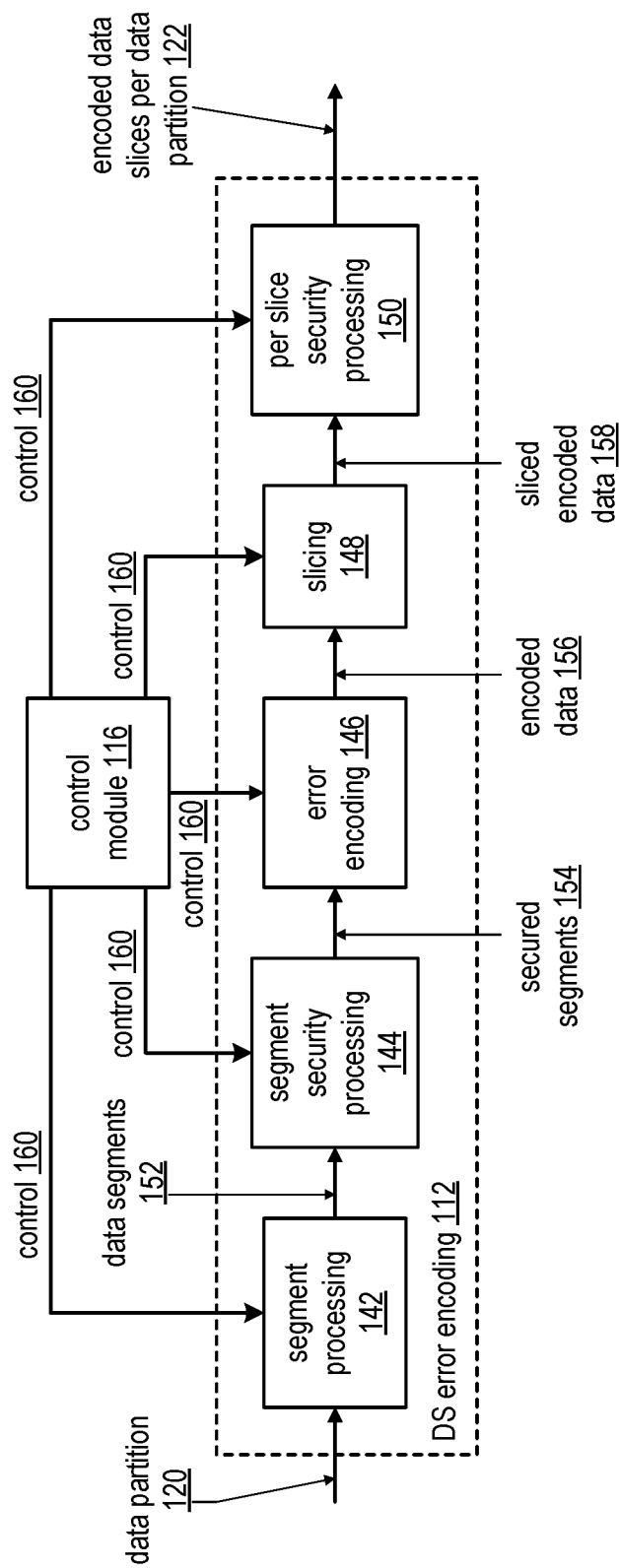
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
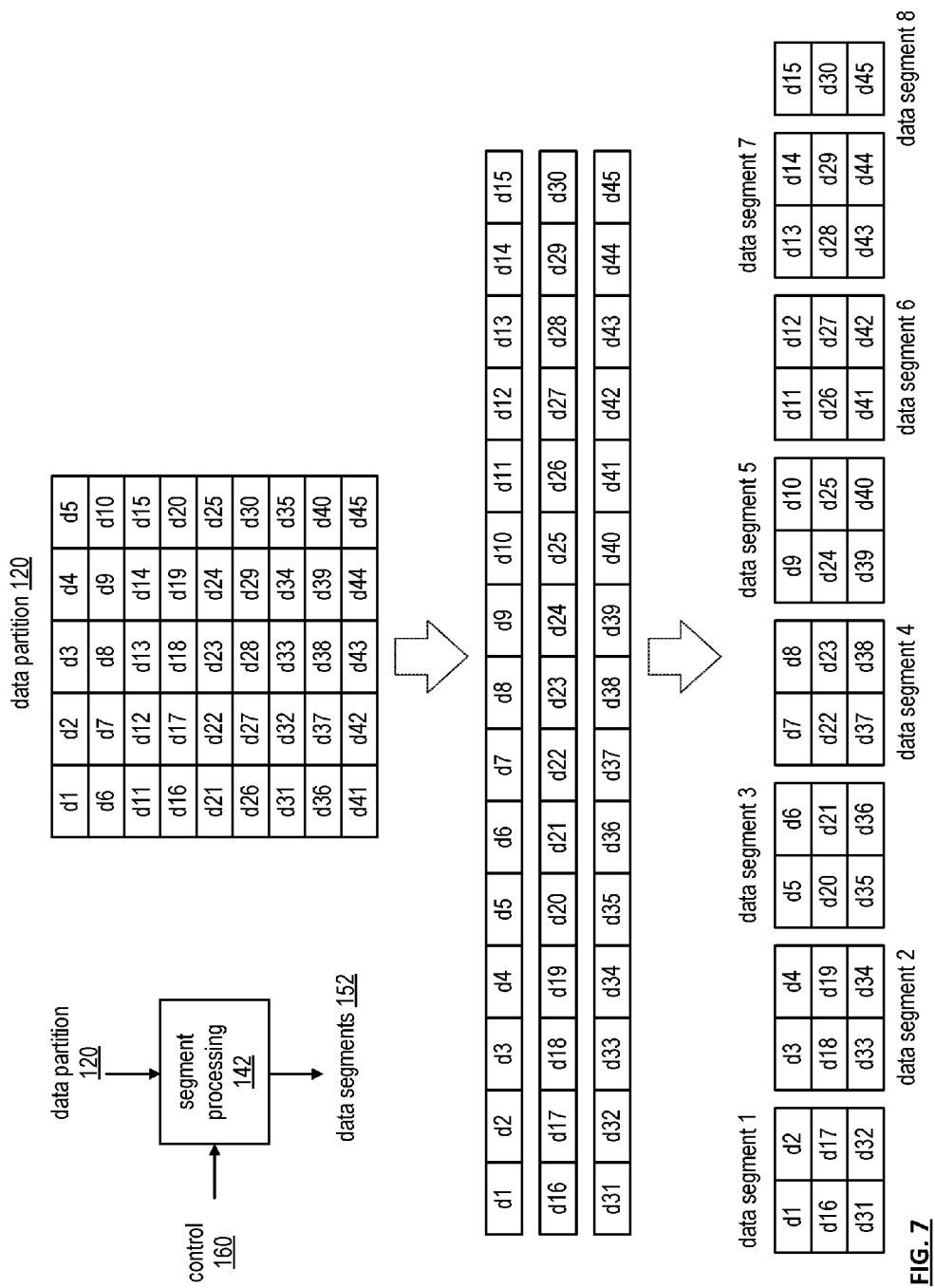
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
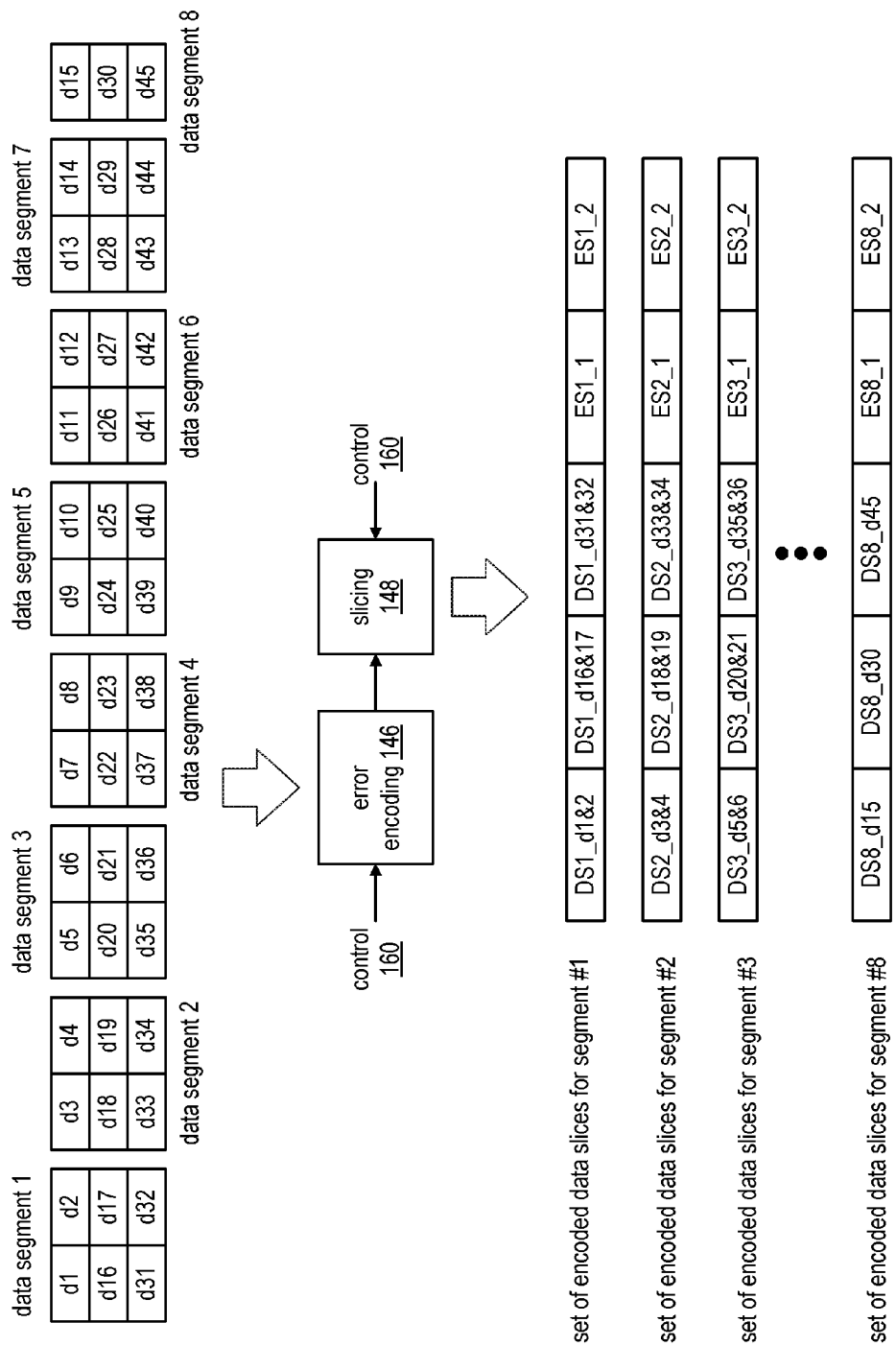
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
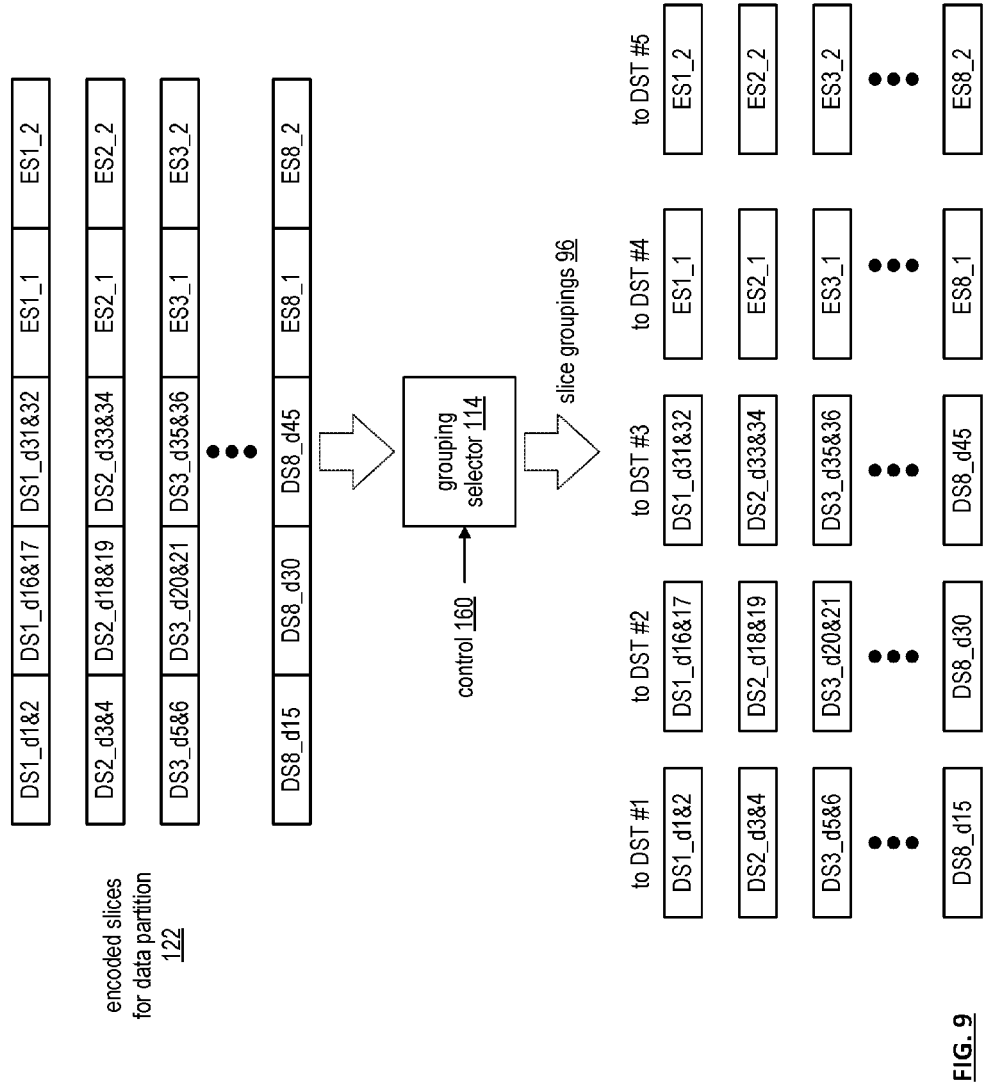
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with grouping selector information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
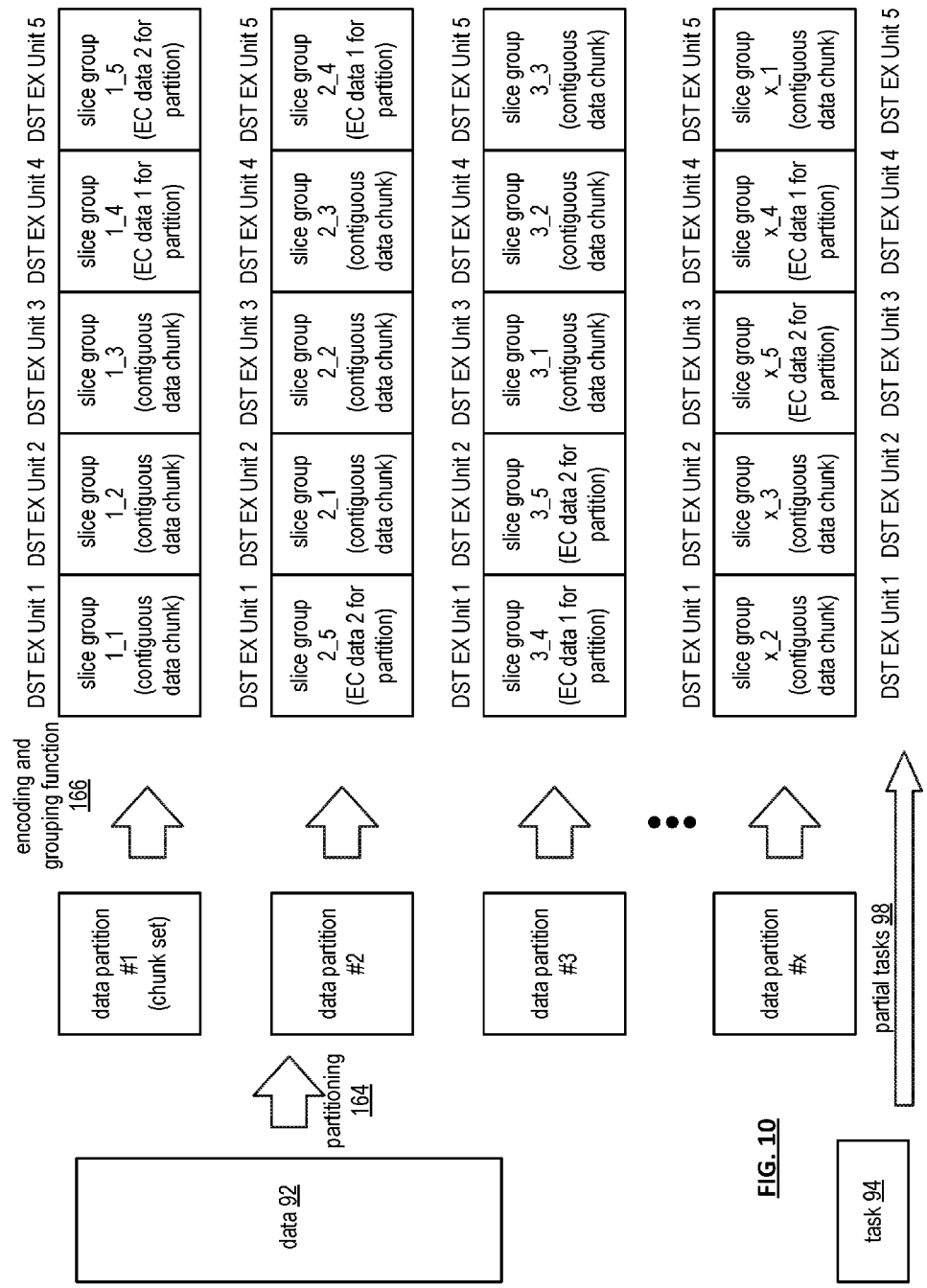
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-*x*, where x is an integer greater than 4). Each data partition (or chunkset of data) is encoded and grouped into slice groupings as previously discussed by an encoding and grouping function 166. For a given data partition, the slice groupings are sent to distributed storage and task (DST)

execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
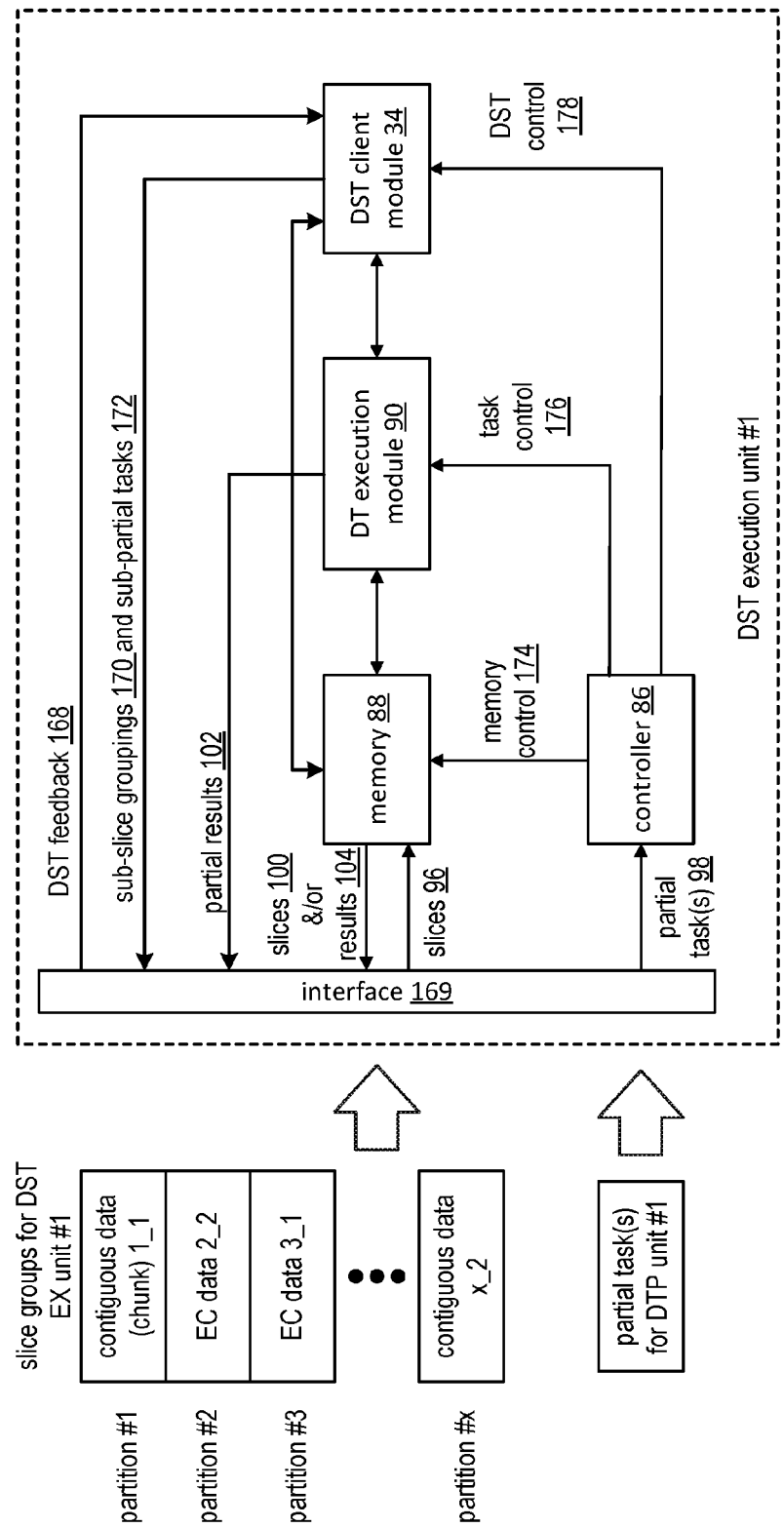
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
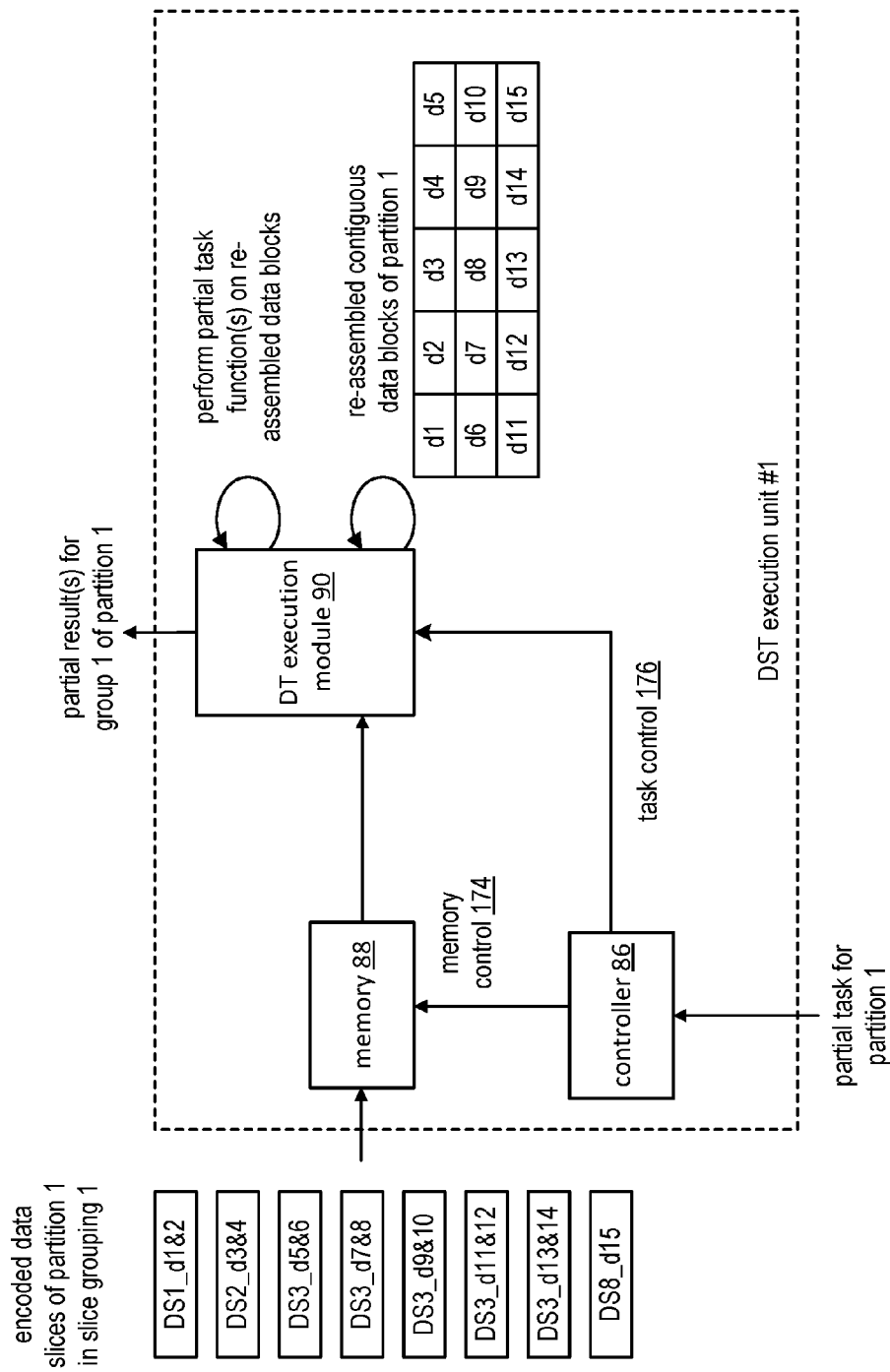
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
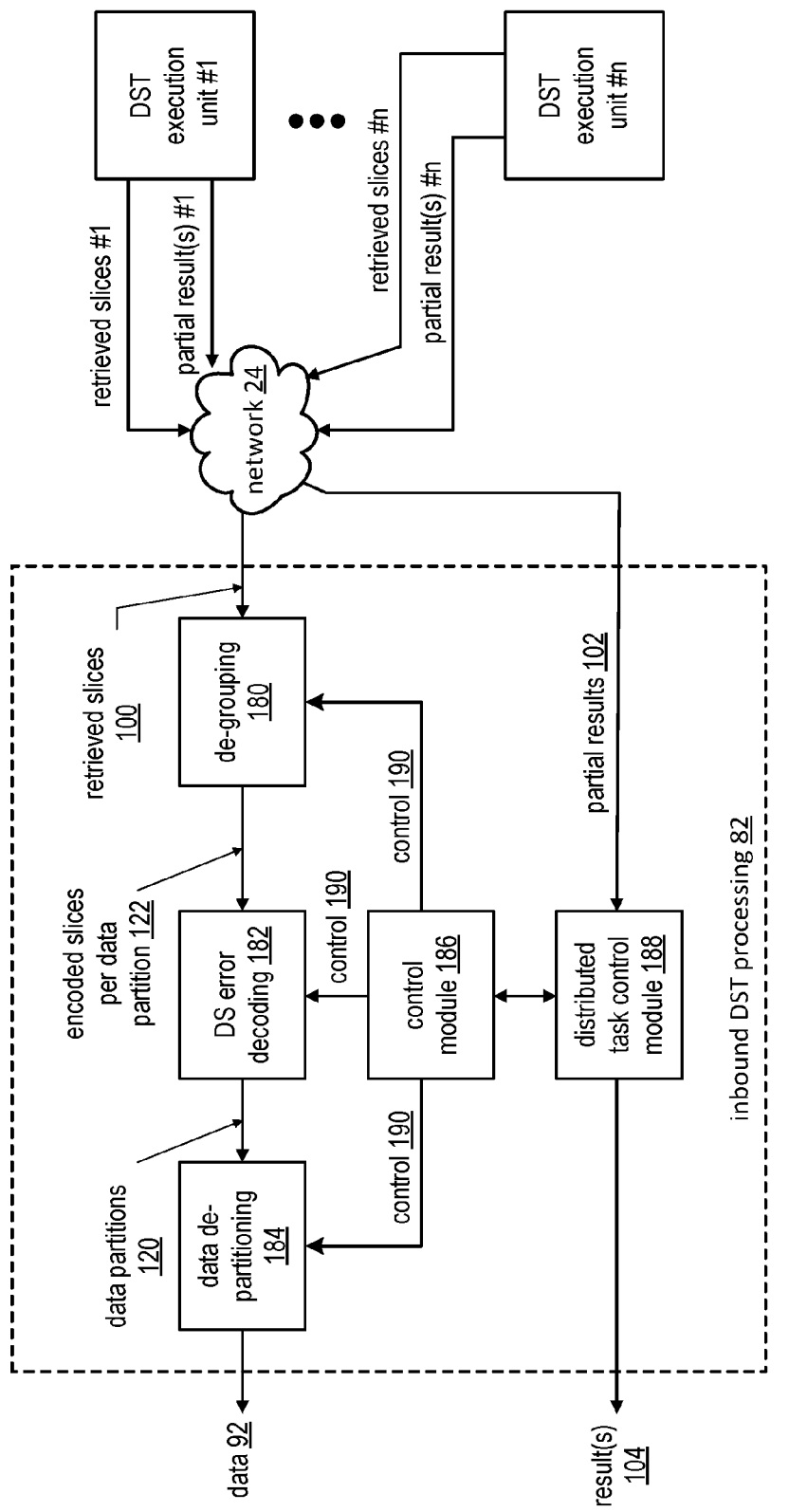
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
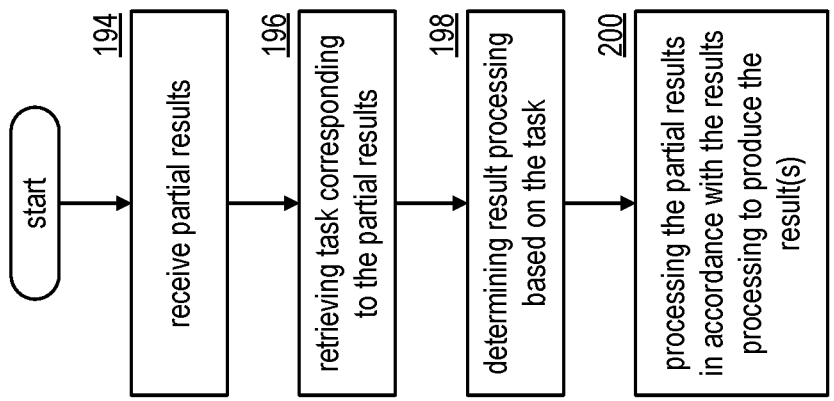
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
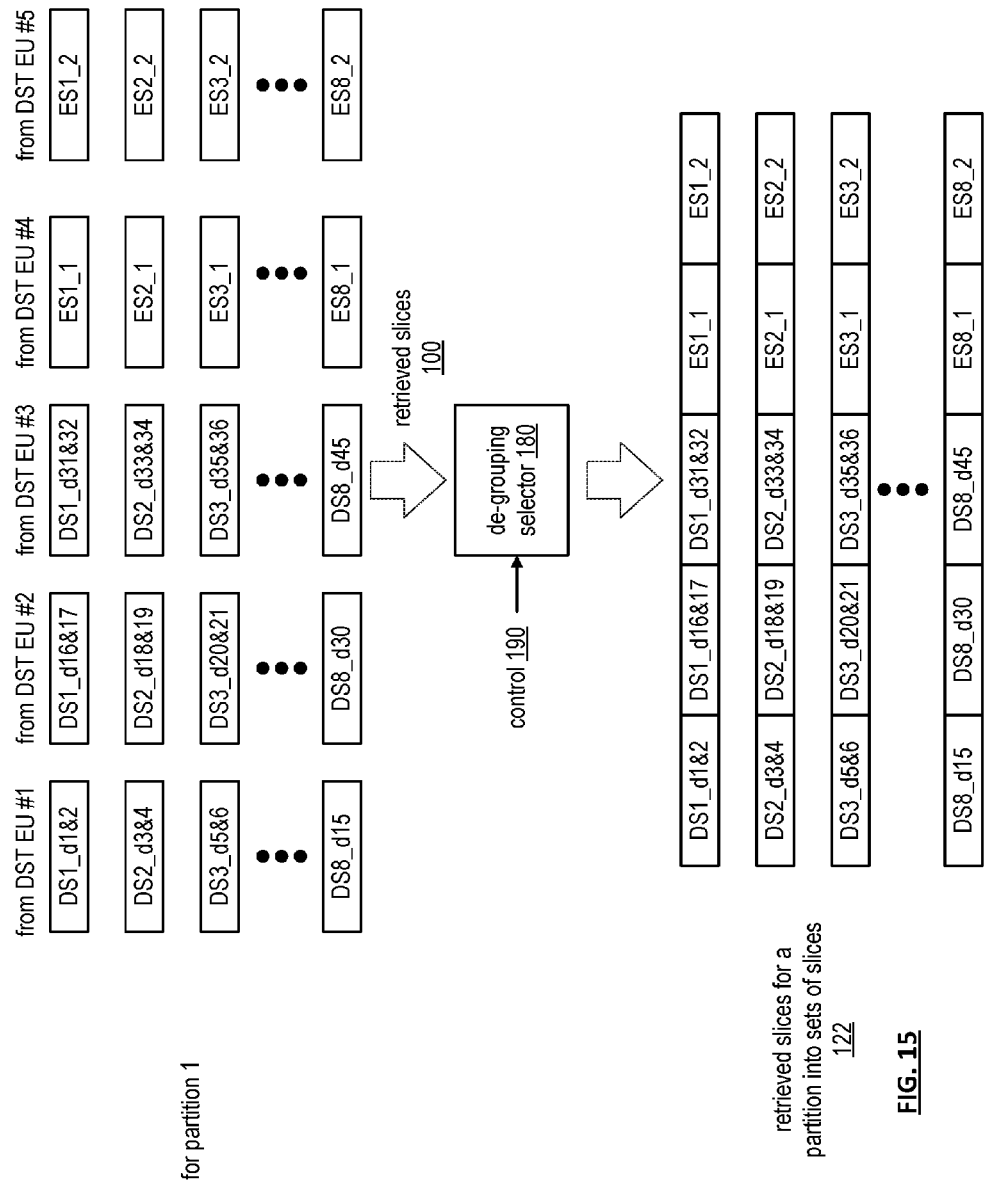
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
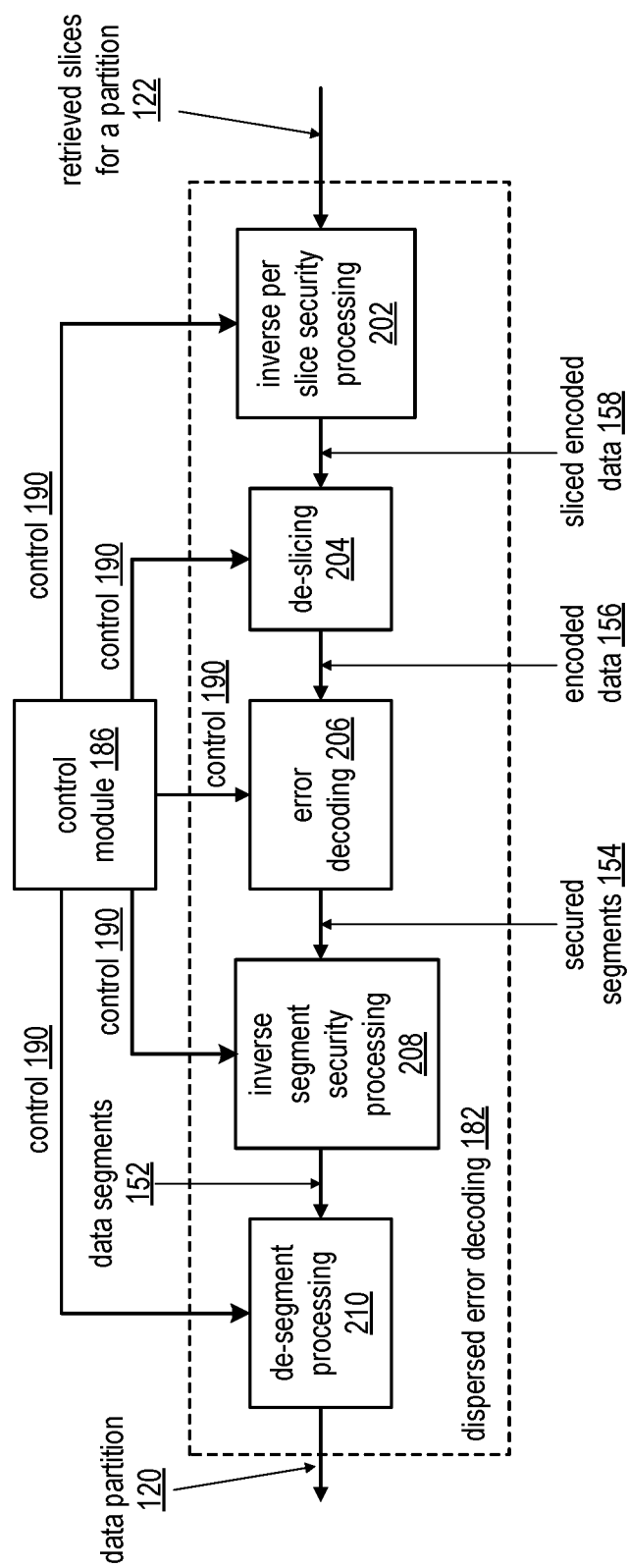
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
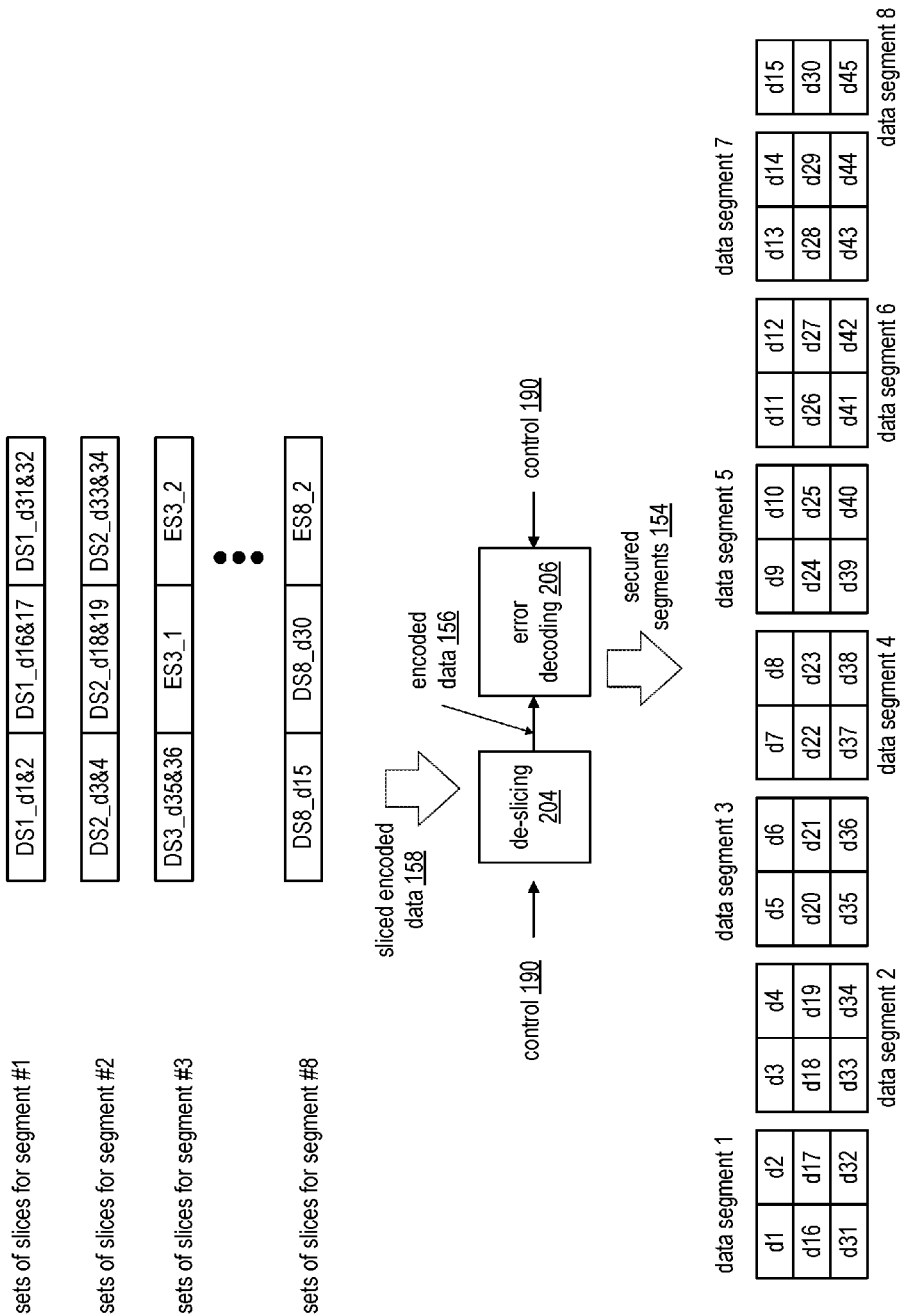
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
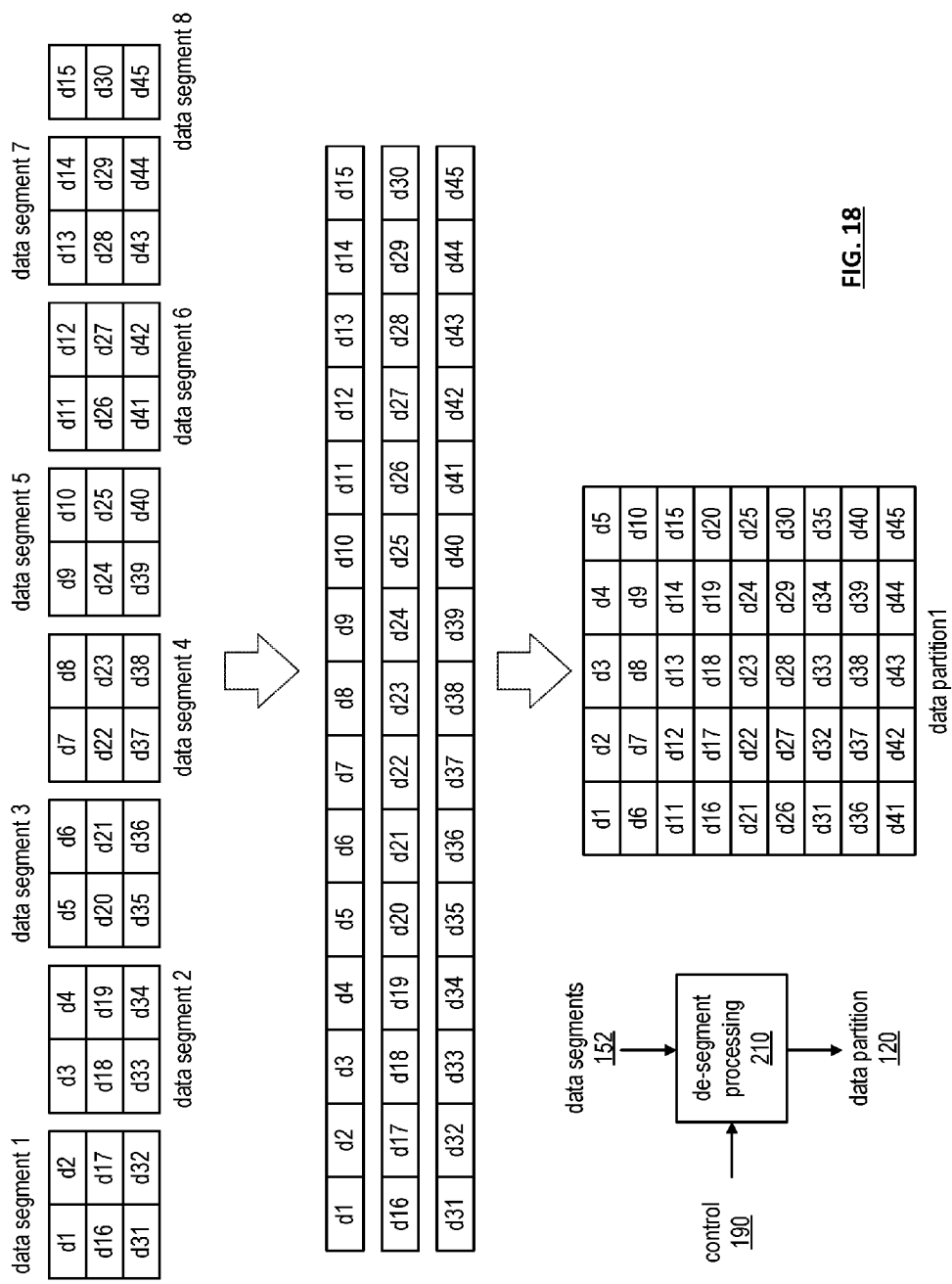
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks. The de-segmenting module 210 converts the rows and columns of data blocks into the data partition 120. Note that each data block may be of the same size as other data blocks or of a different size. In addition, the size of each data block may be a few bytes to megabytes of data.

Figure 19:
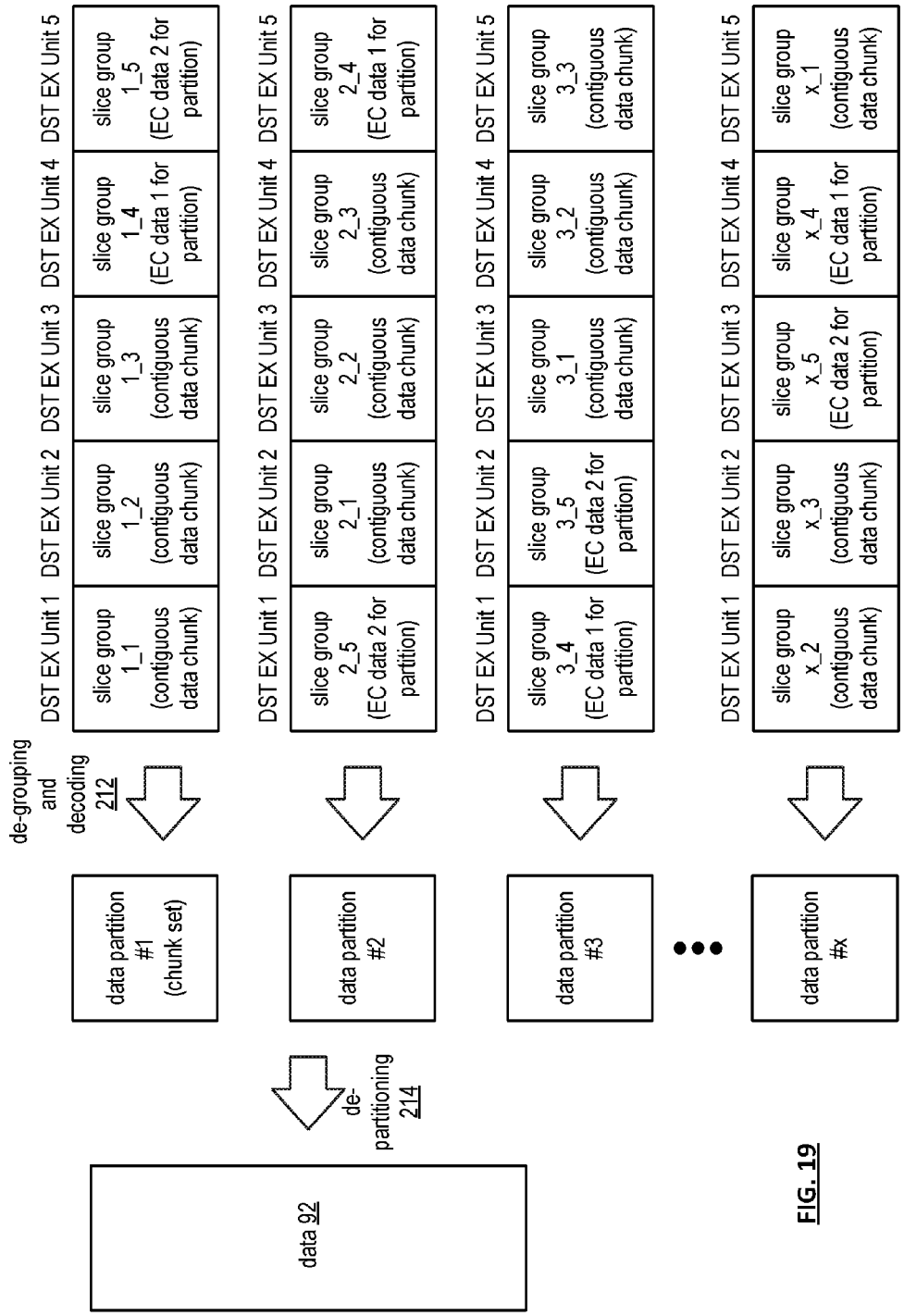
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
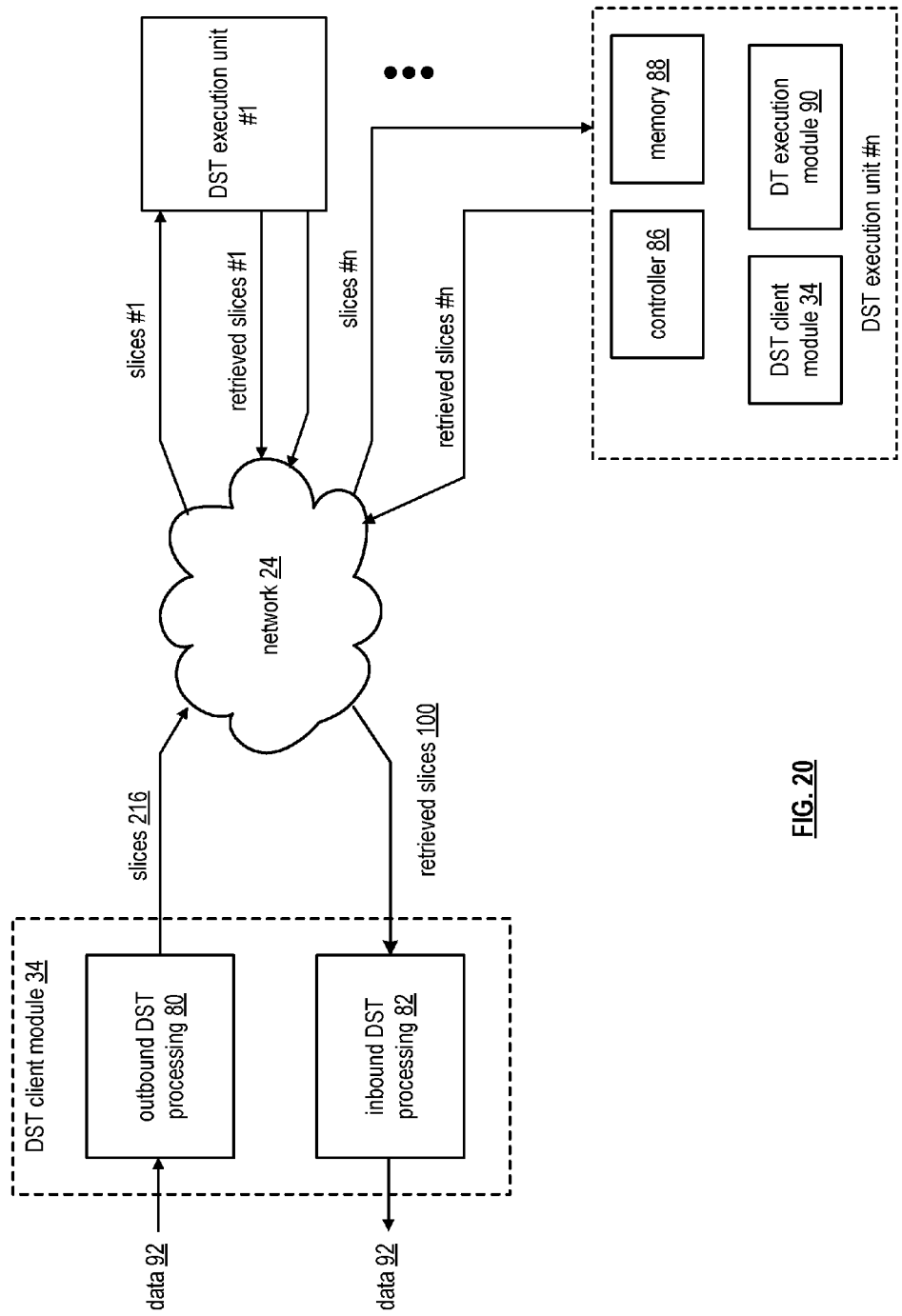
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
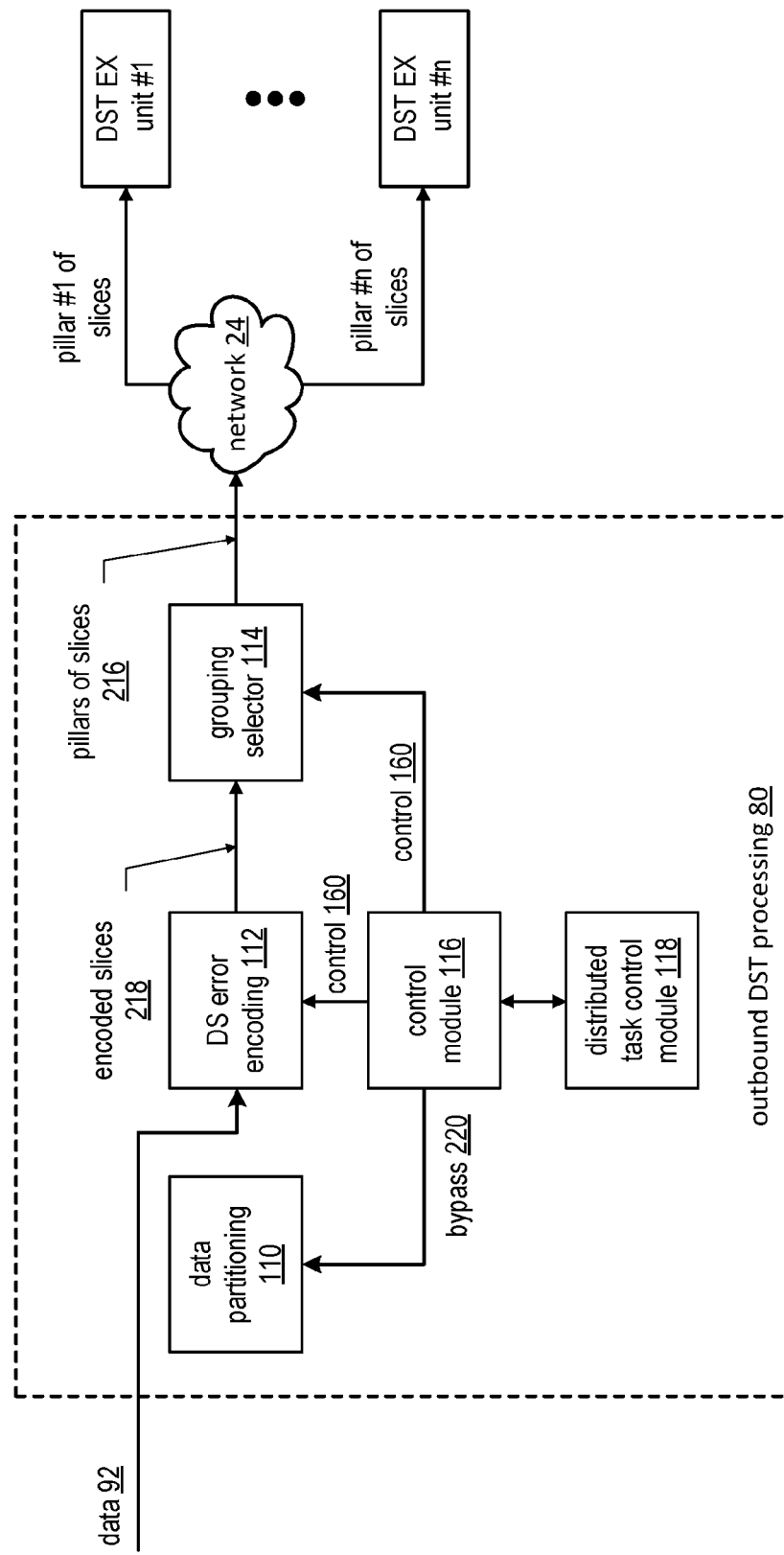
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
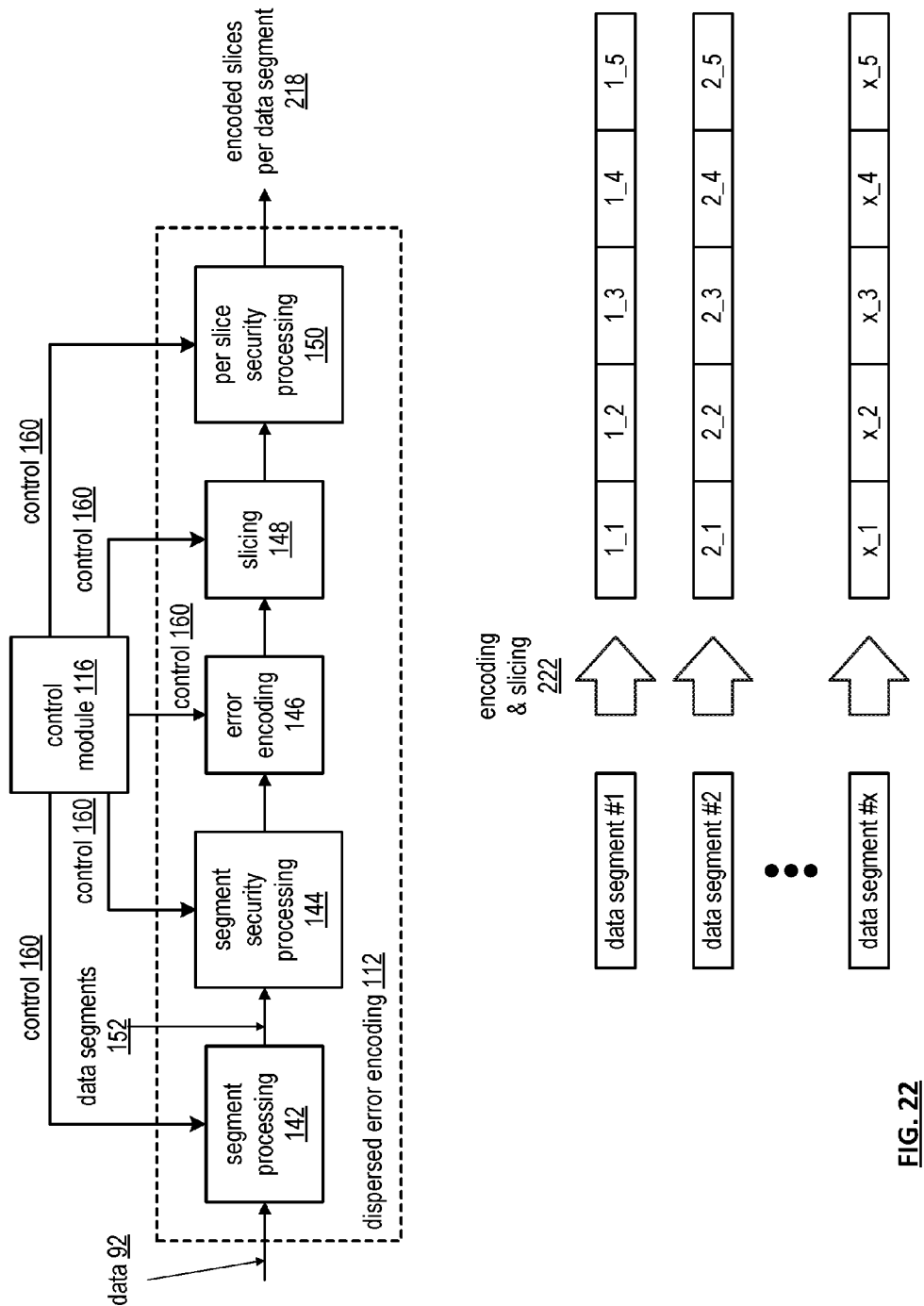
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
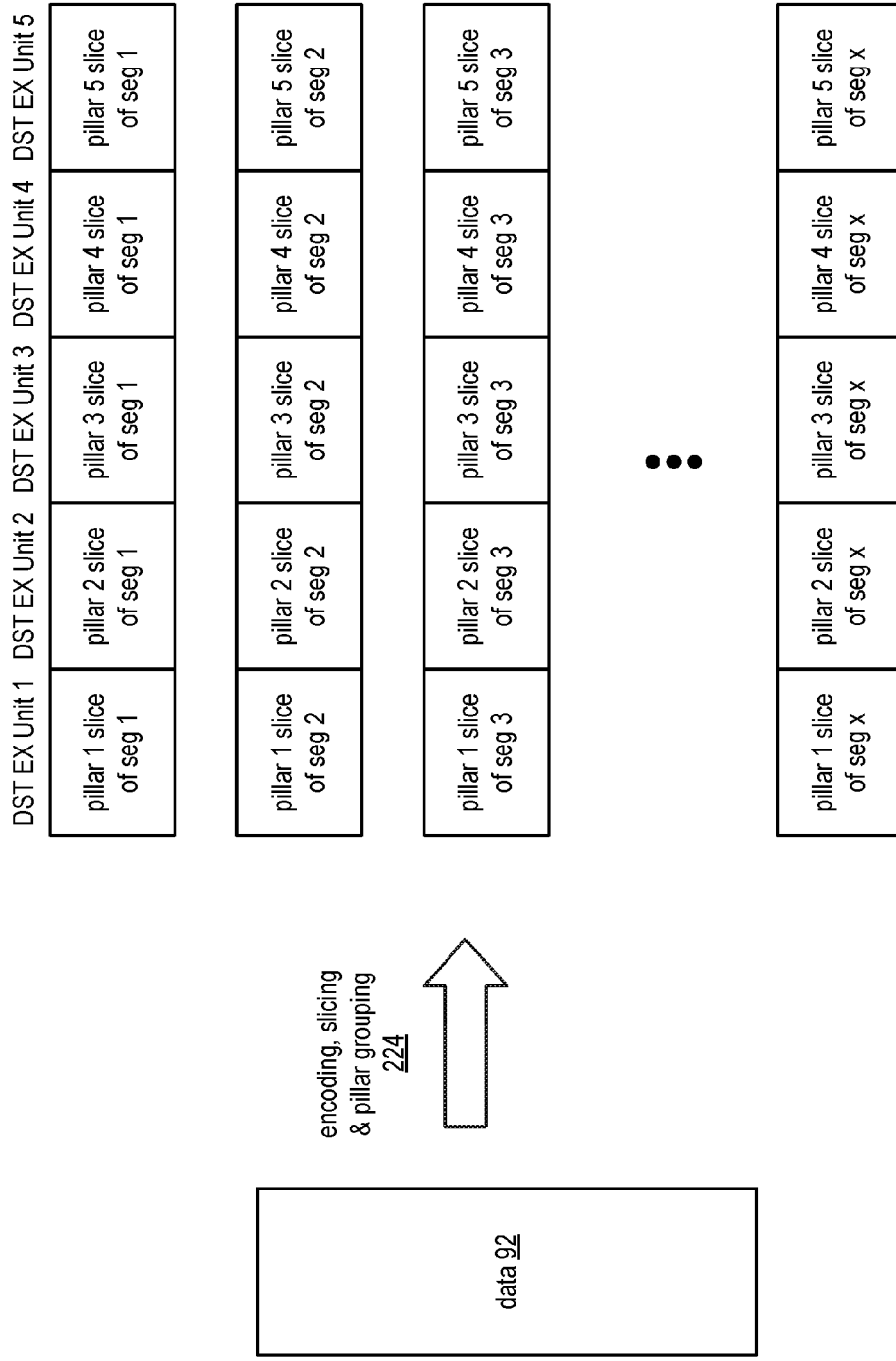
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
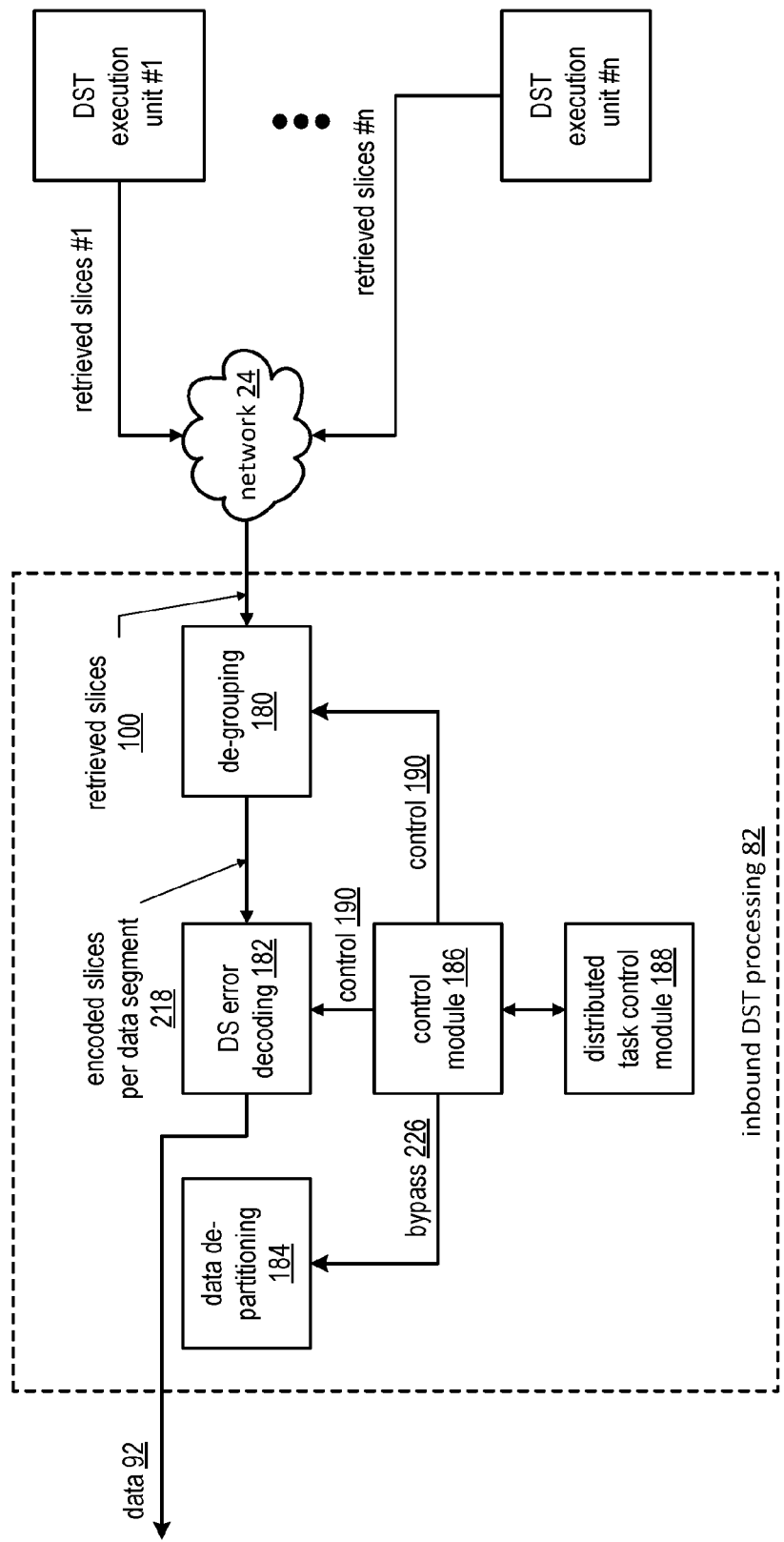
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
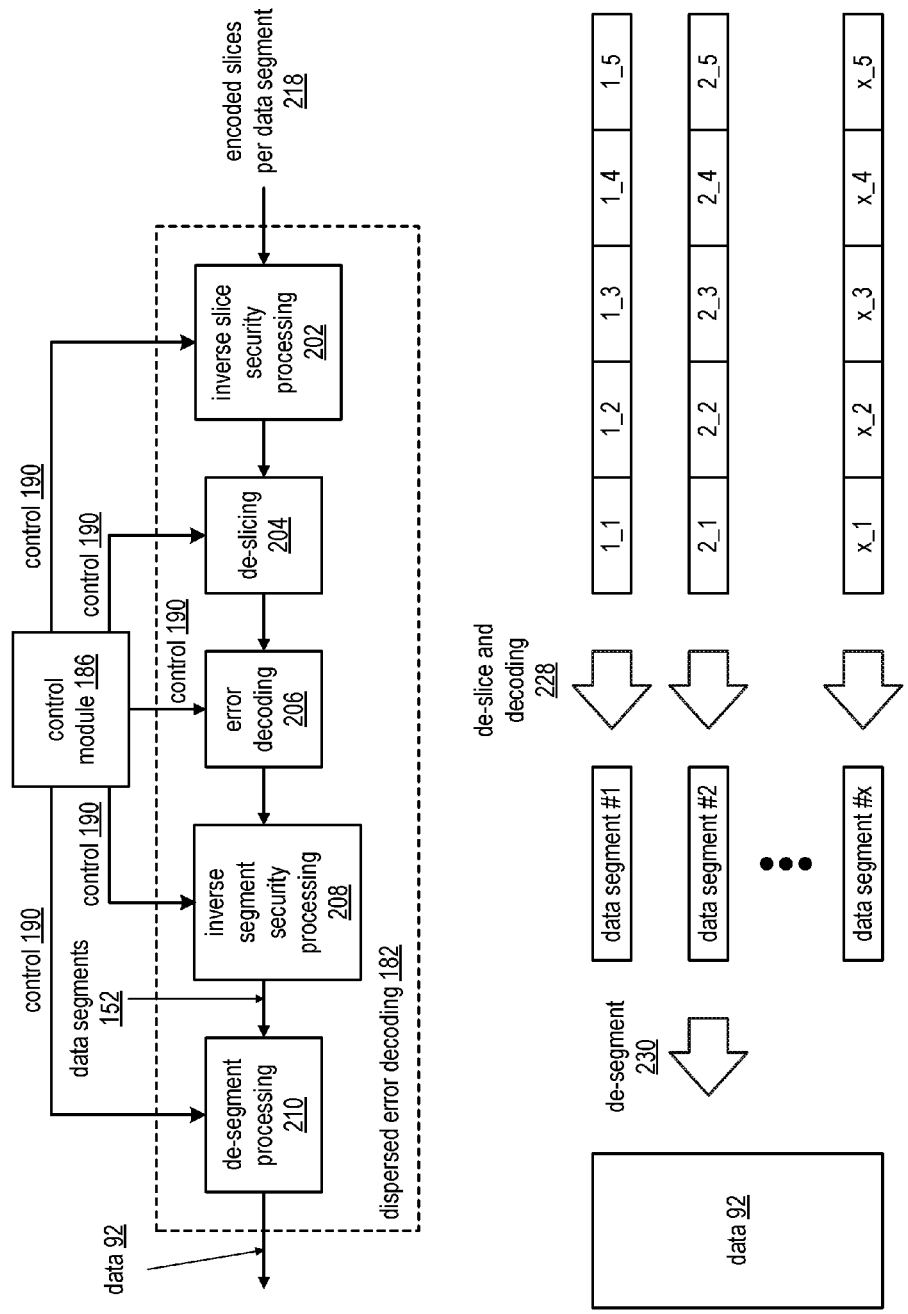
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
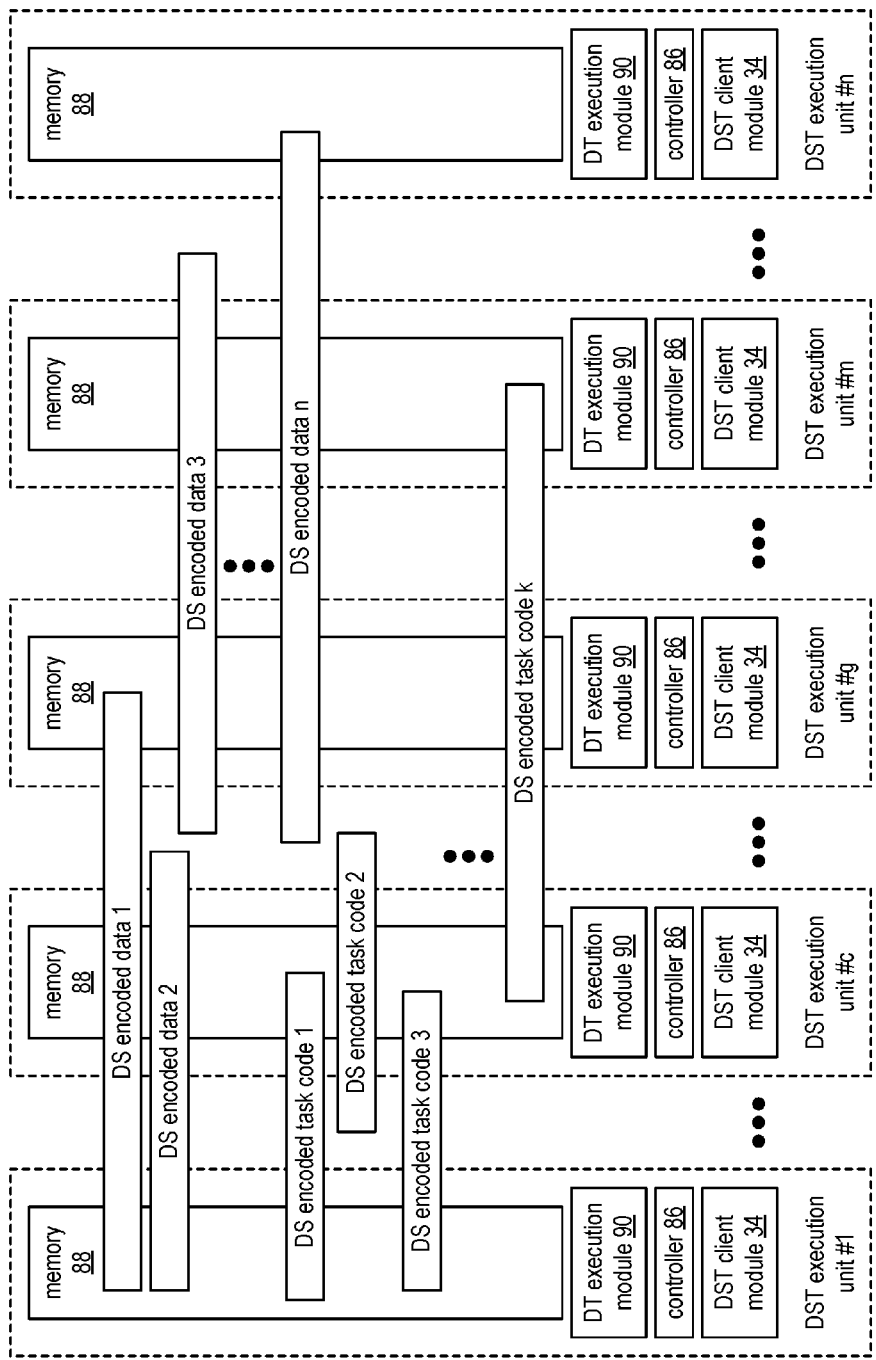
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
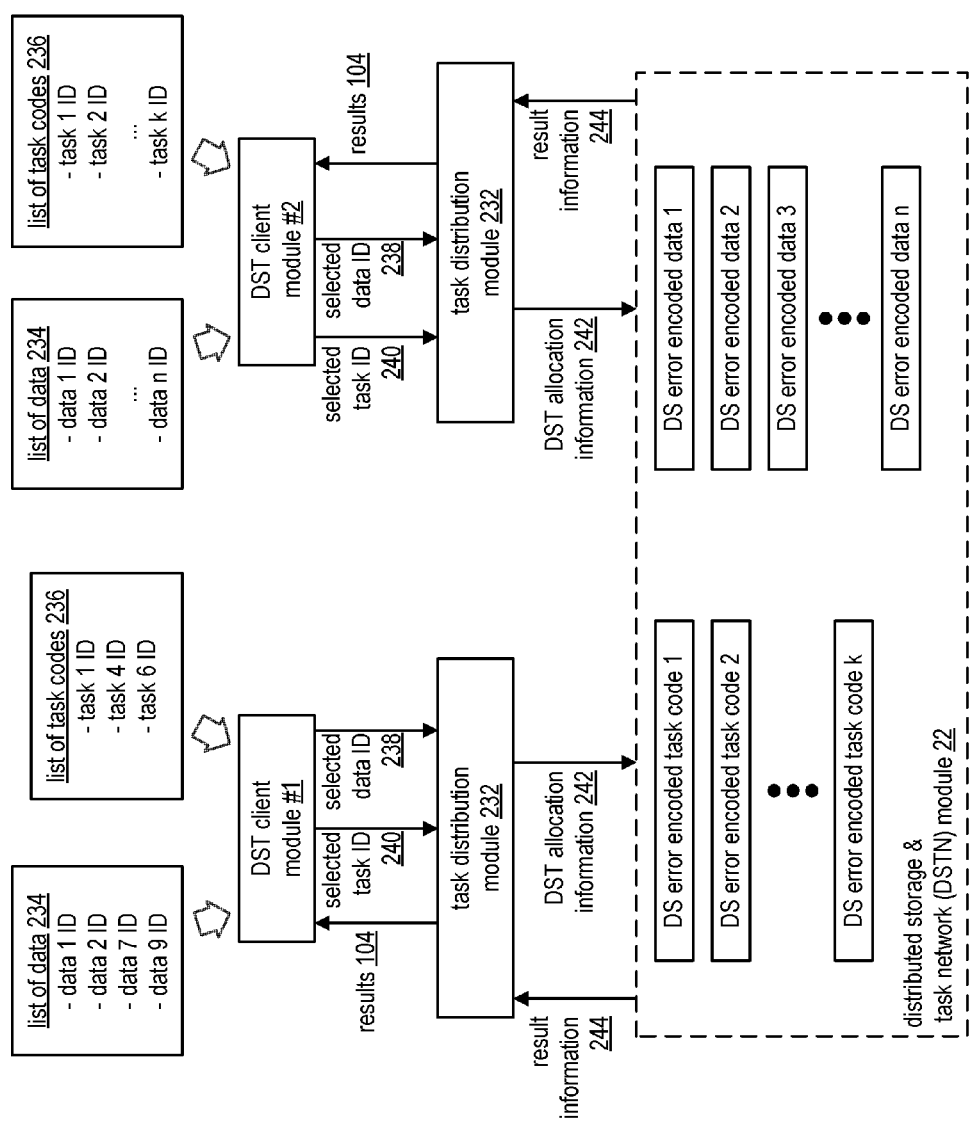
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
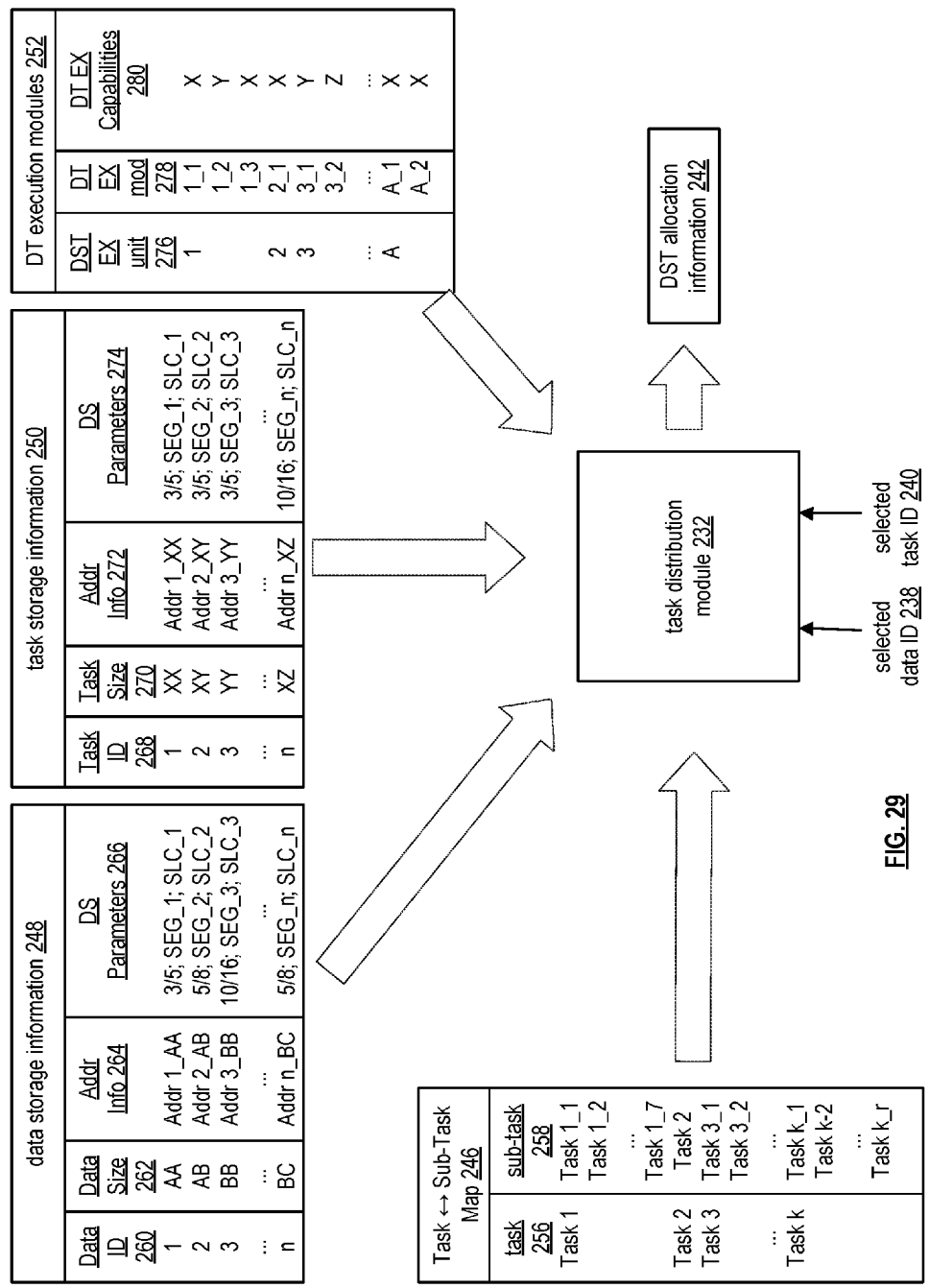
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terra-bytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
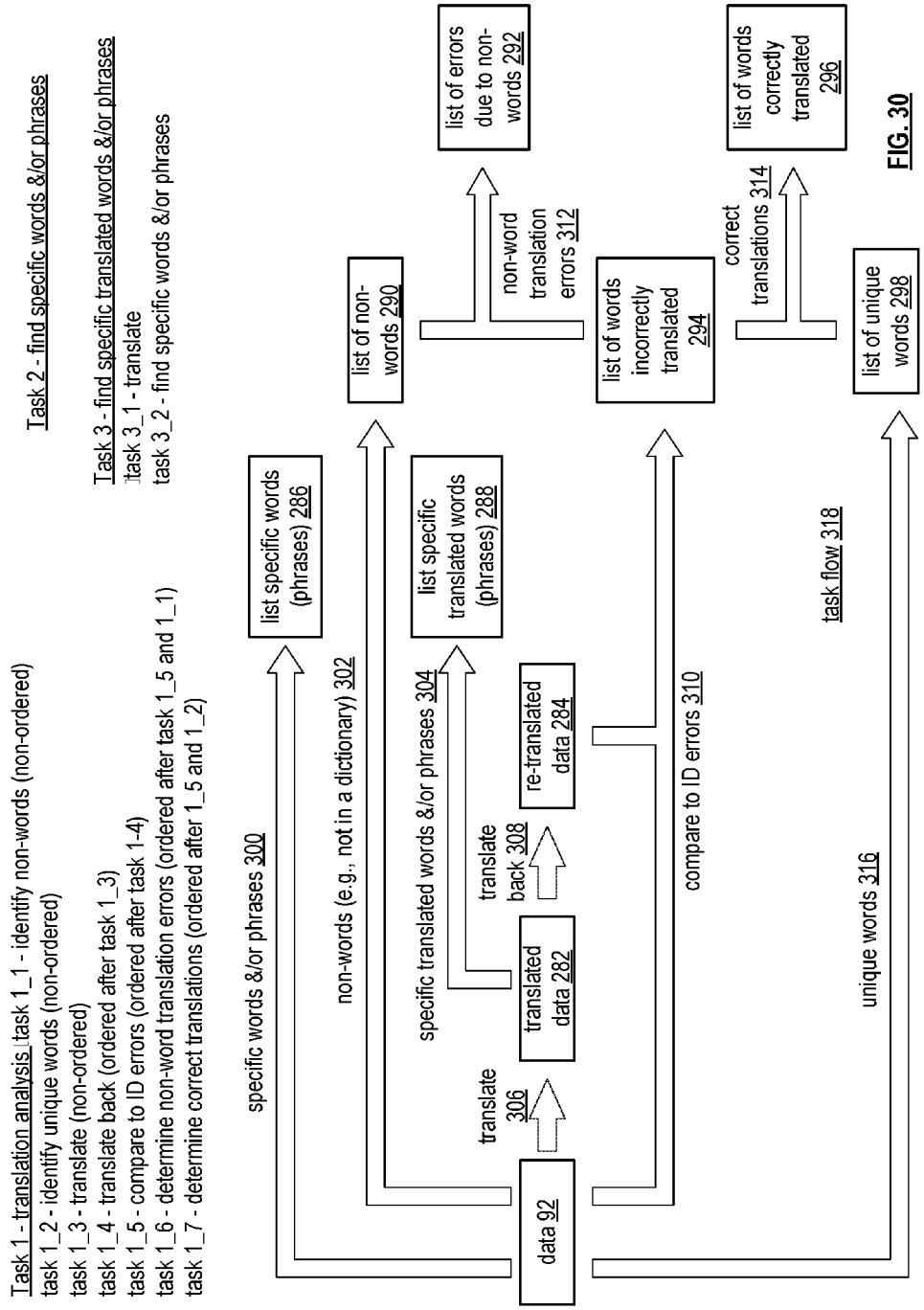
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
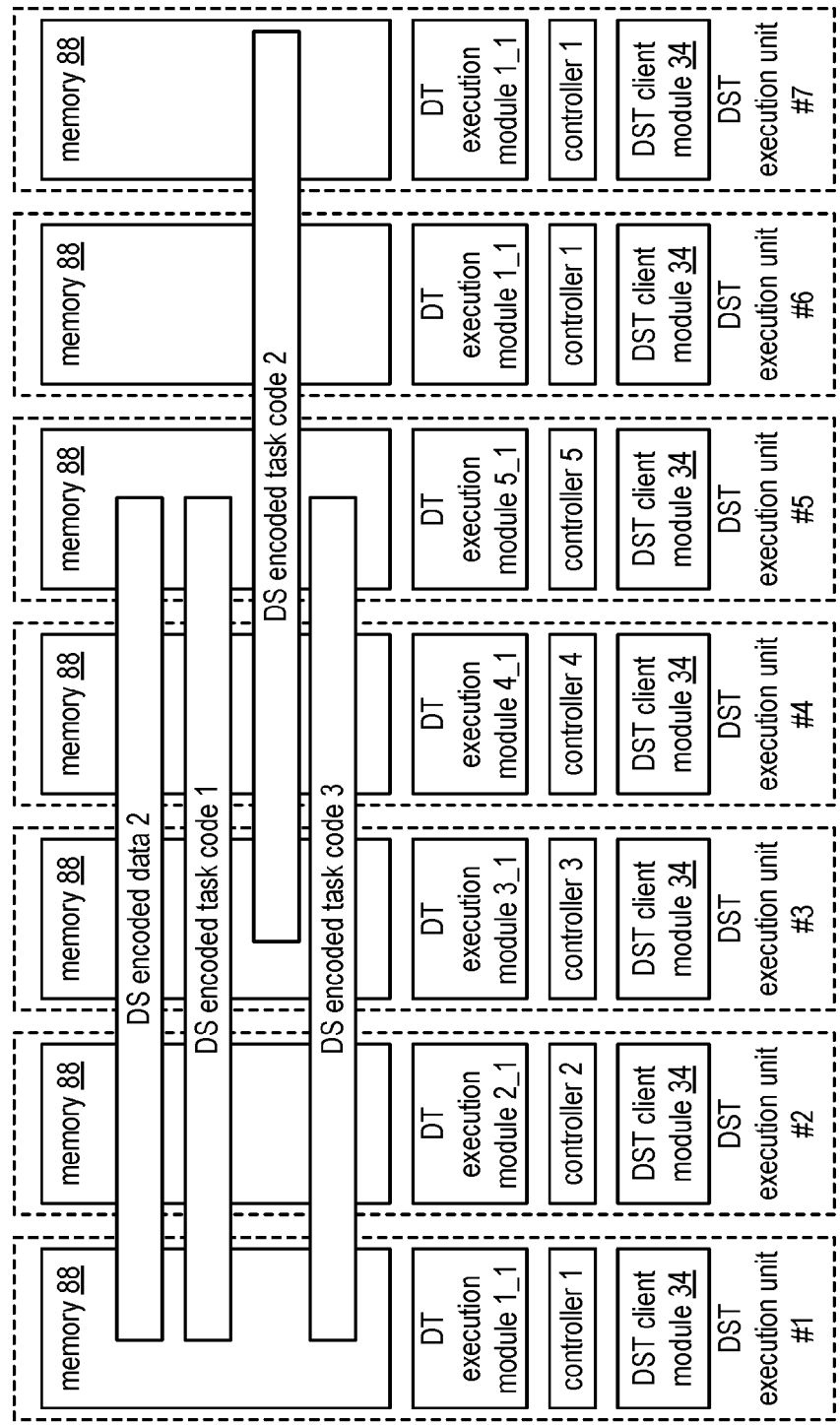
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
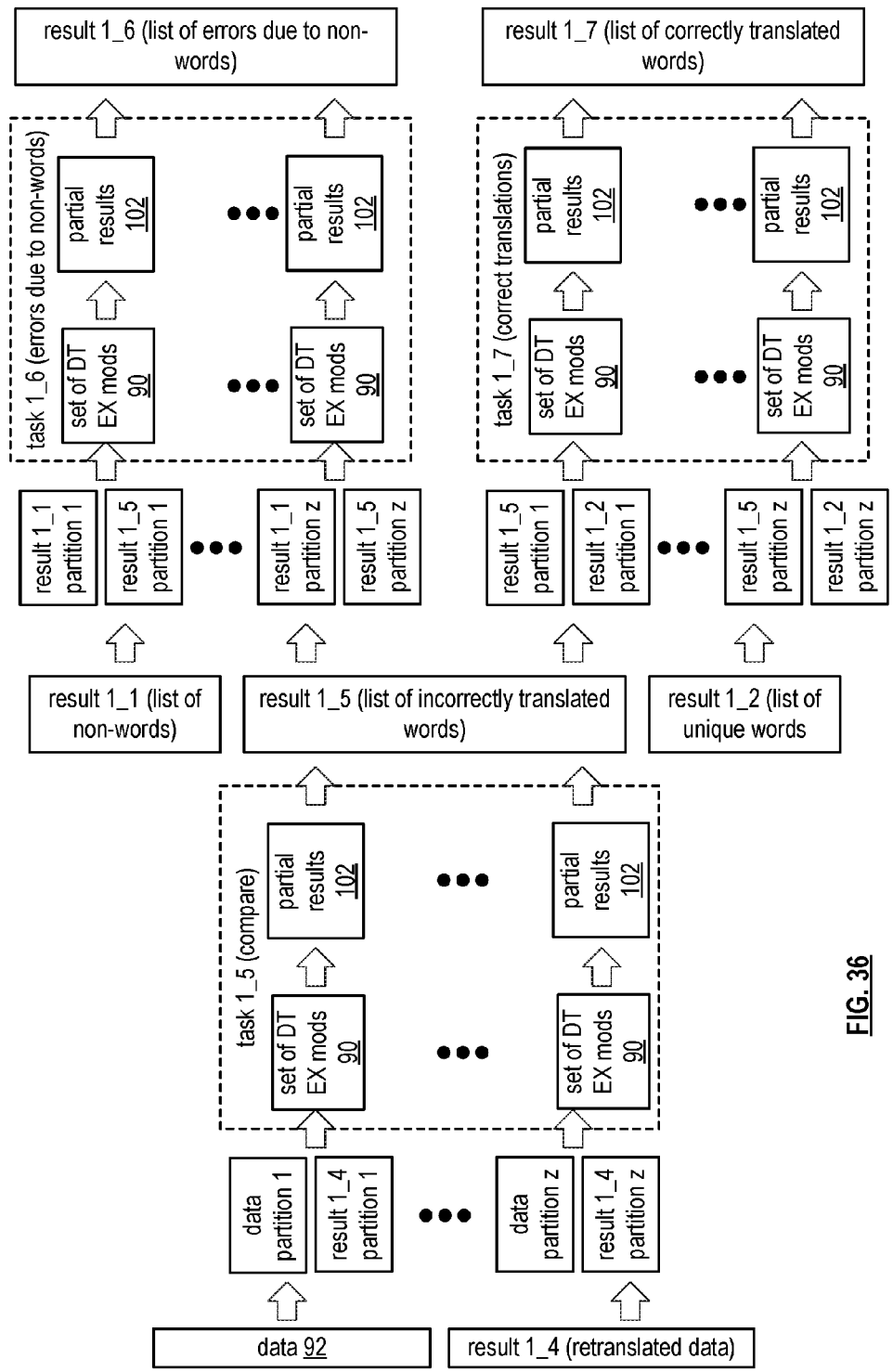

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1$^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1$^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., 1$^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
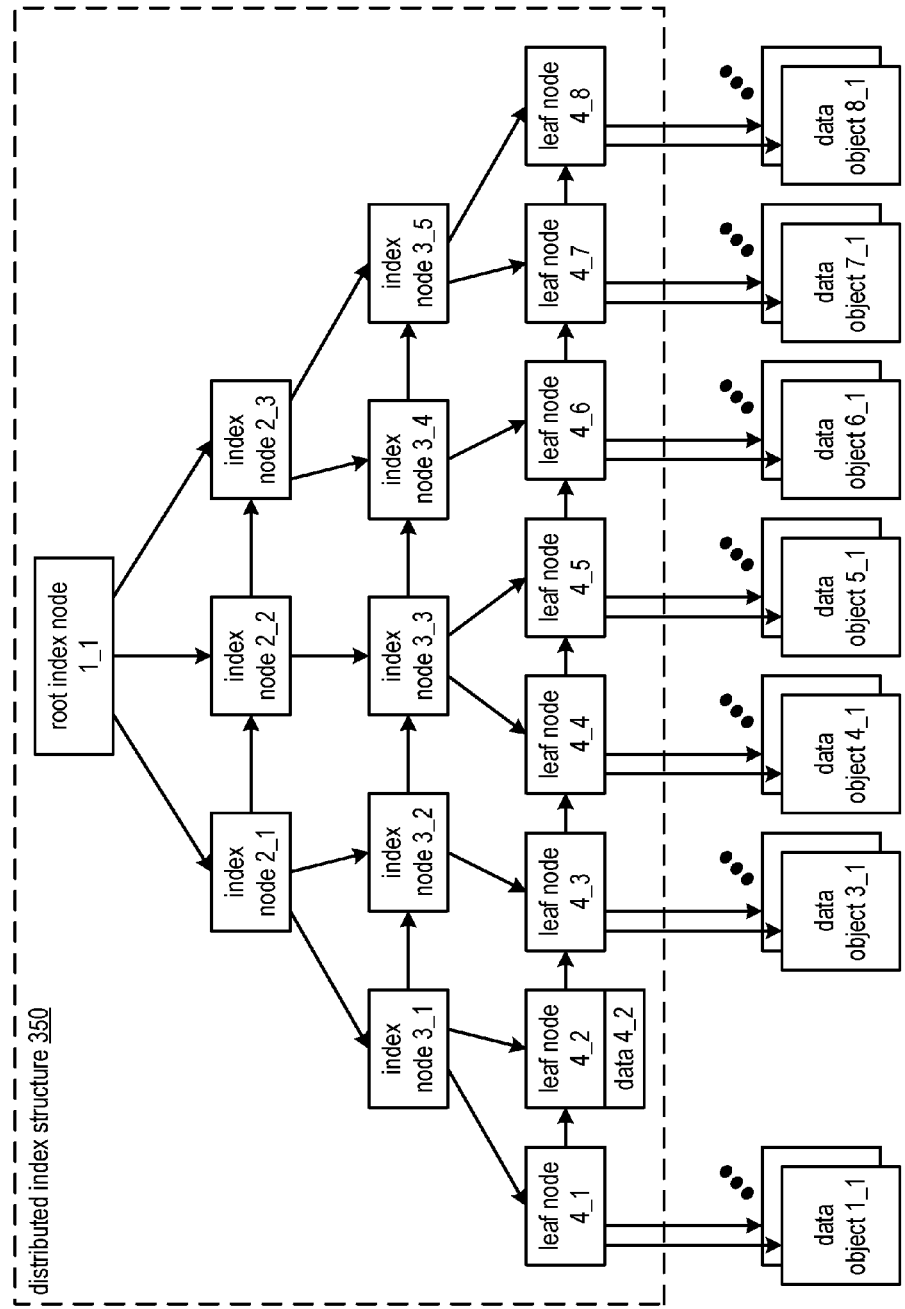
FIG. 40A is a diagram illustrating an example of an index structure in accordance with the present invention.

FIG. 40A is a diagram illustrating an example of a distributed index structure 350 of one or more indexes utilized to access a data object of one or more data objects 1_1 through 1_w, 3_1 through 3_w, 4_1 through 4_w, etc., where at least some of the one or more data objects are stored in at least one of a distributed storage and task network (DSTN) and a dispersed storage network (DSN), and where a data object of the one or more data objects is dispersed storage error encoded to produce a plurality sets of encoded data slices, and where the plurality of sets of encoded data slices are stored in the DSN (e.g., and/or DSTN) utilizing a common source name (e.g., DSN address). The source name provides a DSTN and/or DSN address including one or more of vault identifier (ID) (e.g., such a vault ID associates a portion of storage resources of the DSN with one or more DSN user devices), a vault generation indicator (e.g., identify a vault generation of one or more of generations), and an object number that corresponds to the data object (e.g., a random number assigned to the data object when the data object is stored in the DSN).

The distributed index structure 350 includes at least two nodes represented in the index structure as nodes associated with two or more node levels. One or more nodes of the at least two nodes of the distributed index structure 350 may be dispersed storage error encoded to produce one or more sets of encoded index slices. The one or more sets of encoded index slices may be stored in at least one of a local memory, a DSN memory, and a distributed storage and task network (DSTN) module. For example, each node of a 100 node distributed index structure are individually dispersed storage error encoded to produce at least 100 sets of encoded index slices for storage in the DSTN module. As another example, the 100 node index structure is aggregated into one index file and the index file is dispersed storage error encoded to produce a set of encoded index slices for storage in the DSTN module.

Each node of the at least two nodes includes at least one of an index node and a leaf node. One index node of the at least two nodes includes a root index node. Alternatively, the distributed index structure 350 includes just one node, wherein the one node is a leaf node and where the leaf node is a root node. The distributed index structure 350 may include any number of index nodes, any number of leaf nodes, and any number of node levels. Each level of the any number of node levels includes nodes of a common node type. For example, all nodes of node level 4 are leaf nodes and all nodes of node level 3 are index nodes. As another example, as illustrated, the distributed index structure 350 includes eight index nodes and eight leaf nodes, where the eight index nodes are organized in three node levels, where a first node level includes a root index node 1_1, a second node level includes index nodes 2_1, 2_2, and 2_3, and a third node level includes index nodes 3_1, 3_2, 3_3, 3_4, and 3_5, and where the eight leaf nodes are organized in a last (e.g., fourth) node level, where the last node level includes leaf nodes 4_1, 4_2, 4_3, 4_4, 4_5, 4_6, 4_7, and 4_8.

Each data object of the or one more data objects is associated with at least one index key per distributed index structure of the one or more distributed indexes, where the index key includes a searchable element of the distributed index and may be utilized to locate the data object in accordance with key type traits. An index key type of an index key includes a category of the index key (e.g. string integer, etc.). An index key type exhibits traits. Each index key is associated with one or more key type traits (e.g., for an associated index structure), where a key type traits includes one or more of a type indicator, a trait indicator, a comparing function (e.g., defining how an associate index key of this type should be compared, such as sorting and/or manipulation, to other such index keys), a serialization function (e.g., encoding function for storage), a de-serialization function (e.g., decoding function for retrieval), and an absolute minimum value of the index key.

Each leaf node of the at least two nodes may be associated with one or more data objects. The association includes at least one of, for each data object of the one or more data objects, storing an index key associated with the data object in the leaf node, storing a source name associated with the data object in the leaf node, and storing the data object in the leaf node. For example, leaf node 4_2 includes a data object 4_2 and an index key associated with data object 4_2. As another example, leaf node 4_3 includes source names associated with data object 3_1 through 3_w and index keys associated with data object 3_1 through 3_w. Each leaf node is associated with a minimum index key, where the minimum index key is a minimum value of one or more index keys associated with the one or more data objects in accordance with the key type traits (e.g., sorted utilizing a comparing function of the key type traits to identify the minimum value).

Each leaf node is a child in a parent-child relationship with one index node, where the one index node is a parent in the parent-child relationship. Each child node has one parent node and each parent node has one or more child nodes. The one index node (e.g., parent node) stores a minimum index key associated with the leaf node (e.g., child node). As such, a parent node stores a minimum index key for each child node of the one or more child nodes. Two index nodes may form a parent-child relationship. In such a parent-child relationship, a parent-child node pair is represented in the index structure with a parent node of the parent-child relationship associated with a parent node level that is one level above in the index structure than a child node level associated with a child node of the parent-child relationship.

A leaf node is a sibling node of another leaf node when a minimum index key associated with the leaf node is ordered greater than a last minimum index key associated with the other leaf node, where the last minimum index key associated with the leaf node is sorted above any other last minimum index keys associated with any other lower order leaf nodes and where the minimum index key associated with the leaf node is ordered less than any other minimum index keys associated with any other higher order leaf nodes. A sibling node of a node is represented in the index structure on a common level with the node and one node position to the right. A last node on the far right of a node level has no sibling (e.g., null sibling). All other nodes, if any, other than a last far right node, of a common node level have a sibling node. For example, leaf node 4_2 is a sibling node to leaf node 4_1, leaf node 4_3 is a sibling node to leaf node 4_2, etc., leaf node 4_8 is a sibling node to leaf node 4_7 and leaf node 4_8 has no sibling node.

Each index node of the at least two nodes may be associated with one or more child nodes. Such a child node includes at least one of another index node or a leaf node. The association includes, for each child node of the one or more child nodes, storing a minimum index key associated with the child node in the index node and storing a source name associated with the child node in the index node. Each child node is associated with a minimum index key, where the minimum index key is a minimum value of one or more index keys associated with the child node (e.g., the minimum index key is a minimum value of one or more index keys associated with one or more children nodes of the child node or one or more data objects of the child node in accordance with the key type traits, sorted utilizing a comparing function of the key type traits to identify the minimum value when the child node is a leaf node). For example, index node 3_2 includes a minimum index key (e.g., of data object 3_1) and source name associated with leaf node 4_3. As another example, index node 3_3 includes a minimum index key and source name associated with leaf node 4_4 and another minimum index key and another source name associated with leaf node 4_5. As yet another example, index node 2_3 includes a minimum index key and source name associated with index node 3_4 and minimum index key and another source name associated with index node 3_5.

An index node is a sibling node of another index node when a minimum index key associated with the index node is ordered greater than a last minimum index key associated with the other index node, where the last minimum index key associated with the index node is sorted above any other last minimum index keys associated with any other lower order index nodes and where the minimum index key associated with the index node is ordered less than any other minimum index keys associated with any other higher order index nodes. For example, index node 3_2 is a sibling node to index node 3_1, index node 3_3 is a sibling node to index node 3_2, etc., index node 3_6 is a sibling node to index node 3_5 and index node 3_6 has no sibling node.

Figure 40B:
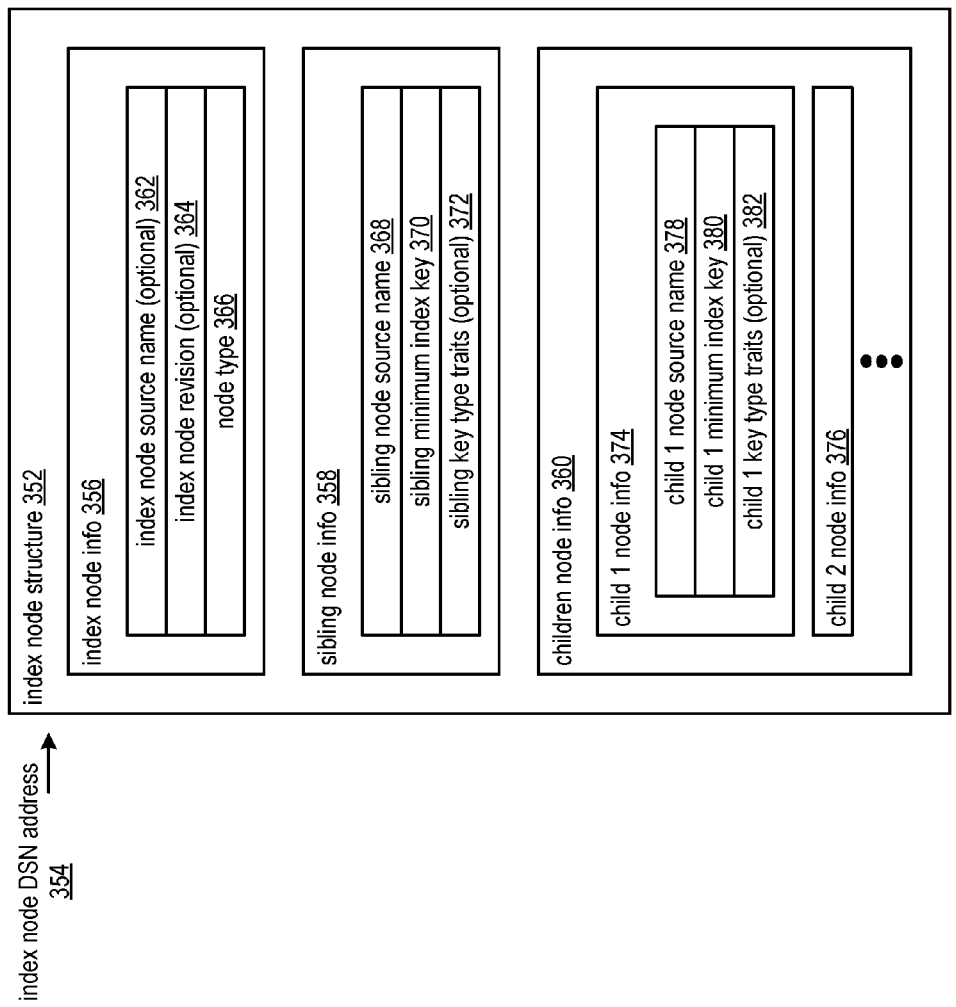
FIG. 40B is a diagram illustrating an example of an index node structure in accordance with the present invention.

FIG. 40B is a diagram illustrating an example of an index node structure 352 for an index node that includes index node information 356, sibling node information 358, and children node information 360. Alternatively, there is no sibling node information 358 when the index node has no sibling node. The index node information 356 includes one or more of an index node source name field 362, an index node revision field 364, and a node type field 366. Inclusion and/or use of the index node source name field 362 and the index node revision field 364 is optional.

The sibling node information 358 includes a sibling node source name field 368, a sibling minimum index key field 370, and a sibling key type traits field 372. Inclusion and/or use of the sibling key type traits field 372 is optional. The children node information 360 includes one or more child node information sections 374, 376, etc. corresponding to each child node of the index node. Each child node information section of the one or more child node information sections includes a corresponding child node source name field 378, a corresponding child minimum index key field 380, and a corresponding child key type traits field 382. For example, the corresponding child node source name field 378 of a child 1 node information section 374 includes a child 1 node source name entry. Inclusion and/or use of the corresponding child key type traits field 382 is optional.

The index node source name field 362 may include an index node dispersed storage network (DSN) address 354 entry (e.g., source name) corresponding to a storage location for the index node. The index node revision field 364 may include an index node revision entry corresponding to a revision number of information contained in the index node. Use of the index node revision field 364 enables generating two or more similar indexes while saving each revision of the two or more similar indexes. The node type field 366 includes a node type entry, where the node type entry indicates whether the node is a leaf node or not a leaf node. The node type indicates that the node is not a leaf node when the node is the index node.

The sibling node source name field 368 includes a sibling node source name entry (e.g., sibling node DSN address) corresponding to where a sibling node is stored in a DSN memory and/or a distributed storage and task network (DSTN) module when the index node has the sibling node as a sibling. The sibling node is another index node when the index node has the sibling. The sibling node source name field 368 may include a null entry when the index node does not have a sibling. The sibling minimum index key field 370 includes a sibling of minimum index key corresponding to the sibling node when the index node has the sibling node as the sibling. The sibling key type traits field 372 may include sibling key type traits corresponding to the sibling node when the index node has the sibling node as the sibling and when the sibling key type traits field is utilized. Alternatively, index structure metadata may include key type traits utilized globally for each node of the index structure.

The index structure metadata may include one or more of key type traits to be utilized for all nodes of a corresponding index, key type traits to be utilized for all index nodes of the corresponding index, key type traits to be utilized for all leaf nodes of the corresponding index, a source name of a root node of the index structure, a maximum number of index structure levels, a minimum number of the next level structures, a maximum number of elements per index structure level, a minimum number of elements per index structure level, and index revision number, and an index name. The index structure metadata may be utilized for one or more of accessing the index, generating the index, updating the index, saving the index, deleting portions of the index, adding a portion to the index, cloning a portion of the index, and searching through the index. The index structure metadata may be stored in one or more of a local memory, one or more nodes of the index structure, and as encoded metadata slices in at least one of the DSTN module and the DSN memory.

The child node source name field 378 includes a child node source name entry (e.g., child node DSN address) corresponding to a storage location for the child node. For example, a child 1 node source name field 378 of a child 1 node information section 374 includes a child 1 node source name. The child minimum index key field 380 includes a child minimum index key corresponding to the child node. For example, a child 1 minimum index key field 380 of the child 1 node information section 374 includes a child 1 minimum index key. The child key type traits field 382 may include child key type traits corresponding to the child node when the index node has the child node as the child and when the child key type traits field is utilized. Alternatively, the index structure metadata may include key type traits utilized globally for each node of the index structure.

FIG. 40C is a diagram illustrating an example of a leaf node structure 384 that includes leaf node information 388, sibling node information 358, and data information 392. Alternatively, there is no sibling node information 358 when the leaf node has no sibling node. The leaf node information 388 includes one or more of a leaf node source name field 394, a leaf node revision field 396, and a node type field 366. Inclusion and/or use of the leaf node source name field 394 and the leaf node revision field 396 is optional. The sibling node information 358 includes a sibling node source name field 368, a sibling minimum index key field 370, and a sibling key type traits field 372. Inclusion and/or use of the sibling key type traits field 372 is optional. The data information 392 includes one or more data information sections 398, 400, etc. corresponding to each data object associated with the leaf node. Alternatively, the data information 392 includes null information when no data object is presently associated with the leaf node. Each data information section of the one or more data information sections includes a corresponding data (e.g., data object) source name or data field 402, a corresponding data index key field 404, and a corresponding data key type traits field 406. For example, the corresponding data source name field 402 of a data 1 node information section 398 includes a data 1 source name entry. Inclusion and/or use of the corresponding data key type traits field 406 is optional.

The leaf node source name field 394 may include a leaf node source name entry (e.g., leaf node distributed storage and task network (DSTN) address and/or a dispersed storage network (DSN) address) corresponding to a storage location of the leaf node. The leaf node revision field 396 may include a leaf node revision entry corresponding to a revision number of information contained in the leaf node. Use of the leaf node revision enables generating two or more similar indexes while saving each revision of the two or more similar indexes. The node type field 366 includes a node type, where the node type indicates whether the node is a leaf node or not a leaf node. The node type indicates that the node is a leaf node when the node is the leaf node.

The sibling node source name field 368 includes a sibling node source name entry (e.g., sibling node DSN address) corresponding to a storage location for a sibling when the leaf node has the sibling node as a sibling. The sibling node is another leaf node when the leaf node has the sibling. The sibling node source name field 368 may include a null entry when the leaf node does not have a sibling. The sibling minimum index key field 370 includes a minimum index key associated with the sibling node when the leaf node has the sibling node as the sibling. The sibling key type traits field 372 may include sibling key type traits corresponding to the sibling node when the leaf node has the sibling node as the sibling and when the sibling key type traits field 372 is utilized. Alternatively, index structure metadata may include key type traits utilized globally for each leaf node of the index structure.

The data source name or data field 402 includes at least one of a data source name entry (e.g., a DSN address) corresponding to a storage location of data and the data (e.g., a data object, one or more encoded data slices of data). For example, a data 1 source name or data field 402 of a data 1 information section 398 includes a DSN address source name of a first data object. As another example, the data 1 source name or data field 402 of the data 1 information section includes the data 1 data object. The data index key field 404 includes a data index key corresponding to the data. For example, a data 1 index key field order for of the data 1 information section 398 includes a data 1 index key. The data key type traits field 406 may include data key type traits corresponding to the data when the data key type traits field 406 is utilized. Alternatively, the index structure metadata may include key type traits utilized globally for each data object associated with the index structure.

Figure 40D:
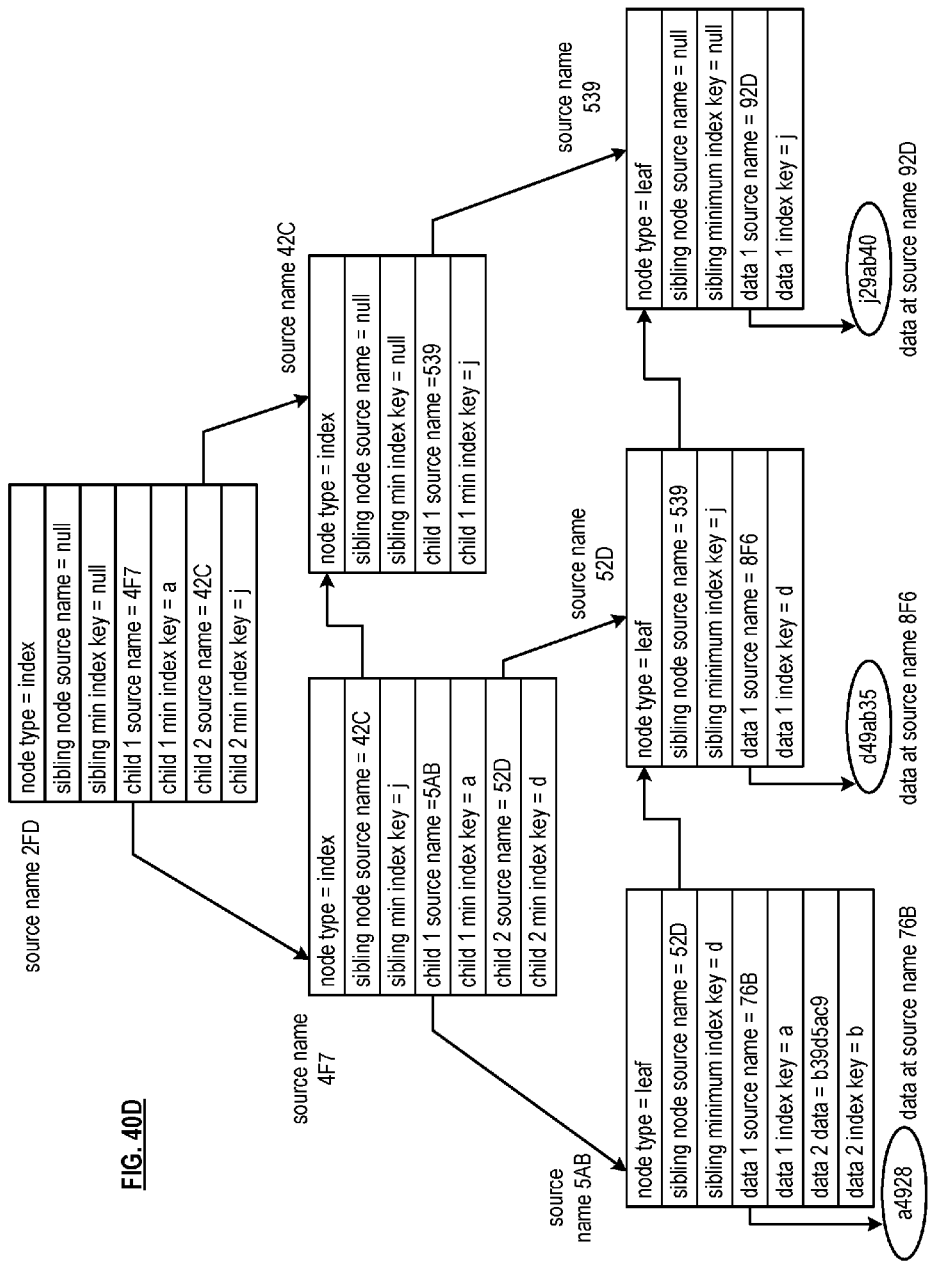
FIG. 40D is a diagram illustrating another example of an index structure in accordance with the present invention.

FIG. 40D is a diagram illustrating another example of an index structure of an example index utilized to access data stored in at least one of a dispersed storage network (DSN) memory and a distributed storage and task network (DSTN) module. In the example, the index structure includes three leaf nodes and three index nodes. Each of the three leaf nodes and the three index nodes are individually encoded using a dispersed storage error coding function to produce a set of corresponding node slices that are stored in the DSTN module. The index structure provides an index for three data objects stored in the DSTN module, where the data objects stored in the DSTN module utilizing source names 76B, 8F6, and 92D, and global key type traits includes a comparing function to sort string type index keys alphabetically. The data stored at source name 76B is associated with an index key of "a" as that data begins with a character "a". The data stored at source name 8F6 is associated with an index key of "d" as that data begins with a character "d". The data stored at source name 92D is associated with an index key of "j" as that data begins with a character "j".

A leaf node stored at source name 5AB includes a node type indicating a leaf node, a sibling node source name pointing to a leaf node stored at source name 52D, a sibling minimum index key of "d", a data 1 source name of 76B, a data 1 index key of "a", a data 2 direct data entry (e.g., b39d5ac9), and a data 2 index key of "b". The leaf node stored at source name 52D includes a node type indicating a leaf node, a sibling node source name pointing to a leaf node stored at source name 539, a sibling minimum index key of "j", a data 1 source name of 8F6, and a data 1 index key of "d". The leaf node stored at source name 539 includes a node type indicating a leaf node, a null sibling node source name (e.g., since last leaf node of leaf node level), a null sibling minimum index key, a data 1 source name of 92D, and a data 1 index key of "j".

An index node stored at source name 4F7 includes a node type indicating not a leaf node (e.g., index node), a sibling node source name pointing to an index node stored at source name 42C, a sibling minimum index key of "j", a child 1 source name of 5AB, a child 1 minimum index key of "a", a child 2 source name of 52D, and a child 2 minimum index key of "d". The index node stored at source name 42C includes a node type indicating not a leaf node (e.g., index node), a null sibling node source name (e.g., since last index node of an index node level), a null sibling minimum index key, a child 1 source name of 539, and a child 1 minimum index key of "j". An index node (e.g., a root node) stored at source name 2FD includes a node type indicating not a leaf node (e.g., index node), a null sibling node source name (e.g., since root node), a null sibling minimum index key, a child 1 source name of 4F7, a child 1 minimum index key of "a", a child 2 source name of 42C, and a child 2 minimum index key of "j".

Figure 40E:
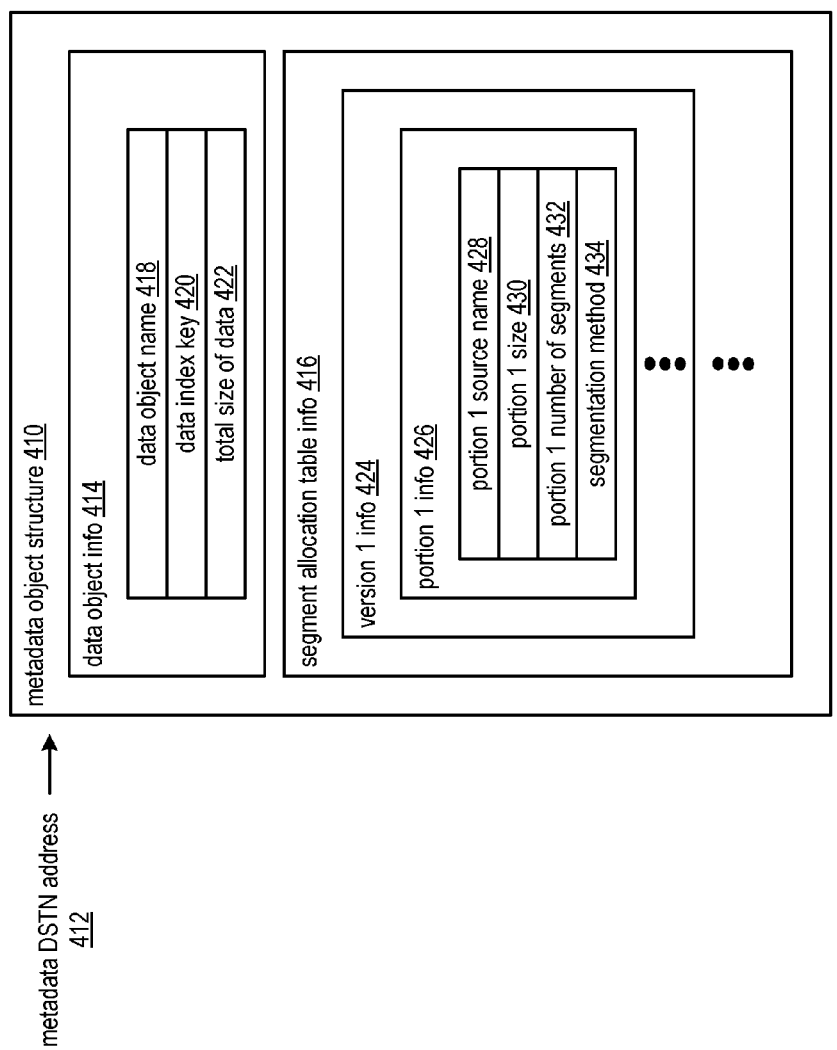
FIG. 40E is a diagram illustrating an example of a metadata object structure in accordance with the present invention.

FIG. 40E is a diagram illustrating an example of a metadata object structure 410 that includes data object information 414 and segment allocation table information 416. A metadata object is generated in accordance with the metadata object structure 410 such that the metadata object 410 describes a data object stored as one or more versions in a dispersed storage and task network (DSTN). The metadata object is stored in the DSTN utilizing a metadata DSTN address 412. Each version of the one or more versions of the data is stored as two or more portions in the DSTN. The data object information 414 includes common information with regards to the data object. The segment allocation table information 416 includes information relating to the two or more portions of each of the one or more versions.

In particular, the data object information 414 includes a data object name field 418, a data index key field 420, and a total size of data field 422. The data object name field 418 includes a data object name associated with the data. The data index key field 420 includes a data index key associated with the data object. The total size of data field 422 includes a total size of data value associated with the data object.

The segment allocation table information 416 includes version information 424 for each of the one or more versions of the data. The version information 424 includes portion information 426 for each of the two or more portions of the data. The portion information includes 426 a portion source name field 428, a portion size field 430, a portion number of segments field 432, and a segmentation method field 434. The portion source name field 428 includes a starting source name of a first segment of a corresponding portion. The portion size field 430 includes a portion size of the portion (e.g., total number of bytes of the portion). The portion number of segments field 432 includes a number of segments for the portion. The segmentation method 434 field includes a segmentation method identifier (e.g., fixed size segmentation, variable size segmentation, ramping size up segmentation, ramping size down segmentation, etc.).

Figure 40F:
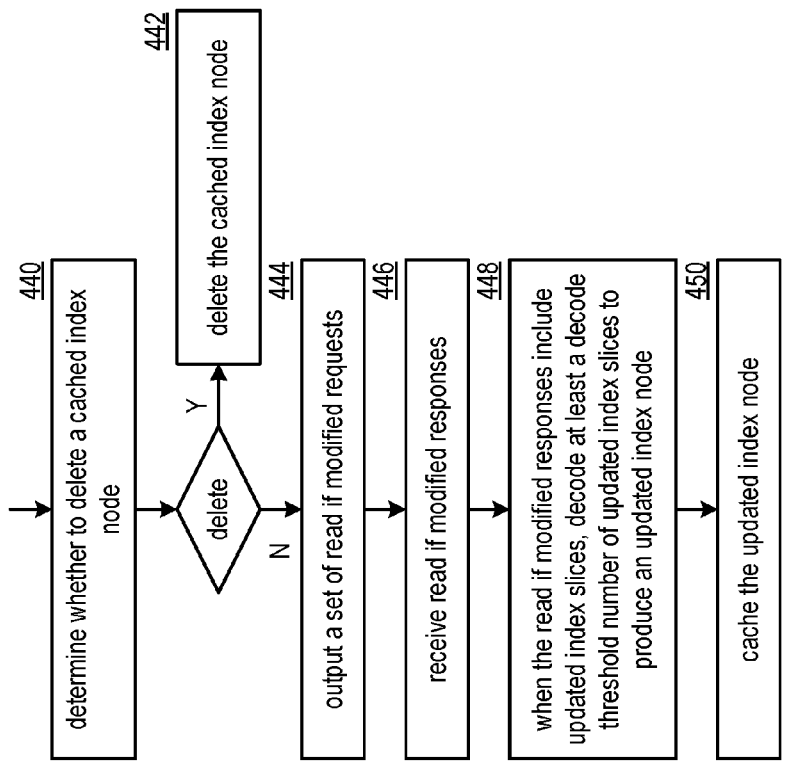
FIG. 40F is a flowchart illustrating an example of updating a cached index node in accordance with the present invention.

FIG. 40F is a flowchart illustrating an example of updating a cached index node. The method begins at step 440 where a processing module (e.g., of a distributed storage and task (DST) client module) determines whether to delete a cached index node. The cached index node may be stored in a local memory associated with the DST client module in addition to being stored as one or more sets of encoded index slices in a distributed storage and task network (DSTN) module. The cached index node may be cached upon one or more of retrieving the index node from the DSTN module and generating an updated version of the index node.

The determining may be based on one or more of a size of the index node, an age of the index node since last caching, an available storage resource level, a frequency level of index node retrieval, and a level of the index node within an associated index. For example, processing module determines to delete the cached index node more often for lowest levels of the index. As another example, the processing module determines to delete the cached index node when the age of the index node since last storage is greater than a last storage threshold. As yet another example, a processing module determines to delete the cached index node when the frequency level of index node retrieval is less than a retrieval threshold. The method branches to step 444 when the processing module determines to not delete the cached index node. The method continues to step 442 when the processing module determines to delete the cached index node. The method continues at step 442 where the processing module deletes the cached index node. The deleting includes deleting the cached index node from a cache memory and resetting the age of the index node since last storage.

The method continues at step 444 where the processing module sends a set of read if modified requests. The outputting includes generating the set of read if modified requests and outputting the set of read if modified requests to the DSTN module. The set of read if modified requests includes at least one set of slice names associated with storage of the index node in the DSTN module and a revision number associated with the cached index node. The method continues at step 446 where the processing module receives read if modified responses. Each read if modified response includes one or more of a slice name, one or more slice revision numbers, and an updated index slice for each slice revision number when the slice revision number of the one or more slice revision numbers is greater than the revision number of the cached index node.

When the read if modified responses include updated index slices, the method continues at step 448 where the processing module decodes at least a decode threshold number of the updated index slices using a dispersed storage error coding function to produce an updated index node. The decoding includes selecting updated index slices corresponding to a latest revision of the one or more slice revision numbers. The method continues at step 450 where the processing module caches the updated index node. For example, the processing module stores the updated index node in the local memory. The caching may include generating and storing a timestamp associated with storage of the updated index node.

Figure 41:
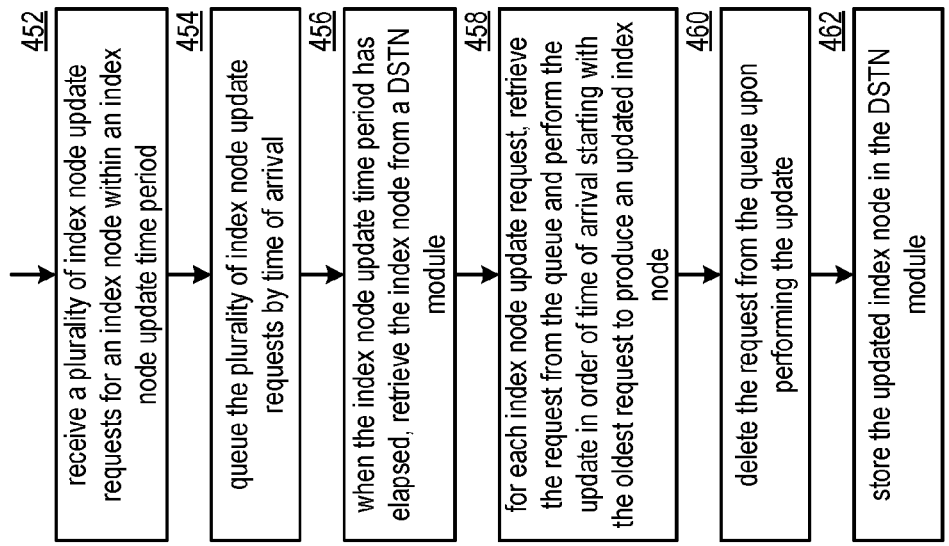
FIG. 41 is a flowchart illustrating an example of updating an index node in accordance with the present invention.

FIG. 41 is a flowchart illustrating an example of updating an index node. The method begins at step 452 where a processing module (e.g., of a distributed storage and task (DST) client module) receives a plurality of index node update requests for an index node within an index node update time period. For example, the processing module receives 12 index node update requests for the index node within 100 ms when the index node update time period is established to be 100 ms. The method continues at step 454 where the processing module queues the plurality of index node update requests by time of arrival. For example, the processing module enters a first index node update request into a first position of a storage queue when the first index node update request was received first, enters a second index node update request into a second possession of the storage queue when the second index node update request was received second, etc.

When the index node update time period has elapsed, the method continues at step 456 where the processing module retrieves the index node from a distributed storage and task network (DSTN) module. The retrieving includes generating one or more sets of read slice requests that includes one or more sets of slice names corresponding to one or more sets of index slices, sending the one more sets of read slice requests to the DSTN module, receiving one or more sets of at least a decode threshold number of index slices, and decoding each of the one or more sets of at least the decode threshold number of index slices using a dispersed storage error coding function to reproduce the index node.

For each index node update requests, the method continues at step 458 where the processing module retrieves the request from the queue and performs the update in order of time of arrival starting with the oldest request (e.g., first queued) to produce an updated index node. The processing module sequentially performs each request of the plurality of queued index node update requests. The method continues at step 460 where the processing module deletes the request from the queue upon performing the update. The method continues at step 462 where the processing module stores the updated index node in the DSTN module. The storing includes encoding the updated index node using the dispersed storage error coding function to produce one or more sets of updated index slices, generating one or more sets of write slice requests that includes the one or more sets of updated index slices and the one more sets of slice names corresponding to the one or more sets of index slices, and outputting the one or more sets of write slice requests to the DSTN module.

Figure 42:
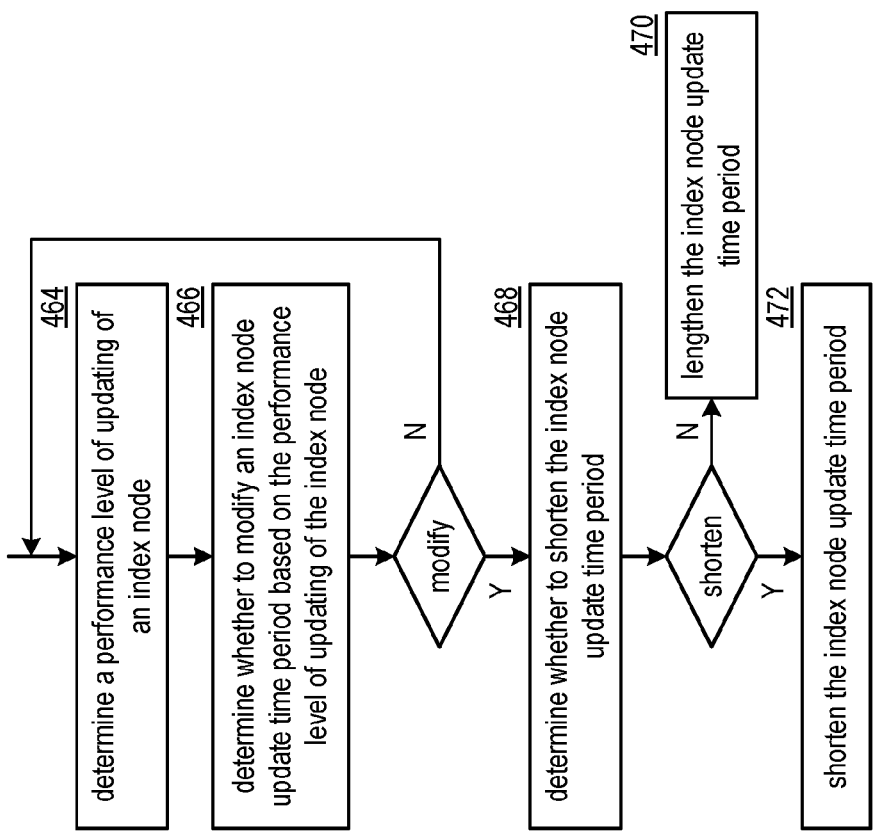
FIG. 42 is a flowchart illustrating an example of adjusting an index node update time period in accordance with the present invention.

FIG. 42 is a flowchart illustrating an example of adjusting an index node update time period. The method begins at step 464 where a processing module (e.g., of a distributed storage and task (DST) client module) determines a performance level of updating of an index node. The determining includes one or more of detecting a frequency level of update conflicts of the index node, detecting a frequency level of update requests for the index node, and detecting an average time to update the index node. The method continues at step 466 where the processing module determines whether to modify an index node update time period based on the performance level of the updating of the index node. The determining is based on comparing at least a portion of the performance level of updating of the index node to one or more performance level thresholds. For example, processing module determines to modify the index node update time period when the frequency level of update conflicts of index node is greater than an update conflict frequency threshold. The method loops back to step 464 when the processing module determines not to modify the index node update time period. The method continues to step 468 when the processing module determines to modify the index node update time period.

The method continues at step 468 where the processing module determines whether to shorten the index node update time period. The determining may be based on the performance level of updating the index node and one or more performance level thresholds. For example, the processing module determines to shorten the next node update time period when the frequency level of update conflicts of the index node is less than a frequency threshold and the frequency level of update requests for the index node is less than an update threshold. As another example, the processing module determines to lengthen the index node update time period when the average time to update the index node is greater than an update time threshold (e.g., using too much bandwidth). The method branches step 472 when the processing module determines to shorten the index node update time period. The method continues to step 470 when the processing module determines to lengthen the index node update time period.

The method continues at step 470 where the processing module lengthens the index node update time period when the processing module determines to lengthen the index node update time period. The processing module may lengthen the index update time period by adding a predetermined amount of time to the index node update time period to produce a modified index node update time period. The method continues at step 472 where the processing module shortens the index node update time period when the processing module determines to shorten the index node update time period. The processing module may shorten the index update time period by subtracting another predetermined amount of time from the index node update time period to produce the modified index node update time period.

FIGS. 43A-B are schematic block diagrams of embodiments of a dispersed storage network (DSN) that include a set of storage units, a network 24, and one or more devices (e.g., a first device 480, a second device 490). Each storage unit may be the distributed storage and task (DST) execution unit of FIG. 1. The network 24 may be the network 24 of FIG. 1. Each device 480, 490 includes a DST client module 34 of FIG. 1. Each device 480, 490 may be the user device 12 of FIG. 1.

The DSN functions to store data from the first device 480 and the second device 490 while avoiding a write conflict. The data may be revised from time to time producing revised data of an associated revision level. The write conflict includes attempting to write a revision of the data that associated with a revision level that is not greater than all revision levels associated with currently stored recoverable revisions of the data. For example, the write conflict is produced when the first device writes a first revision followed in time by the second device attempting to write the first revision. As another example, the write conflict is produced when the first device attempts to write a third revision of the data when a fourth revision of the data is recoverable from the DSN.

The DST client module 34 encodes the data using a dispersed storage error coding function to produce a plurality of sets of encoded data slices. The DST client module 34 associates a common revision level with each encoded data slice based on one or more of a revision level associated with a previously produced revision of the data, initiating a list command, receiving a list response, receiving a message from another device, and performing a lookup. When the data is revised, the DST client module 34 encodes the revised data to produce a plurality of sets of revised encoded data slices. Next, the DST client module 34 associates another common revision level with each revised encoded data slice. As a specific example, the DST client module 34 associates a revision number of 4 as the revision level for each of the revised encoded data slices when a revision number of 4 was the revision level for each of the encoded data slices associated with the data prior to revision.

In an example of writing the revised data to the set of storage units with reference to FIG. 43A, the DST client module 34 of the first device 480 sends a set of write revision requests 482 to the storage units of the DSN. Each write revision request 1-$n$ includes a slice name and a revision number corresponding to a revision level of a revised encoded data slice to be stored in the DSN. The write revision request may further include the revised encoded data slice of the respective revised encoded data slices. Alternatively, the write revision request does not include the revision number when the storage units utilize a method to generate a write revision response that doesn't require the revision number as is discussed in more detail below. FIGS. 43C-D are timing diagrams illustrating examples of timing of writing data from the DST client module 34 to DST EX unit 1. In particular, FIG. 43C illustrates an example when the DST client module 34 sends write revision request 1 of the set of write revision request 482 to DST EX unit 1, where the write revision request includes a slice name, a revision number of 4, and a revised encoded data slice of revision 4. The DST EX unit 1 temporarily stores (e.g., non-retrievable while temporarily stored) the revised encoded data slice of revision 4 and issues a write revision response 1 to the DST client module 34. Having detected no conflict issue, the DST client module 34 issues a commit request 1 to the DST EX unit 1. The DST DX unit 1 non-temporarily stores the encoded data slice of revision 4 (e.g., changing its status to retrievable from non-retrievable).

FIG. 43D illustrates another example when the DST client module 34 sends the write revision request 1 to the DST EX unit 1, where the write revision request includes the slice name and the revision number of 4 (e.g., no slice). The DST EX unit 1 issues the write revision response 1 to the DST client module 34. Having detected no conflict issue, the DST client module 34 issues a write commit request 1 to the DST EX unit 1 that includes the revised encoded data slice of revision 4. The DST DX unit 1 non-temporarily stores the encoded data slice of revision 4.

Returning to the discussion of FIGS. 43A-B, having received a write revision request, each of the storage units locks the slice name for the write revision request. While the slice name is locked for the write revision request, one of the storage units may receive a second write revision request regarding the slice name from another device of the DSN (e.g., the second user device 490). When the second write revision request is received, the storage unit sends a write error message to the other device (e.g., indicating a lock error status). The other device may try again when the lock is lifted upon completion of processing the write revision request from the first device 480.

The set of storage units further processes the set of write revision requests to generate a set of write revision responses 484 regarding a potential write conflict issue based on the revision number and send the set of write revision responses 484 to the first device 480. FIGS. 43E-H are timing diagrams illustrating examples of timing of sending a write revision response from DST EX unit 1 to the DST client module 34 in response to writing of data. As a specific example of FIG. 43E, the DST client module 34 issues a write revision request 1 to the DST EX unit 1 that includes a slice name and a revision 4. The DST EX unit 1 generates a write revision response 1 to include a list of revision numbers 1-3 that corresponds to a number of revised encoded data slices having the slice name that the DST EX unit 1 is storing. As another specific example of FIG. 43F, DST EX unit 1 generates the write revision response 1 to include a most recent revision number 3 corresponding to a most recently stored one of the respective revised encoded data slices. As yet another specific example of FIG. 43G, the DST EX unit 1 generates the write revision response 1 to include a favorable revision number indication 4 and in FIG. 43H generates the write revision response 1 to include an unfavorable revision number indication 3. For instance, the DST EX unit 1 compares a most recent revision number 3 corresponding to a most recently stored one of the respective revised encoded data slices to the revision number 4 of FIG. 43G or 3 of FIG. 43H. In the example of FIG. 43G, when the most recent revision number 3 is less than the revision number 4, the DST EX unit 1 indicates the favorable revision number indication 4. In the example of FIG. 43H, when the most recent revision number 3 is greater than or equal to the revision number 3, the DST EX unit 1 indicates the unfavorable revision number indication 3.

Returning to the discussion of FIGS. 43A-B, the first device 480 receives the write revision responses 484 from at least some of the storage units to produce a set of received write revision responses. The DST client module 34 interprets the set of received write revision responses to determine whether the write conflict issue exists. As a specific example, when the storage unit generates the write revision response to include the list of revisions, the first device 480 interprets the lists of revision numbers of the set of received write revision responses in view of the revision number by comparing a most recent revision number of the lists of revision numbers to the revision number. When at least a decode threshold number of the lists of revision numbers compare favorably to the revision number, the first device 480 indicates that the write conflict issue does not exist. As another specific example, when the storage unit generates the write revision response to include the most recent revision number, the first device 480 interprets the most recent revision numbers of the set of received write revision responses in view of the revision number and when at least a decode threshold number of the most recent revision numbers compare favorably (e.g. less than) to the revision number, the first device 480 indicates that the write conflict issue does not exist. As yet another specific example, when the storage unit generates the write revision response to include the favorable or unfavorable revision number indication, the first device 480 interprets the set of received write revision responses by indicating that the write conflict issue does not exist when at least a decode threshold number of favorable revision number indications were received.

When the write conflict issue does not exist, the first device 480 issues a set of next phase write requests 486 to the storage units regarding storing the respective revised encoded data slices. For example, next phase write request 1 includes the revised encoded data slice of the respective revised encoded data slices when the revised encoded data slice was not included in the write revision request 1. As another example, the next phase write request 1 includes a commit request 1 to instruct the DST EX unit 1 to non-temporarily store the revised encoded data slice that was included in the write revision request 1.

FIG. 43B further illustrates an example when the write conflict issue does exist. In an example of operation, the second device 490, at time t, issues a set of write revision x requests 482 to the set of storage units. DST EX units 1-n temporarily stores a set of revised encoded data slices associated with revision x at approximately time t. The set of storage units issues write revision responses 1-n 484 with regards to revision x to the second device 490 indicating that a most recent revision associated with the set of revised encoded data slices has a revision number of x–1 (e.g., no conflict since x–1<x). Having detected no conflicts, the second device 490 issues a set of commit requests 1-n as next phase write requests 486 1-n to the set of storage units to non-temporarily store the set of revised encoded data slices associated with revision x. Subsequent to completion of writing the set of revised encoded data slices associated with revision x from the second device 490, the first device 480, at time t+delta t, issues another set of write revision x requests 482 to the set of storage units that includes another set of revised encoded data slices associated with a revision number of x. The set of storage units issues write revision responses 484 with regards to revision x to the first device 480 indicating that a most recent revision associated with the set of revised encoded data slices has a revision number of x (e.g., conflict since x not <x). Having detected the write conflict, the first device 480 issues a set of rollback requests 488 regarding aborting storage of respective revised encoded data slices (e.g., delete the other set of revised encoded data slices from the first device 480).

FIGS. 43I-K are timing diagrams illustrating examples of writing data to the set of storage units further illustrating the DST client module 34 issuing the set of write revision requests 482 to the set of storage units (e.g., DST EX units 1-3), the set of storage units issuing a set of write revision responses 1-3, and the DST client module 34 issuing a set of commit requests 492 (e.g., FIGS. 43I-J) when determining to proceed with storage of the set of revised encoded data slices or alternatively issuing a set of rollback requests 488 (e.g., FIG. 43K) when determining not to proceed with storage of the set of revised encoded data slices. The FIGS. 43I-K further illustrate a storage system with a decode threshold is 2 and a set of storage units that includes 3 storage units (e.g., pillar width of 3). The DST client module 34 issues the set of write revision requests 482 that includes the revised encoded data slice of revision 4 to the set of storage units. Each of the storage units issues a write revision response to the DST client module 34.

In an example of proceeding with storage of the revised set of encoded data slices when no conflict exists, FIG. 43I includes the storage units that have previously stored different revisions of sets of revised encoded data slices such that revision 2 is a most recently written revision that is recoverable and each storage unit has a different most recent revision. The first storage unit issues a write revision response 1 that includes a revision list of revisions 1-3. The second storage unit issues a write revision response 2 that includes a revision list of revisions 1-2. The third storage unit issues a write revision response 3 that includes a revision list of revisions 1 and 3. Alternatively, any storage unit may issue a corresponding write revision response that includes another format such as favorable/unfavorable and a most recent revision number. Having received the set of write revision responses 1-3, the DST client module 34 interprets the set of write revision responses to determine that no conflict exists and to proceed with issuing a set of commit requests 492 to the set of storage units. As a specific example, the DST client module 34 interprets the set of received revision lists to identify a revision 2 as a most recent recoverable revision. Next, the DST client module 34 determines that no conflict exists since revision 4 is greater than revision 2. As another specific example when the set of storage units issues favorable/unfavorable format write revision responses, the DST client module 34 determines that no conflict exists since the decode threshold number of the storage units sends favorable write revision responses (e.g., all storage units send favorable responses since 4>3 and 4>2). As yet another specific example when the set of storage units issues the most recent revision format write revision responses, the DST client module 34 determines that no conflict exists since the decode threshold number of storage units (e.g., storage units 1 and 3) sends a most recent revision of 3 which is less than 4.

In an example of proceeding with storage of the revised set of encoded data slices when some conflict exists, FIG. 43J includes the storage units that have previously stored different revisions of sets of revised encoded data slices such that revision 2 is a most recently written revision that is recoverable and each storage unit has a different most recent revision (e.g., storage unit 1 has rev 4, unit 2 has rev 2, and unit 3 has rev 3). The first storage unit issues a write revision response 1 that includes a revision list of revisions 1, 2, 4. The second storage unit issues a write revision response 2 that includes a revision list of revisions 1-2. The third storage unit issues a write revision response 3 that includes a revision list of revisions 1 and 3. Alternatively, any storage unit may issue a corresponding write revision response that includes another format such as favorable/unfavorable and a most recent revision number. Having received the set of write revision responses 1-3, the DST client module 34 interprets the set of write revision responses to determine that, while a conflict exists with storage unit 1, to proceed with issuing a set of commit requests 492 to the set of storage units. As a specific example, the DST client module 34 interprets the set of received revision lists to identify a revision 2 as a most recent recoverable revision. Next, the DST client module 34 determines that no conflict exists since revision 4 is greater than revision 2. As another specific example when the set of storage units issues favorable/unfavorable format write revision responses, the DST client module 34 determines that no conflict exists since the decode threshold number of the storage units sends favorable write revision responses (e.g., storage units 2-3 send favorable responses since 4>2 and 4>3 while storage unit 1 sends an unfavorable response since 4 not >4). As yet another specific example when the set of storage units issues the most recent revision format write revision responses, the DST client module 34 determines that, while a conflict exists with storage unit 1, proceed with the set of commit requests 492 since the decode threshold number of storage units (e.g., storage units 2 and 3) sends a most recent revision of 2 and 3 which is less than 4.

In an example of not proceeding with storage of the revised set of encoded data slices when some conflict exists, FIG. 43K includes the storage units that have previously stored different revisions of sets of revised encoded data slices such that revision 5 is a most recently written revision that is recoverable and the storage unit has a variety of most recent revisions (e.g., storage unit 1 has rev 5, unit 2 has rev 5, and unit 3 has rev 1). The first storage unit issues a write revision response 1 that includes a revision list of revisions 1 and 5. The second storage unit issues a write revision response 2 that includes a revision list of revisions 1 and 5. The third storage unit issues a write revision response 3 that includes a revision list of revision 1. Alternatively, any storage unit may issue a corresponding write revision response that includes another format such as favorable/unfavorable and a most recent revision number. Having received the set of write revision responses 1-3, the DST client module 34 interprets the set of write revision responses to determine that one or more a conflicts exists and to issue a set of rollback requests 488 to the set of storage units (e.g., instead of commit requests). As a specific example, the DST client module 34 interprets the set of received revision lists to identify a revision 5 as a most recent recoverable revision. Next, the DST client module 34 determines that the write conflict exists since revision 4 is not greater than revision 5. As another specific example when the set of storage units issues favorable/unfavorable format write revision responses, the DST client module 34 determines that conflict exists since a decode threshold number of the storage units is not send favorable write revision responses (e.g., storage units 1 and 2 send unfavorable responses since 4 not >5 while storage unit 3 sends a favorable response since 4>1). As yet another specific example when the set of storage units issues the most recent revision format write revision responses, the DST client module 34 determines that a conflict exists since the decode threshold number of storage units (e.g., storage units 1 and 2) sends a most recent revision of 5 which is not less than 4.

FIG. 43L is a flowchart illustrating an example of storing data. The method begins at step 500 where a first device of a dispersed storage network (DSN) sends a set of write revision requests to storage units of the DSN. Each write revision request of the set of write revision requests includes a slice name and a revision number corresponding to a revision level of a revised encoded data slice to be stored in the DSN. The write revision request may further include the revised encoded data slice of the respective revised encoded data slices. Alternatively, the write revision request does not include the revision number when the storage units utilize a method to generate a write revision response that doesn't require the revision number (e.g., a revision list, a most revision) and the revised encoded data slice will be sent later along with a revision number.

The method continues at step 502 where one of the storage units locks the slice name for a corresponding one of the set of write revision requests. While the slice name is locked for the corresponding one of the set of write revision requests, the method continues at step 504 where the one of the storage units receives from a second device of the DSN, a second write revision request regarding the slice name (e.g., same slice name). Alternatively, when not receiving the second write revision request, the method branches to step 508. The method continues at step 506 where the one of the storage units sends a write error message to the second device when the one of the storage units receives the second write revision request regarding the slice name.

The method continues at step 508 where the one of the storage units generates a write revision response regarding a potential write conflict issue based on the revision number. As a specific example, the one of the storage units generates the write revision response to include a list of revision numbers that corresponds to a number of revised encoded data slices having the slice name that the one of the storage units is storing. As another specific example, the one of the storage units generates the write revision response to include a most recent revision number corresponding to a most recently stored one of the respective revised encoded data slices. As yet another specific example, the one of the storage units generates the write revision response to include a favorable or unfavorable revision number indication. For instance, the one of the storage units compares a most recent revision number corresponding to a most recently stored one of the respective revised encoded data slices to the revision number. When the most recent revision number is less than the revision number, the one of the storage units indicates the favorable revision number indication. When the most recent revision number is greater than or equal to the revision number, the one of the storage units indicates the unfavorable revision number indication.

The method continues at step 510 where the first device receives the write revision responses from at least some of the storage units to produce a set of received write revision responses. The method continues at step 512 where the first device interprets the set of received write revision responses to determine whether a write conflict issue exists. As a specific example, when the storage unit generates the write revision response to include the list of revision, the first device interprets the lists of revision numbers of the set of received write revision responses in view of the revision number by comparing a most recent revision number of the lists of revision numbers to the revision number. When at least a decode threshold number of the lists of revision numbers compare favorably to the revision number, the first device indicates that the write conflict issue does not exist.

As another specific example, when the storage unit generates the write revision response to include the most recent revision number, the first device interprets the most recent revision numbers of the set of received write revision responses in view of the revision number and when at least a decode threshold number of the most recent revision numbers compare favorably (e.g., less than) to the revision number, the first device indicates that the write conflict issue does not exist. As yet another specific example, when the storage unit generates the write revision response to include the favorable or unfavorable revision number indication, the first device interprets the set of received write revision responses by indicating that the write conflict issue does not exist when at least a decode threshold number of favorable revision number indications were received.

When the write conflict issue exists, the method continues at step 514 where the first device issues a set of write roll back requests to the storage units regarding aborting storage of respective revised encoded data slices. As a specific example, the first device generates a rollback request to include one or more of a corresponding slice name, the revision number, and a transaction number associated with the set of write revision requests. When the write conflict issue does not exist, the method continues at step 516 where the first device issues a set of next phase write requests to the storage units regarding storing the respective revised encoded data slices. As a specific example, the first device generates a next phase write request to include a write commit request including one or more of the corresponding slice name, the revision number, and the transaction number associated with the set of write revision requests.

FIGS. 44A-B are schematic block diagrams of more embodiments of a dispersed storage network (DSN) that include a first device 520, a second device 526, a network 24, and a set of distributed storage and task (DST) execution units 1-$n$. The first device 520 may be the user device 12 of FIG. 1. A second device 526 may be the DST processing unit 16 of FIG. 1. The first and second devices 520, 526, include the DST client module 34 of FIG. 1. Each DST client unit of the set of DST execution units 1-$n$ may be the DST execution unit 36 of FIG. 1. Each DST execution unit includes the processing module 84 of FIG. 3.

Data is segmented to produce a plurality of data segments. A data segment of the plurality of data segments is dispersed storage error encoded to produce a set of encoded data slices. A plurality of sets of encoded data slices is stored in the set of DST execution units 1-$n$. Each of the DST execution units stores a different portion of the data. The different portion of the data corresponds to one or more encoded data slices of one or more sets of encoded data slices.

Each DST client module 34 stores a copy of the data by caching in local memory (e.g., of the DST client module 34, of the first and second devices). One or more local memory revision numbers correspond to the different portions of the data that are cached in the local memory. For example, the DST client module 34 of the first device 520 stores a set of portions A 1-$n$ (e.g. corresponding to data A) that correspond to a second revision of data A. As a specific example of determining the one or more local memory revision numbers, the DST client module 34 determines a common revision number (e.g., rev 2) for the different portions of the data as the one or more local memory revision numbers. As another specific example, the DST client module 34 determines a local revision number (e.g., rev 2) for each of the different portions of the data as the one or more local memory revision numbers.

From time to time, each DST client module 34 updates storage of the copy of the data when a newer revision of the data is stored in the set of DST execution units 1-$n$. FIG. 44A illustrates an example of the updating when the copy of the data does not require the updating and FIG. 44B illustrates another example of the updating when the copy of the data requires the updating. When the copy of data is cached in the local memory of the first device 520, the DST client module 34 sends, via the network 24, read-if-revised requests 522 to the set of DST execution units 1-$n$ as a set of read if revised requests 1-$n$. The read-if-revised requests 522 includes a name of the data (e.g., a DSN address, a slice name) and the one or more local memory revision numbers corresponding to the different portions of the data that are cached in the local memory. As a specific example, the DST client module 34 sends the read-if-revised requests 522 as a query to determine whether the data cached in the local memory is outdated (e.g., based on detecting a potentially outdated encoded data slice). As another specific example, the first device sends the read-if-revised requests 522 as a read request to read the data from the set of DST execution units (e.g., an active process requires the data within the DST client module 34). As yet another specific example, the DST client module 34 sends the read-if-revised requests in response to a scheduled task (e.g., check data synchronization every two minutes).

Having received a read if modified request 1, DST execution unit 1 determines whether a revision number of one of the different portions of the data stored by the DST execution unit 1 is a more recent revision number than the one or more local memory revision numbers of the read if modified request 1 (e.g., more recent when revision number greater than revision number of the request). When the revision number of the one of the different portions of the data stored by the DST execution unit 1 is not the more recent revision number than the one or more local memory revision numbers, the DST execution unit 1 sends a read response 1 that includes an indication that, with respect to the one of the different portions of the data, the data cached in the local memory by the DST client module 34 of the first device 520 is a current revision level of the data (e.g., the revision number of the DST execution unit 1 is equal to or less than the one or more local memory revision numbers).

FIGS. 44C-E are timing diagrams illustrating examples of timing of reading data and providing read responses that includes the DST client module 34 and the DST execution unit 1. In particular, FIG. 44C illustrates an example of DST execution unit 1 sending the read response 1 that includes the indication that the data cached in the local memory by the DST client module 34 is the current revision level of the data. As a specific example, the DST execution unit 1 sends the read response 1 to include a list of revision numbers (e.g., rev 1, 2 for data name A) corresponding to the one of the different portions of the data. As another specific example, the DST execution unit 1 sends the read response 1 to include the more recent revision number (e.g., revision 2). As yet another specific example, the DST execution unit 1 sends the read response 1 to include a favorable indication (e.g., favorable to indicate that the one or more local memory revision numbers are not outdated).

FIGS. 44F-H are timing diagrams illustrating examples of reading data and providing read responses that includes the DST client module 34 and a set of DST execution units 1-3 when a pillar width is three and a decode threshold is 2. In particular, FIG. 44F illustrates the example when the data cached in the local memory by the DST client module 34 is the current revision level of the data. For instance, the DST client module 34 stores portions of data A corresponding to a third revision level and each of the DST execution units stores portions of data A corresponding to revisions 1-3. The DST client module 34 sends a read if modified requests to the set of DST execution units. For the example, the DST client module 34 sends the read if modified request to DST execution unit 1 with regards to a first portion of data A of revision 3. Each of the DST execution units sends a read response that includes an indication that the data cached in the local memory is the current revision level of the data. For example, DST execution unit 2 sends a read response that includes, for a second portion of data A, a revision list of revisions 1-3. Accordingly, the portions of data A cached the DST client module 34 do not require updating.

Returning to the discussion of FIG. 44A, the DST client module 34 of the first device 520 receives read responses 524 from the set of DST execution units 1-*n* as read responses 1-*n* (e.g., confirming that the data cached in local memory is a current revision level of the data). When the revision number of one of the different portions of the data stored by the DST execution unit 1 is less than the one or more local memory revision numbers, the DST execution unit 1 initiates rebuilding of the one of the different portions of the data. For example, the DST execution unit 1 performs the rebuilding. As another example, the DST execution unit 1 issues a rebuilding request to a rebuilding entity of the DSN, where the rebuilding request includes identity of the one of the different portions of the data.

The DST execution unit 1 determines whether, based on the name of the data received in the read if revised request 1, a new portion of the data is stored by the DST execution unit 1 (e.g., additional encoded data slices of additional data segments). When the DST execution unit 1 determines that the new portion of the data is stored by the DST execution unit 1, the DST execution unit 1 sends the read response 1 to further include the new portion of the data (e.g., the additional encoded data slices). The DST client module 34 caches the new portion of the data in the local memory.

FIG. 44B illustrates another example of the updating of the storage of the copy of the data when the newer revision of the data is stored in the set of DST execution units 1-*n*. The second device 526 creates a revised version 3 of the data A and, at time t, issues a set of write requests 528 to the set of DST execution units 1-*n* as write requests 1-*n*. The set of DST execution units 1-*n*, at time t, store revisions 2-3 of the portions of data A. first device 520 stores the copy of data A with revision level 2 prior to time t. Subsequent to time t, the DST client module 34 of the first device 520 sends, at time t+delta t, read if revised requests 522 to the set of DST execution units 1-*n* with regards to portions 1-*n* of data A stored in the local memory with the revision level of 2. The set of DST execution units 1-*n* receives read if revised requests 1-*n* regarding revision 2 (e.g., the one or more local memory revision numbers).

When the revision number of the one of the different portions of the data stored by the DST execution unit 1 is the more recent revision number than the one or more local memory revision numbers, the DST execution unit 1 sends sending a read response 1 that includes the one of the different portions of the data to the to the DST client module 34 of the first device 520 (e.g., the revision number of the DST execution unit 1 is greater than the one or more local memory revision numbers). The read response further includes at least one of the list of revision numbers (e.g., rev 2-3) corresponding to the one of the different portions of the data, the more recent revision number (e.g., 3), and an unfavorable indication (e.g., unfavorable to indicate that the one or more local memory revision numbers of rev 2 are outdated). The DST client module 34 of the first device 520 updates caching of the data in the local memory to include the one of the different portions of the data (e.g., the first device stores a newer revision 3 from the set of DST execution units 1-*n*).

FIGS. 44D-E illustrate examples of timing of reading data and providing the read responses when the one of the different portions of the data stored by the DST execution unit 1 is the more recent revision number than the one or more local memory revision numbers (e.g., rev 2). In particular, FIG. 44D illustrates an example of DST execution unit 1 sending the read response 1 that includes the indication that the data cached in the local memory by the DST client module 34 is not the current revision level of the data and the one of the different portions (e.g., revision 3 of portion 1 of data A). As a specific example, the DST execution unit 1 sends the read response 1 to include a list of revision numbers (e.g., rev 1, 2, 3 for data name A) corresponding to the one of the different portions of the data. As another specific example, the DST execution unit 1 sends the read response 1 to include the more recent revision number (e.g., revision 3). As yet another specific example, the DST execution unit 1 sends the read response 1 to include an unfavorable indication (e.g., unfavorable to indicate that the one or more local memory revision numbers are outdated since 3>2).

FIG. 44D-E illustrates examples of DST execution unit 1 sending the read response 1 that includes the indication that the data cached in the local memory by the DST client module 34 is not the current revision level of the data and the one of the different portions (e.g., revisions 3 and 4 of portion 1 of data A). As a specific example, the DST execution unit 1 sends the read response 1 to include a list of revision numbers (e.g., rev 2, 3, 4 for data name A) corresponding to the one of the different portions of the data. As another specific example, the DST execution unit 1 sends the read response 1 to include the more recent revision number (e.g., revision 4). As yet another specific example, the DST execution unit 1 sends the read response 1 to include an unfavorable indication (e.g., unfavorable to indicate that the one or more local memory revision numbers are outdated since 4>2).

FIGS. 44G-H illustrates examples of DST execution units 1-3 sending the read responses 1-3 that includes the indication that the data cached in local memory by the DST client module 34 is not the current revision level of the data and the one or more different portions. The DST client module 34 stores portions of data A comment where a first and third portions corresponds to a revision level 3 and a second portion corresponds to a revision level 2. In particular, FIG. 44G illustrates an example when each of the DST execution units stores portions of data A corresponding to revisions 1-3. The DST client module 34 sends read if modified requests to DST execution units 1 and 3 with regards to revision 3 and another read if modified request to DST execution unit 2 with regards to revision 2. The DST execution units 1 and 3 sends read responses that includes an indication that the data cached in the local memory is the current revision level of the data. For example, the DST execution units 1 and 3 sends the read response that includes a revision list of revisions 1-3. Accordingly, the first and third portions of data A cached by the DST client module 34 do not require updating. The DST execution unit 2 sends a read response that includes the third revision of the second portion of data A and an indication that the data cached in the local memory is not the current revision level of the data. For example, the DST execution unit 2 sends the read response that includes the third revision of the second portion of data A and the revision list of revisions 1-3. Accordingly, the DST client module 34 updates the second portion of data A with the third revision.

FIG. 44H illustrates another example when each of the DST execution units stores portions of data A corresponding to revisions 2-4. The DST client module 34 sends read if modified requests to DST execution units 1 and 3 with regards to revision 3 and another read if modified request to DST execution unit 2 with regards to revision 2. The DST execution units 1 and 3 sends read responses that includes a fourth revision of the first and third portions of data A and an indication that the data cached in the local memory is not the current revision level of the data. The DST execution unit 2 sends a read response that includes the third and fourth revisions of the second portion of data A and an indication that the data cached in the local memory is not the current revision level of the data. Accordingly, the DST client module 34 updates each portion 1-3 of data A with the fourth revisions.

FIG. 44I is a flowchart illustrating an example of reading data. When a copy of data is cached in local memory of a first device of a distributed storage network (DSN), the method begins at step 530 where the first device sends read-if-revised requests to storage units of the DSN. Each of the storage units stores a different portion of the data. The read-if-revised requests includes a name of the data (e.g., a DSN address, a slice name) and one or more local memory revision numbers corresponding to the different portions of the data that are cached in the local memory. The data is segmented to produce a plurality of data segments. A data segment of the plurality of data segments is dispersed storage error encoded to produce a set of encoded data slices. A plurality of sets of encoded data slices is stored in the storage units. The different portion of the data corresponds to one or more encoded data slices of one or more sets of encoded data slices. As an example of sending the read-if-revised requests, the first device sends the read-if-revised requests as a query to determine whether the data cached in the local memory is outdated. As another example, the first device sends the read-if-revised requests as a read request to read the data from the storage units. As yet another example, the first device sends the read-if-revised requests in response to a scheduled task. As an example of determining the one or more local memory revision numbers, the first device determines a common revision number for the different portions of the data as the one or more local memory revision numbers. As another example, the first device determines a local revision number for each of the different portions of the data as the one or more local memory revision numbers.

The method continues at step 532 where a storage unit of the storage units determines whether a revision number of one of the different portions of the data stored by the storage unit is a more recent revision number than the one or more local memory revision numbers. The method branches to step 538 when the storage unit determines that the revision number of the one of the different portions of the data stored by the storage unit is not the more recent revision than the one or more local memory revision numbers. The method continues to step 534 when the storage unit determines that the revision number of the one of the different portions of the data stored by the storage unit is the more recent revision than that one or more local memory revision numbers.

When the revision number of the one of the different portions of the data stored by the storage unit is the more recent revision number than the one or more local memory revision numbers, the method continues at step 534 where the storage unit sends sending a read response that includes the one of the different portions of the data to the first device (e.g., the revision number of the storage unit is greater than the one or more local memory revision numbers). The read response includes at least one of a list of revision numbers corresponding to the one of the different portions of the data, the more recent revision number, and an unfavorable indication (e.g., unfavorable to indicate that the one or more local memory revision numbers are outdated). The method continues at step 536 where the first device updates caching of the data in the local memory to include the one of the different portions of the data (e.g., the first device stores a newer revision from the storage unit). The method branches to step 542.

When the revision number of the one of the different portions of the data stored by the storage unit is not the more recent revision number than the one or more local memory revision numbers, the method continues at step 538 where the storage unit sends a read response that includes an indication that (e.g., list of revision numbers, a most recent revision number, a favorable indication), with respect to the one of the different portions of the data, the data cached in the local memory is a current revision level of the data (e.g., the revision number of the storage unit is equal to or less than the one or more local memory revision numbers). When the revision number of one of the different portions of the data stored by the storage unit is less than the one or more local memory revision numbers, the method continues at step 540 where the storage unit initiates rebuilding of the one of the different portions of the data.

The method continues at step 542 where the storage unit determines, based on the name of the data, that a new portion of the data is stored by the storage unit (e.g., additional encoded data slices of additional data segments). The method continues at step 544 where the storage unit sends the read response to further include the new portion of the data (e.g., the additional encoded data slices).

FIG. 45A is a schematic block diagram of another embodiment of a distributed computing system that includes a plurality of user devices 12, a plurality of distributed storage and task (DST) processing units 16, and the distributed storage and task network (DSTN) managing unit 18 of a DSTN of FIG. 1. The system functions to authenticate the plurality of user devices 12 and to authorize DSTN access requests 560 from the plurality of user devices 12.

In an example of operation to authenticate a user device 12, the user device 12 generates an authentication request 550. The authentication request 550 includes one or more of a user name associated with the user device 12 and a user device password associated with the user device 12. The user device 12 sends the authentication request 550 to a DST processing unit 16. The DST processing unit 16 generates a proxied authentication request 552 based on the authentication request 550. The proxied authentication request 552 includes one or more of the username, the user device password, a DST identifier (ID) associated with the DST processing unit 16, a DST processing unit public key of a public-private key pair, and a signed certificate (e.g., signed by a certificate authority of the DSTN). The DST processing unit 16 sends the proxied authentication request five and 52 to the DSTN managing unit 18.

The DSTN managing unit 18 authenticates the proxied authentication request 552 by a series of steps. A first step includes comparing the username and DST ID to an entry of allowed user device/DST processing unit principal associations maintained by an access control list (ACL). The principal associations identify two or more principals that are required to operate together. When the comparison is favorable (e.g., an allowed pairing or association), a second step includes verifying the signed certificate utilizing the DST processing unit public key in accordance with a certificate verification approach. For example, the DSTN managing unit 18 decrypts a signature of the signed certificate utilizing at least one of the DST processing unit public key and a public key associated with the certificate authority to produce a decrypted signature. The DSTN managing unit 18 verifies the signed certificate as valid when the decrypted signature compares favorably (e.g., substantially the same) to a result produced by performing a deterministic function (e.g., a hashing function) on the signed certificate. Other verification procedures may be utilized. The DSTN managing unit 18 indicates that the proxied authentication request 552 is authenticated when the comparison is favorable.

When the DSTN managing unit 18 indicates that the proxied authentication request 552 is authenticated, the DSTN managing unit 18 generates a proxied authentication response 554 that includes an indication that the authentication request 552 is favorably authenticated. When the DSTN managing unit 18 indicates that the proxied authentication request 552 is not authenticated, the DSTN managing unit 18 generates a proxied authentication response 554 that includes one or more of an indication that the authentication request 550 is not authenticated and allowable principal associations that include the user device 12. The DSTN managing unit 18 sends the proxied authentication response 554 to the DST processing unit 16. The DST processing unit 16 generates an authentication response 558 based on the proxied authentication response 554. The authentication response 558 includes one of an authenticated indicator and a not authenticated indicator. When the authentication response 558 includes the not authenticated indicator, the authentication response 558 further includes the allowable principal associations. The user device 12 may access a different DST processing units 16 to achieve a favorable allowable principal association for a subsequent authentication request 550 based on the authentication response 558.

In an example of operation to authorize the user device 12, the DSTN managing unit 18 distributes an access control list 556 to the plurality of DST processing units 16 for utilization during an access request sequence. The access control list 556 includes a plurality of entries. An entry of the plurality of entries includes a vault ID, an access type, principal IDs, and a principal threshold number. One or more user devices 12 of the plurality of user devices 12 each generates the access request 560 that includes an access type and a user device ID. The user device 12 sends the access request 560 to an associated DST processing unit 16. The DST processing unit 16 authorizes the access request 560 by a series of steps. A first step includes verifying that the user device 12 is favorably authenticated. A second step includes comparing user device ID and access type of the access request 560 to the access control list 556 to determine whether the access request 560 is allowed. For example, the DST processing unit 16 allows the access request 560 when the access type and the user device ID compares favorably to an entry of the access control list 556 that includes the access type and the user device ID. A third step includes determining whether a number of the user device IDs compares favorably (e.g., greater than) to the principal threshold number when more than one user device is issuing associated access request 560. For example, the DST processing units 16 indicates that the one or more access requests are authorized when the number of user device IDs (e.g., received and compare favorably to the ACL entry) is greater than or equal to the principal threshold number.

The DST processing unit 16 generates one or more access responses 562 to include results of authorization of the one or more access requests 560. An access response 562 includes one of an authorized indicator and a not authorized indicator. When the access response includes the not authorized indicator, the access response 562 may further include the principal IDs and the principal threshold number. The one more user devices 12 may coordinate generation of a different one or more access requests 560 to achieve a favorable authorized indicator for a subsequent access request scenario. The method to authorize the one more access requests is described in greater detail with reference to FIG. 45B.

FIG. 45B is a flowchart illustrating an example of authenticating an access request. The method begins at step 564 where a processing module (e.g., of a distributed storage and task (DST) processing unit) receives an access request from a user device. The method continues at step 566 where the processing module verifies authentication of the user device. For example, the processing module checks a recently authenticated list to verify that the user device has recently been favorably authenticated.

When the authentication is favorably verified, the method continues at step 568 where the processing module determines whether similar access requests from a principal threshold number of the devices have been received. The method branches to step 574 when similar access requests from the principal threshold number of user devices have been received. The method continues to step 570 when similar access requests from the principal threshold number of user devices have not been received. The method continues at step 570 where the processing module generates an access response to include denial information. The denial information includes one or more of a reason denied code, identifiers of principals involved, identifiers of allowed principals not involved, and the principal threshold number. The method continues at step 572 where the processing module outputs the access response to the user device. Alternatively, or in addition to, the processing module sends the access response to other associated principals (e.g., other user devices).

The method continues at step 574 where the processing module facilitates execution of the access request when the similar access requests from the principal threshold number of user devices have been received. The facilitating includes at least one of executing a read request, a write request, a list request, etc. The method continues at step 576 where the processing module generates an access response to include a result of execution of the access request. For example, the processing module generates the access response to include an encoded data slice when the access request includes a request to read the encoded data slice. As another example, the processing module generates the access response to include a write confirmation indicator when the access request includes a request to write the encoded data slice. The method continues at step 578 where the processing module outputs the access response to the user device. Alternatively, or in addition to, the processing module outputs the access response to other requesting principals.

FIG. 46A is a schematic block diagram of another embodiment of a distributed computing system that includes a distributed storage and task (DST) client module 34 and a plurality of DST execution units 36 of FIG. 1. In an example of operation, the system stores data segments as sets of encoded data slices 1-6 in the plurality of DST execution units 36. The DST client module 34 encodes each data segment using a dispersed storage error coding function to produce a set of encoded data slices in accordance with dispersal parameters. The dispersal parameters includes a pillar width a decode threshold. The DST client module 34 may determine the dispersal parameters based on storage conditions. The storage conditions includes one or more of current dispersal parameters, a reliability goal, an availability goal, a performance goal, an actual reliability level, an actual availability level, an actual performance goal, and estimates of one or more of reliability, availability, and performance. For example, the DST client module 34 determines the dispersal parameters to include a pillar width of six when six DST execution units 36 of the plurality of DST execution units 36 are associated with favorable availability. As another example, the DST client module 34 determines the dispersal parameters to include a decode threshold of four in accordance with an estimated reliability level when the pillar width is six.

The determining of the dispersal parameters may be dynamic as a function of changes of the storage conditions. For example, the DST client module 34 determines the dispersal parameters to include pillar width of five when one of the previously available six DST execution units 36 becomes unavailable. As another example, the DST client module 34 determines to update the decode threshold to three in accordance with an estimated reliability level when the pillar width is five. In addition, the DST client module 34 may retrieve at least one previously stored data segment utilizing a previous set of dispersal parameters to reproduce the data segment for re-encoding utilizing the dispersal parameters for re-storage in an updated pillar width number of the plurality of DST execution units 36. The method of operation to store data utilizing using adaptively determined dispersal parameters is discussed in greater detail with reference to FIG. 46B.

FIG. 46B is a flowchart illustrating another example of storing data. The method begins at step 580 where a processing module (e.g., of a distributed storage and task (DST) client module) receives a write request to store data in a distributed storage and task network (DSTN) module. The method continues at step 582 where the processing module identifies a DST execution unit storage set associated with the data (e.g., identify a vault based on a identifier of a requesting entity by a registry lookup, identify the storage set based on the vault ID by a lookup by a registry lookup). The method continues at step 584 where the processing module determines an availability level of the DST execution unit storage set. The availability level includes at least one of how many DST execution units of the DST execution unit storage set are not operational and which DST execution units of the DST execution units storage set are operational. The determining may be based on one or more of initiating a test, initiating a query, receiving a response, and performing a lookup.

The method continues at step 586 where the processing module determines whether to modify dispersal parameters associated with the DST execution unit storage set based on storage conditions including the availability level of the DST execution unit storage set. For example, the processing module determines to modify dispersal parameters when the availability level of the DST execution unit storage set is less than an availability level threshold. When modifying the dispersal parameters, the method continues at step 588 where the processing module determines modified dispersal parameters based on the dispersal parameters and the storage conditions including the availability level of the DST execution unit storage set. For example, the processing module determines modified dispersal parameters to include a pillar width of six when the dispersal parameters includes a pillar width of five and the availability level of the DST execution unit storage set indicates that six DST execution units are now available. As another example, the processing module determines the modified dispersal parameters to include a decode threshold of four when the dispersal parameters includes a decode threshold of three and an estimated reliability level of the DST execution unit storage set that includes six DST execution units compares favorably with a reliability level threshold when utilizing the decode threshold four.

The method continues at step 590 where the processing module encodes the data using a dispersed storage error coding function in accordance with the modified dispersal parameters to produce a plurality of sets of encoded data slices. The method continues at step 592 where the processing module outputs the plurality of sets of encoded data slices to at least some DST execution units (e.g., to available units) of the DST execution unit storage set. The method continues at step 594 where the processing module recovers other data from the DST execution unit storage set utilizing the dispersal parameters. The recovering includes retrieving slices from available DST execution units and decoding the retrieved slices using the dispersal parameters to reproduce the other data. The method continues at step 596 where the processing module encodes the other data using the dispersed storage error coding function in accordance with the modified dispersal parameters to produce a plurality of sets of modified encoded data slices. The method continues at step 598 where the processing module outputs the plurality of sets of modified encoded data slices to at least some DST execution units (e.g., available units) of the DST execution unit storage set.

FIG. 47 is a flowchart illustrating an example of rebuilding data. The method begins at step 600 where a processing module (e.g., of a distributed storage and task (DST) client module) detects that less than a pillar width number of encoded data slices of a set of encoded data slices of a common revision are retrievable from a distributed storage and task network (DSTN) module. The detecting includes at least one of receiving a message, invoking a list query, and comparing query responses. The method continues at step 602 where the processing module identifies dispersal parameters associated with a set of encoded data slices. The identifying includes at least one of performing a registry lookup, reading at least one encoded data slice of the set of encoded data slices, and extracting the dispersal parameters from the at least one encoded data slice.

When the less then the pillar width number of encoded data slices includes at least a decode threshold number of encoded data slices, the method continues at step 604 where the processing module retrieves the at least the decode threshold number of encoded data slices. The retrieving includes generating at least a decode threshold number of read slice requests for any available decode threshold number of encoded data slices of the set of encoded data slices, outputting the at least the decode threshold number of reads slice requests to the DSTN module, and receiving the least the decode threshold number of encoded data slices.

The method continues at step 606 where the processing module decodes the decode threshold number of encoded data slices using a dispersed storage error coding function in accordance with the dispersal parameters to reproduce a data segment. The method continues at step 608 where the processing module determines whether to rebuild one or more encoded data slices such that when combined with the less than the pillar width number of encoded data slices reforms a full pillar width number of encoded data slices. The determining may be based on one or more of the dispersal parameters, a memory availability indicator, a reliability goal, a performance goal, a request, a lookup, and a predetermination. For example, the processing module determines to rebuild the one or more encoded data slices when a reliability goal indicates to always provide a full pillar width number of encoded data slices. The method branches to step 614 when the processing module determines not to rebuild the one or more encoded data slices. The method continues to step 610 when the processing module determines to rebuild the one or more encoded data slices.

The method continues at step 610 where the processing module encodes the data segment using the dispersed storage error coding function in accordance with the dispersal parameters to produce the one or more encoded data slices. The method continues at step 612 where the processing module facilitates storing the one or more encoded data slices in the DSTN module associated with the common revision. The facilitating includes, for each slice of the one or more encoded data slices, generating a write slice request that includes the encoded data slice and a revision number of the common revision.

The method continues at step 614 where the processing module encodes the data segment using the dispersed storage or coding function in accordance with the dispersal parameters to reproduce the set of encoded data slices (e.g., full pillar width set) when the processing module determines not to rebuild the one or more encoded data slices. The method continues at step 616 where the processing module facilitates storing the reproduced set of encoded data slices in the DSTN module associated with a new revision. The facilitating includes generating a set of write slice requests that includes the set of encoded data slices and a new revision number.

FIG. 48A is a schematic block diagram of another embodiment of a distributed computing system that includes the distributed storage and task (DST) client module 34, a plurality of the DST processing unit 16, and the distributed storage and task network (DSTN) module 22 of FIG. 1. The system functions to store data 618 in the DSTN module 22. The DST client module 34 encodes the data 618 (e.g., a data segment) using a dispersed storage error coding function utilizing first level dispersal parameters to produce a first level set of encoded data slices 1-N. The first level dispersal parameters includes a pillar width N and a decode threshold K. The plurality of DST processing unit 16 includes a set of N DST processing units 16.

The DST client module 34 sends the first level set of encoded data slices 1-N to the set of DST processing unit 16. Each DST processing unit 16 encodes a corresponding first level encoded data slice using the dispersed storage error coding function utilizing second level dispersal parameters to produce a corresponding second level set of encoded data slices 1-$n$. The second level dispersal parameters includes a pillar width n and a decode threshold k. For example, a first DST processing unit 16 of the set of DST processing units 16 encodes data slice 1 of the set of encoded data slices 1-N using the dispersed storage error coding function utilizing the second level dispersal parameters to produce a second level set of encoded data slices 1_1 through 1_$n$. Next, the DST processing unit 16 outputs the corresponding second level set of encoded data slices 1-$n$ to the DSTN module 22 for storage therein.

The DST processing unit 16 receives a confirmation from the DSTN module 22 that at least a second level dispersal parameters write threshold number of the second level set of encoded data slices 1-$n$ have been successfully stored in the DSTN module 22. When the DST processing unit 16 receives the confirmation, the DST processing unit 16 generates a slice storage confirmation message and outputs the slice storage confirmation message to the DST client module 34. The DST client module 34 receives slice storage confirmation messages from at least some of the set of DST processing unit 16. When a first level dispersal parameters write threshold number of slice storage confirmation messages have been received by the DST client module 34, the DST client module 34 generates and outputs a cancellation message (e.g., rollback, delete) to any remaining DST processing unit 16 that have not output a slice confirmation message to the DST client module 34. The DST client module creates a directory entry for the data segment that includes object IDs assigned to each encoded data slice of the set of encoded data slices 1-N corresponding to the first level dispersal parameters write threshold number of slice storage confirmation messages.

The system may also function to retrieve the data segment from the DSTN module 22. When receiving a read request for the data segment, the DST client module 34 accesses the directory entry for the data segment to obtain the object IDs for each encoded data slice corresponding to the first level dispersal parameters write threshold number of slice storage confirmation messages. Next, the DST client module generates and outputs retrieval requests for each encoded data slice corresponding to the first level dispersal parameters write threshold number of slice storage confirmation messages to corresponding DST processing units 16. Each DST processing unit 16 of the corresponding DST processing units 16 retrieves at least a second level dispersal parameter decode threshold number of encoded data slices from the DSTN module 22, decodes the retrieved encoded data slices to reproduce a corresponding slice, and outputs a corresponding encoded data slice to the DST client module 34. The DST client module 34 decodes at least a first level dispersal parameter decode threshold number of received corresponding encoded data slices to reproduce the data segment. The method of operation to store the data segment is discussed in greater detail with reference to FIG. 48B.

FIG. 48B is a flowchart illustrating another example of storing data. The method begins at step 620 where a processing module (e.g., of a distributed storage and task (DST) client module) receives a request to store data. The request may include one or more of a data object and a data identifier (ID) associated with the data object. The method continues at step 622 where the processing module encodes the data using a dispersed storage error coding function utilizing first level dispersal parameters to produce a plurality of sets of first level encoded data slices. For each set of the first level encoded data slices, the method continues at step 624 where the processing module outputs the set of first level encoded data slices to a set of distributed storage and task (DST) processing units. The outputting includes generating a set of store data requests that the set of first level encoded data slices.

Each DST processing unit of the set of DST processing units encodes a corresponding first level encoded data slice of the set of first level encoded data slices using the dispersed storage error coding function utilizing second level dispersal parameters to produce a plurality of sets of second level encoded data slices for storage in a distributed storage and task network (DSTN) module. Each DST processing unit of the set of DST processing units generates and outputs a storage response that includes one of a failure indicator and a indicator that a second level dispersal parameter write threshold number of encoded data slices of a corresponding second level set of encoded data slices has been successfully stored in the DSTN module.

The method continues at step 626 where the processing module receives storage responses from at least some of the set of DST processing units. When receiving a first level dispersal parameter write threshold number of favorable storage responses from a subset of the set of DST processing units, the method continues at step 628 where the processing module generates and outputs a cancellation message to other DST processing units of the set of DST processing units. The cancellation message includes at least one of a deletion request and a rollback request. The method continues at step 630 where the processing module updates a directory to include an association between the data ID of the data, identifiers of the subset of the set of DST processing units, and identifiers of a first level dispersal parameter write threshold number of encoded data slices stored at the subset of the set of DST processing units.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:

sending, by a first device of a dispersed storage network (DSN), a set of write revision requests to storage units of the DSN, wherein a write revision request of the set of write revision requests includes a slice name and a revision number corresponding to a revision level of a set of revised encoded data slices, wherein the set of write revision requests does not include the set of revised encoded data slices;

generating, by one of the storage units, a write revision response regarding a potential write conflict based on the revision number;

receiving, by the first device, write revision responses from at least some of the storage units to produce a set of received write revision responses;

interpreting, by the first device, the set of received write revision responses to determine whether a write conflict exists;

when the write conflict exists, aborting, by the first device, a write function regarding storage of the set of revised encoded data slices by the storage units without sending the set of revised encoded data slices to the storage units; and when the write conflict does not exist, issuing, by the first device, a set of write requests to the storage units regarding storing the set of revised encoded data slices, wherein each write request of the set of write requests includes a revised encoded data slice of the set of revised encoded data slices.

2. The method of claim 1 further comprises:

generating, by the one of the storage units, the write revision response to include a list of revision numbers that corresponds to a number of revised encoded data slices having the slice name that the one of the storage units is storing; and interpreting, by the first device, the lists of revision numbers of the set of received write revision responses in view of the revision number by:
  comparing a most recent revision number of the lists of revision numbers to the revision number; and
  when at least a decode threshold number of the lists of revision numbers compare favorably to the revision number, indicating that the write conflict does not exist.

3. The method of claim 1 further comprises:
generating, by the one of the storage units, the write revision response to include a most recent revision number corresponding to a most recently stored one of the respective revised encoded data slices; and
interpreting, by the first device, most recent revision numbers of the set of received write revision responses in view of the revision number and when at least a decode threshold number of the most recent revision numbers compare favorably to the revision number, indicating that the write conflict does not exist.

4. The method of claim 1 further comprises:
generating, by the one of the storage units, the write revision response to include a favorable or unfavorable revision number indication; and
interpreting, by the first device, the set of received write revision responses by indicating that the write conflict does not exist when at least a decode threshold number of favorable revision number indications were received.

5. The method of claim 4 further comprises:
comparing, by the one of the storage units, a most recent revision number corresponding to a most recently stored one of the respective revised encoded data slices to the revision number;
when the most recent revision number is less than the revision number, indicating, by the one of the storage units, the favorable revision number indication; and
when the most recent revision number is greater than or equal to the revision number, indicating, by the one of the storage units, the unfavorable revision number indication.

6. The method of claim 1 further comprises:
locking, by the one of the storage units, the slice name for a corresponding one of the set of write revision requests; and
while the slice name is locked for the corresponding one of the set of write revision requests:
  receiving, by the one of the storage units from a second device of the DSN, a second write revision request regarding the slice name; and
  sending, by the one of the storage units, a write error message to the second device.

7. A dispersed storage network (DSN) comprises:
a first module, when operable based on processing circuitry within a first device of the DSN, causes the first device to send a set of write revision requests to storage units of the DSN, wherein a write revision request of the set of write revision requests includes a slice name and a revision number corresponding to a revision level of a set of revised encoded data slices, wherein the set of write revision requests does not include the set of revised encoded data slices;
a second module, when operable based on other processing circuitry within one of the storage units, causes the one of the storage units to generate a write revision response regarding a potential write conflict based on the revision number;
a third module, when operable based on the processing circuitry within the first device, causes the first device to interpret a set of received write revision responses to determine whether a write conflict exists, wherein the first device receives write revision responses from at least some of the storage units to produce the set of received write revision responses; and
a fourth module, when operable based on the processing circuitry within the first device, causes the first device to:
  abort a write function regarding storage of the set of revised encoded data slices by the storage units without sending the set of revised encoded data slices to the storage units when the write conflict exists; and
  issue a set of write requests to the storage units regarding storing the set of revised encoded data slices, wherein each write request of the set of write requests includes a revised encoded data slice of the set of revised encoded data slices when the write conflict does not exist.

8. The DSN of claim 7 further comprises:
the second module functions to generate the write revision response to include a list of revision numbers that corresponds to a number of revised encoded data slices having the slice name that the one of the storage units is storing; and
the third module functions to interpret the lists of revision numbers of the set of received write revision responses in view of the revision number by:
  comparing a most recent revision number of the lists of revision numbers to the revision number; and
  when at least a decode threshold number of the lists of revision numbers compare favorably to the revision number, indicating that the write conflict does not exist.

9. The DSN of claim 7 further comprises:
the second module functions to generate the write revision response to include a most recent revision number corresponding to a most recently stored one of the respective revised encoded data slices; and
the third module functions to interpret most recent revision numbers of the set of received write revision responses in view of the revision number and when at least a decode threshold number of the most recent revision numbers compare favorably to the revision number, indicating that the write conflict does not exist.

10. The DSN of claim 7 further comprises:
the second module functions to generate the write revision response to include a favorable or unfavorable revision number indication; and
the third module functions to interpret the set of received write revision responses by indicating that the write conflict does not exist when at least a decode threshold number of favorable revision number indications were received.

11. The DSN of claim 10 further comprises:
the second module further functions to:
  compare a most recent revision number corresponding to a most recently stored one of the respective revised encoded data slices to the revision number;
  indicate the favorable revision number indication when the most recent revision number is less than the revision number; and indicate the unfavorable revision number indication when the most recent revision number is greater than or equal to the revision number.

12. The DSN of claim 7 further comprises:
the second module further functions to:
lock the slice name for a corresponding one of the set of write revision requests; and
while the slice name is locked for the corresponding one of the set of write revision requests:
receive, from a second device of the DSN, a second write revision request regarding the slice name; and
send a write error message to the second device.

13. A processing system of a dispersed storage network (DSN) comprises:
at least one processor;
a memory that stores operational instructions, that when executed by the at least one processor cause the processing system to:
send, by a first device of the DSN, a set of write revision requests to storage units of the DSN, wherein a write revision request of the set of write revision requests includes a slice name and a revision number corresponding to a revision level of a set of revised encoded data slices, wherein the set of write revision requests does not include the set of revised encoded data slices;
generate, by one of the storage units, a write revision response regarding a potential write conflict based on the revision number;
receive, by the first device, write revision responses from at least some of the storage units to produce a set of received write revision responses;
interpret, by the first device, the set of received write revision responses to determine whether a write conflict exists;
when the write conflict exists, abort, by the first device, a write function regarding storage of the set of revised encoded data slices by the storage units without sending the set of revised encoded data slices to the storage units; and
when the write conflict does not exist, issue, by the first device, a set of write requests to the storage units regarding storing the set of revised encoded data slices, wherein each write request of the set of write requests includes a revised encoded data slice of the set of revised encoded data slices.

14. The processing system of claim 13 wherein the operational instructions, when executed by the at least one processor, further cause the processing system to:
generate, by the one of the storage units, the write revision response to include a list of revision numbers that corresponds to a number of revised encoded data slices having the slice name that the one of the storage units is storing; and
interpret, by the first device, the lists of revision numbers of the set of received write revision responses in view of the revision number by:

comparing a most recent revision number of the lists of revision numbers to the revision number; and
when at least a decode threshold number of the lists of revision numbers compare favorably to the revision number, indicating that the write conflict does not exist.

15. The processing system of claim 13 wherein the operational instructions, when executed by the at least one processor, further cause the processing system to:
generate, by the one of the storage units, the write revision response to include a most recent revision number corresponding to a most recently stored one of the respective revised encoded data slices; and
interpret, by the first device, most recent revision numbers of the set of received write revision responses in view of the revision number and when at least a decode threshold number of the most recent revision numbers compare favorably to the revision number, indicating that the write conflict does not exist.

16. The processing system of claim 13 wherein the operational instructions, when executed by the at least one processor, further cause the processing system to:
generate, by the one of the storage units, the write revision response to include a favorable or unfavorable revision number indication; and
interpret, by the first device, the set of received write revision responses by indicating that the write conflict does not exist when at least a decode threshold number of favorable revision number indications were received.

17. The processing system of claim 16 wherein the operational instructions, when executed by the at least one processor, further cause the processing system to:
compare, by the one of the storage units, a most recent revision number corresponding to a most recently stored one of the respective revised encoded data slices to the revision number;
when the most recent revision number is less than the revision number, indicate, by the one of the storage units, the favorable revision number indication; and
when the most recent revision number is greater than or equal to the revision number, indicate, by the one of the storage units, the unfavorable revision number indication.

18. The processing system of claim 13 wherein the operational instructions, when executed by the at least one processor, further cause the processing system to:
lock, by the one of the storage units, the slice name for a corresponding one of the set of write revision requests; and
while the slice name is locked for the corresponding one of the set of write revision requests:
receive, by the one of the storage units from a second device of the DSN, a second write revision request regarding the slice name; and
send, by the one of the storage units, a write error message to the second device.

* * * * *